US011335911B2

United States Patent
Lanning et al.

(10) Patent No.: US 11,335,911 B2
(45) Date of Patent: May 17, 2022

(54) EXPANSION-TOLERANT THREE-DIMENSIONAL (3D) CARBON-BASED STRUCTURES INCORPORATED INTO LITHIUM SULFUR (LI S) BATTERY ELECTRODES

(71) Applicant: Lyten, Inc., Sunnyvale, CA (US)

(72) Inventors: Bruce Lanning, Littleton, CO (US); Michael W. Stowell, Sunnyvale, CA (US); Bryce H. Anzelmo, Mountain View, CA (US); George Clayton Gibbs, Santa Clara, CA (US); Shreeyukta Singh, San Jose, CA (US); Hossein-Ali Ghezelbash, Santa Clara, CA (US); Prashanth Jampani Hanumantha, Mountain View, CA (US); Daniel Cook, Woodside, CA (US); David Tanner, Yuba City, CA (US)

(73) Assignee: LytEn, Inc., San Jose, CA (US)

( * ) Notice: Subject to any disclaimer, the term of this patent is extended or adjusted under 35 U.S.C. 154(b) by 0 days.

(21) Appl. No.: 16/998,462

(22) Filed: Aug. 20, 2020

(65) Prior Publication Data

US 2021/0057751 A1 Feb. 25, 2021

Related U.S. Application Data

(63) Continuation-in-part of application No. 16/928,972, filed on Jul. 14, 2020, now Pat. No. 10,998,552, (Continued)

(51) Int. Cl.
*H01M 4/02* (2006.01)
*H01M 4/62* (2006.01)
(Continued)

(52) U.S. Cl.
CPC ......... *H01M 4/625* (2013.01); *H01M 4/0404* (2013.01); *H01M 4/134* (2013.01); (Continued)

(58) Field of Classification Search
CPC ...................................... H01M 4/02
See application file for complete search history.

(56) References Cited

U.S. PATENT DOCUMENTS

| | | | |
|---|---|---|---|
| 5,436,093 | A | 7/1995 | Huang et al. |
| 6,031,711 | A | 2/2000 | Tennent et al. |

(Continued)

FOREIGN PATENT DOCUMENTS

| | | |
|---|---|---|
| CA | 2032137 C | 11/1990 |
| CN | 100541870 | 9/2009 |
| WO | 2018122368 A1 | 7/2018 |

OTHER PUBLICATIONS

K.S. Novoselov et al. "Electric Field Effect in Atomically Thin Carbon Films" Science; 306(5696), pp. 666-669; Oct. 22, 2004.

(Continued)

*Primary Examiner* — Jacob B Marks
(74) *Attorney, Agent, or Firm* — Paradice & Li LLP

(57) ABSTRACT

This disclosure provides an electrode having a carbon-based structure with a plurality of localized reaction sites. An open porous scaffold is defined by the carbon-based structure and can confine an active material in the localized reaction sites. A plurality of engineered failure points is formed throughout the carbon-based structure and can expand in a presence of volumetric expansion associated with polysulfide shuttle. The open porous scaffold can inhibit a formation of interconnecting solid networks of the active material between the localized reaction sites. The plurality of engineered failure points can relax or collapse during an initial activation of the electrode. The open porous scaffold can define a hierarchical (Continued)

porous compliant cellular architecture formed of a plurality of interconnected graphene platelets fused together at substantially orthogonal angles. The hierarchical porous compliant cellular architecture can be expansion-tolerant and can expand in a presence of Li ion insertion or de-insertion.

38 Claims, 18 Drawing Sheets

Related U.S. Application Data which is a continuation of application No. 16/550,091, filed on Aug. 23, 2019, now Pat. No. 10,734,653.

(51) Int. Cl.

| | | |
|---|---|---|
| H01M 4/04 | (2006.01) | |
| H01M 4/134 | (2010.01) | |
| H01M 4/136 | (2010.01) | |
| H01M 4/1395 | (2010.01) | |
| H01M 4/1397 | (2010.01) | |
| H01M 4/38 | (2006.01) | |
| H01M 4/58 | (2010.01) | |
| H01M 4/66 | (2006.01) | |
| H01M 10/0525 | (2010.01) | |
| H01M 10/0567 | (2010.01) | |
| H01M 10/058 | (2010.01) | |
| H01M 50/44 | (2021.01) | |
| H01M 50/411 | (2021.01) | |

(52) U.S. Cl.
CPC ......... *H01M 4/136* (2013.01); *H01M 4/1395* (2013.01); *H01M 4/1397* (2013.01); *H01M 4/386* (2013.01); *H01M 4/5815* (2013.01); *H01M 4/661* (2013.01); *H01M 10/058* (2013.01); *H01M 10/0525* (2013.01); *H01M 10/0567* (2013.01); *H01M 50/411* (2021.01); *H01M 50/44* (2021.01); *H01M 2004/021* (2013.01)

(56) References Cited

U.S. PATENT DOCUMENTS

| | | | |
|---|---|---|---|
| 6,099,960 | A | 8/2000 | Tennent et al. |
| 6,757,154 | B2 | 6/2004 | Reynolds, III et al. |
| 6,830,595 | B2 | 12/2004 | Reynolds, III |
| 7,071,258 | B1 | 7/2006 | Jang et al. |
| 7,206,189 | B2 | 4/2007 | Reynolds, III |
| 7,465,519 | B2 | 12/2008 | Tang et al. |
| 7,623,340 | B1 | 11/2009 | Song et al. |
| 7,824,651 | B2 | 11/2010 | Zhamu et al. |
| 7,842,421 | B2 | 11/2010 | Mikhaylik |
| 7,875,219 | B2 | 1/2011 | Zhamu et al. |
| 8,119,288 | B2 | 2/2012 | Zhamu et al. |
| 8,132,746 | B2 | 3/2012 | Zhamu et al. |
| 8,241,793 | B2 | 8/2012 | Zhamu et al. |
| 8,415,054 | B2 | 4/2013 | Skotheim et al. |
| 8,497,225 | B2 | 7/2013 | Zhamu et al. |
| 8,524,067 | B2 | 9/2013 | Zhamu et al. |
| 8,617,748 | B2 | 12/2013 | Mikhaylik et al. |
| 8,624,222 | B2 | 1/2014 | Liu et al. |
| 8,748,043 | B2 | 1/2014 | Mikhaylik |
| 8,936,870 | B2 | 1/2015 | Affinito et al. |
| 9,005,809 | B2 | 4/2015 | Wilkening et al. |
| 9,034,421 | B2 | 5/2015 | Mikhaylik et al. |
| 9,040,201 | B2 | 5/2015 | Affinito et al. |
| 9,190,667 | B2 | 11/2015 | Zhamu et al. |
| 9,190,694 | B2 | 11/2015 | Lopez et al. |
| 9,246,185 | B2 | 1/2016 | Kretschmar et al. |
| 9,419,274 | B2 | 8/2016 | Wilkening et al. |
| 9,577,243 | B2 | 2/2017 | Schmidt et al. |
| 9,742,030 | B2 | 8/2017 | Wright et al. |
| 9,819,053 | B1 | 11/2017 | Zimmerman |
| 10,020,494 | B2 | 7/2018 | Wang et al. |
| 10,083,801 | B2 | 9/2018 | Zhamu et al. |
| 10,530,011 | B1 | 1/2020 | MacKenzie et al. |
| 2009/0022649 | A1 | 1/2009 | Zhamu et al. |
| 2009/0028777 | A1 | 1/2009 | Zhamu et al. |
| 2015/0210558 | A1 | 7/2015 | Dickinson et al. |
| 2015/0291431 | A1 | 10/2015 | Tang et al. |
| 2016/0207291 | A1 | 7/2016 | Dimitrakopoulos et al. |
| 2017/0062821 | A1 | 3/2017 | Tour et al. |
| 2019/0108948 | A1* | 4/2019 | Chai ................. C01B 32/05 |
| 2019/0288334 | A1 | 9/2019 | Wright et al. |

OTHER PUBLICATIONS

T. Takamura et al."A key technology to improve the cyclic performances of carbonaceous materials for lithium secondary battery anodes" Science Direst Journal of Power Sources vol. 68, Issue 1, Sep. 1997, pp. 114-119.

J. Rothlisberger et al. "Ab Initio Molecular Dynamics Investigation of Singlet C2H2Li2: Determination of the Ground State Structure and Observation of LiH Intermediates" J. American Chemical Society 1995, 117, 42-48.

C. Menachem et al. "Characterization of Lithiated Natural Graphite Before and After Mild Oxidation" Science Direct Journal of Power Sources vol. 76, Issue 2, Dec. 1, 1998, pp. 180-185.

C. Menachem et al. "Characterization of modified NG7 graphite as an improved anode for lithius-ion batteries" Science Direct Journal of Power Sources vol. 68, Issue 2, Oct. 1997, pp. 277-282.

Y. Ein-Eli et al. "Chemical Oxidation: A Route to Enhanced Capacity in Li-Ion Graphite Anodes" Journal of The Electrochemical Society 1997 vol. 144, issue 9, pp. 2968-2973.

P. Maguire et al. "Continuous In-flight Synthesis for On-Demand Delivery of Ligand-Free Colloidal Gold Nanoparticles", Nano Letters; 17(3); pp. 1336-1343; Mar. 8, 2017.

S. Dabrowska et al. "Current Trends in the Development of Microwave Reactors for the Synthesis of Nanomaterials in Laboratories and Industries: A Review" Crystals; 8(10); Oct. 2018; p. 379.

M. Zheng et al."Activated graphene with tailored pore structure parameters for long cycle-life lithium-sulfur batteries" Nano Res. 2017, 10(12): 4305-4317.

J.S. Xue et al."Dramatic Effect of Oxidation on Lithium Insertion in Carbons Made from Epoxy Resins" Journal of The Electrochemical Society 1995 vol. 142, issue 11, 3668-3677.

F. Disma et al."Effect of Mechanical Grinding on the Lithium Intercalation Process in Graphites and Soft Carbons" Journal of The Electrochemical Society 1996 vol. 143, issue 12, 3959-3972.

Y. Wu et al."Effects of catalytic oxidation on the electrochemical performance of common natural graphite as an anode material for lithium ion batteries" Science Direct Electrochemistry Communications vol. 2, Issue 4, Apr. 1, 2000, pp. 272-275.

K.H. An et al."Electrochemical Properties of High-Power Supercapacitors Using Single-Walled Carbon Nanotube Electrodes" Advanced Functional Materials/vol. 11, Issue 5. Oct. 2, 2001.

Y. Qiu et al."Explosive thermal reduction of graphene oxide-based materials: mechanism and safety implications" NIH Public Access Author Manuscript School of Engineering, Brown University, 182 Hope St., Providence, RI, USA, 02912. Carbon NY. Jun. 2014; 72: 215-223. doi:10.1016/j.carbon.2014.02.005.

R. Yazami et al."High reversible capacity carbon-lithium negative electrode in polymer electrolyte" Science Direct Journal of Power Sources vol. 54, Issue 2, Apr. 1995 pp. 411-415.

T. Zheng et al. "High-Capacity Carbons Prepared from Phenolic Resin for Anodes of Lithium-Ion Batteries" Journal of The Electrochemical Society 1995 vol. 142, issue 11, L211-L214.

Z. Lu et al."Improving Li anode performance by a porous 3D carbon paper host with plasma assisted sponge carbon coating" Energy Storage Materials 11 (2018) 47-56.

S. Zhang "Liquid electrolyte lithium/sulfur battery: Fundamental chemistry, problems, and solutions" Science Direct. Journal of Power Sources vol. 231, Jun. 1, 2013, pp. 153-162.

(56) References Cited

OTHER PUBLICATIONS

R. Korthauer (Ed.) "Lithium-Ion Batteries: Basics and Applications" Publisher, Springer-Verlag Berlin Heidelberg Copyright Aug. 7, 2018.
H. Buqa et al. "Modified carbons for improved anodes in lithium ion cells" Science Direct Journal of Power Sources vol. 97-98, Jul. 2001, pp. 122-125.
E. Lee et al. "Li Absorption and Intercalation in Single Layer Graphene and Few Layer Graphene by First Principles" NANO Letters; 12(9), pp. 4624-4628; Sep. 12, 2012.
Y. Shi et al. "Material and Structural Design of Novel Binder Systems for High-Energy, High-Power Lithium-Ion Batteries" Published as part of the Accounts of Chemical Research special issue "Energy Storage: Complexities AmongMaterials and Interfaces at Multiple Length Scales". DOI: 10.1021/acs.accounts.7b00402 Acc. Chem. Res. 2017, 50, 2642-2652.
K. Ji et al. "Lithium intercalation into bilayer graphene" Nature Communications; 19(1); pp. 1-10; Jan. 17, 2019.
K. Ji et al. "Lithium intercalation into bilayer graphene" Nature Communications (2019) 10:275 | https://doi.org/10.1038/s41467-018-07942-z | www.nature.com/naturecommunications.
K. Jurewicz et al. "Supercapacitors from nanotubes/polypyrrole composites" Science Direct Chemical Physics Letters vol. 347, Issues 1-3, Oct. 2001, pp. 36-40.
J.E. Huang et al. "Well-dispersed single-walled carbon nanotube/polyaniline composite films" Science Dierct Carbon vol. 41, Issue 14, 2003, pp. 2731-2736.
A. Mistry et al. ""Shuttle" in Polysulfide Shuttle: Friend or Foe?" Journal of Physical Chemistry C; 122(42); p. 23845-23851; Oct. 5, 2018.
I. Son et al., "Graphene balls for lithium rechargeable batteries with fast charging and high volumetric energy tensities", Nature Communications; 8(1); pp. 1-11; Nov. 16, 2017.
H. Wang et al., "Graphene-Wrapped sulfur particles as a rechargeable lithium-sulfur battery cathode material with high capacity and cycling stability", Nano Letters; 11(7); pp. 2644-2647; Jul. 13, 2011.
Y. Lee et al., "High-Energy Long-Cycling All-Solid-State Lithium Metal Batteries Enabled by Silver-Carbon Composite Anodes", Nature Energy; 5(4); pp. 299-308; Apr. 2020.
Zhou, I. et al., "Recent developments on and prospects for electrode materials with hierarchical structures for lithium-ion batteries", Advanced Energy Materials; 8(6); p. 1701415; Feb. 2018.
Rodrigues, M. et al., "A materials perspective on Li-ion batteries at extreme temperatures", Nature Energy; 2(8); pp. 1-4; Jul. 24, 2017.
Zhang, H. et al., "Three-dimensional bicontinuous ultrafast-charge and -discharge bulk battery electrodes", Nature Nanotechnology; 6(5); pp. 277-281; May 2011.
Agostini, M. et al., "A high-power and fast charging Li-ion battery with outstanding cycle-life", Scientific Reports; 7(1); pp. 1-7; Apr. 24, 2017.
Shaibani, M., et al., "Expansion-tolerant architectures for stable cycling of ultrahigh-loading sulfur cathodes in lithium-sulfur batteries", Science Advances; 6(eaay2757); 11 pages; Jan. 3, 2020.
Liu, R., et al., "A self-standing, UV-cured semi-interpenetrating polymer network reinforced composite gel electrolytes tor dendrite-suppressing lithium ion batteries", Journal of Materiomics; 5(2); pp. 185-194; Jun. 1, 2019.
Pathak, R., et al., "Fluorinated hybrid solid-electrolyte-interphase fordendrite-free lithium deposition", Nature Communications; 11(1); pp. 1-10; Jan. 3, 2020.
Bhattacharya, M., "Polymer Nanocomposites—A Comparison between Carbon Nanotubes, Graphene, and Clay as Nanofillers", Materials; 9(4); p. 262; Apr. 2016.
Fu, J., et al., "Flexible High-Energy Polymer-Electrolyte-Based Rechargeable Zinc-Air Batteries", Advanced Materials: 27(37); pp. 5617-5622; Oct. 2015.
Mishra, A., et al., "Electrode materials for lithium-ion batteries", Materials Science for Energy Technologies; 1(2); pp. 182-187; Dec. 1, 2018.
Guo, B., et al., "Hierarchical N-Doped Porous Carbons for Zn-Air Batteries and Supercapacitors", Nano-Micro Letters; 12(1); p. 20; Jan. 1, 2020.
Zhang, J., et al., "3D-printed functional electrodes towards Zn-Air batteries", Materials Today Energy; 16; p. 100407; Jun. 1, 2020.

* cited by examiner

| | MATERIAL | THEORETICAL CAPACITY (mAh/g) | PRACTICAL CAPACITY (mAh/g) |
|---|---|---|---|
| ANODES | Li | 3861 | varies |
| | $C_6$ | 372 | ~300 |
| | $Li_{22-x}Si_{5-y}$ | 2011-4199 | >1000 |
| | Si | 4199 | >2000 |
| CATHODES | LCO | 295 | 140 |
| | NMC | 301 | 165 |
| | $Li_2S$ | 1167 | >450 |
| | S | 1672 | >700 |
| | CELL CONFIGURATION | THEORETICAL SPECIFIC ENERGY (Wh/kg) | PRACTICAL SPECIFIC ENERGY (Wh/kg) |
| FULL CELL | $NMC/LiC_6$ | 302 | 160 |
| | $Li_2S/Li_{22-x}Si_{5-y}$ | >768 | >345 |
| | $Li_2S/Si$ | 1139 | >600 |

EXPANSION-TOLERANT THREE-DIMENSIONAL (3D) CARBON-BASED STRUCTURES INCORPORATED INTO LITHIUM SULFUR (LI S) BATTERY ELECTRODES

RELATED APPLICATIONS

This application is a continuation-in-part of and claims priority to U.S. patent application Ser. No. 16/928,972 entitled "Lithium Ion Battery and Battery Materials" filed on Jul. 14, 2020, which is a continuation of and claims priority to U.S. patent application Ser. No. 16/550,091 entitled "Lithium Ion Battery and Battery Materials" filed on Aug. 23, 2019 (now granted as U.S. Pat. No. 10,734,653), all of which are assigned to the assignee hereof. The disclosure of the prior Applications are considered part of and are incorporated by reference in this Patent Application.

TECHNICAL FIELD

This disclosure relates generally to producing carbon-based structures, and, more particularly, to incorporating carbon-based structures into expansion-tolerant lithium sulfur (Li S) battery electrodes.

BACKGROUND

Recent developments in energy-intensive applications such as electric cars has promoted interest in developing high energy density batteries with lithium (Li) metal anodes (LMA), such as dense Li metal foil. Li metal is attractive as the anode of electrochemical cells due to its light weight and high energy density, compared to, for example, Li intercalated carbon anodes, where the presence of non-electroactive materials increases weight and volume of the anode and thereby reduce the energy density of the cells, and to other conventional electrochemical systems with, for example, nickel (Ni) or cadmium (Cd) anodes. Low weight is of importance to many applications, including in batteries for portable electronic devices such as cellular phones and laptop computers, as well as electric vehicles, military, and aerospace applications. Regarding cathodes, several types of cathode materials for Li-anode batteries are known, and include cathode materials comprising sulfur-sulfur (S—S) bonds, where high energy capacity and rechargeability are achieved from the electrochemical cleavage (via reduction) and reformation (via oxidation) of the S—S bonds. Sulfur-containing cathode materials, having S—S bonds, frequently intended for use in electrochemical cells having Li anodes, include elemental S, organosulfur, and carbon-S compositions.

During discharge of Li S batteries that include a Li anode and a S-loaded cathode, polysulfides (PS) species form within the cathode. Certain higher order soluble polysulfides are soluble in electrolyte solutions and can therefore migrate to the anode, a concept that can be referred to as PS shuttle, which contributes to degradation in a Li S battery, to then react with the anode, causing a marked reduction in battery performance. Such a battery may exhibit self-discharge, due to the presence of a redox shuttle mechanism, including the higher order PS. These higher order polysulfides diffuse through the electrolyte to the anode where they are reduced to lower polysulfides that, in turn, diffuse back through the electrolyte to the cathode only to again be oxidized to higher polysulfides. This redox shuttle causes a continuous current flow internal to the cell, ultimately resulting in a depletion of the cell's stored capacity. As a result, batteries with reduced self-discharge are desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as an electrode including a carbon-based structure having a plurality of localized reaction sites, an open porous scaffold defined by the carbon-based structure and configured to confine an active material in the localized reaction sites, and a plurality of engineered failure points formed throughout the carbon-based structure and configured to expand in a presence of volumetric expansion associated with polysulfide shuttle. The open porous scaffold can be configured to inhibit a formation of interconnecting solid networks of the active material between the localized reaction sites. The plurality of engineered failure points can be configured to relax or collapse during an initial activation of the electrode.

In some implementations, the open porous scaffold can define a hierarchical porous compliant cellular architecture formed of a plurality of interconnected graphene platelets fused together at substantially orthogonal angles. The hierarchical porous compliant cellular architecture can be expansion-tolerant and be configured to expand in a presence of Li ion insertion or de-insertion. The carbon-based structure can have a surface area configured to transport ions in the open porous scaffold, where the transport can be based on a presence of stress or strain during an operational cycling of the electrode. The plurality of engineered failure points can be configured to reinforce of the carbon-based structure based on operational cycles of the electrode.

In some implementations, the carbon-based structure, upon being doped by one or more dopants, can be configured to enhance electron transfer between itself and the active material, which can include any one or more of Li or S. The one or more dopants includes any one or more of carbon, oxygen, nitrogen, or metal oxides including silicon oxide ($SiO_x$), aluminum oxide ($AlO_x$), vanadium oxide ($VO_x$), titanium oxide ($TiO_x$), and magnesium-doped nickel oxide ($Mg_{0.6}Ni_{0.4}O$). The open porous scaffold can have a surface area configured to increase adsorption of Li and Li polysulfide by being doped with any one or more of carbon or oxygen. The carbon-based structure, upon being doped with nitrogen, can be configured to increase in electrical conductivity. The carbon-based structure can be configured to increase electron transfer across an interface between itself and a bulk electrolyte phase interspersed in the open porous scaffold, which can include micropores, any one or more of which is configured to retain polysulfides formed from the active material.

Another innovative aspect of the subject matter described in this disclosure can be implemented in a Li S (Li S) battery including an anode and a cathode formed of few layer graphene (FLG) platelets defining a scaffold with a conductive carbon surface. The scaffold can include a plurality of interconnected channels configured to provide ion transport, a plurality of pores configured to retain an electroactive material, and a plurality of aggregates formed from two or more FLG platelets fused together and configured to enlarge based on a volumetric expansion of the cathode. The electroactive material can include S. The plurality of pores can be configured to confine one or more short or long-chain polysulfides (PS) formed from the S.

In some implementations, the conductive carbon surface can be configured to electrochemically convert the S through charge transfer at the conductive carbon surface. The scaffold can be configured to provide mechanical stability in a presence of the volumetric expansion. Any one or more of a discharge cycle of the Li S battery, a dissolution, or a precipitation reaction of the S during operational cycling of the Li S battery can be associated with the volumetric expansion of the cathode. A composite separator can be disposed between the anode and the cathode.

In some implementations, an electrolyte solution can be interspersed throughout the anode, the cathode and surround the composite separator. The electrolyte solution can include solvent molecules configured to solvate with one or more short or long-chain polysulfides (PS) formed from S confined in one or more of the plurality of pores, which can be configured to be infiltrated by the electrolyte solution. The scaffold can be electrically conductive and be configured to be doped with nitrogen, where the doping can be associated with an increase in electrical conductivity across the scaffold.

Yet another aspect of the subject matter described in this disclosure can be implemented as a method of manufacturing an electrode. The method can include fusing a plurality of graphene platelets at substantially orthogonal angles, forming a cellular architecture from the plurality graphene platelets, and incorporating a plurality of failure points within cellular architecture. The method can include expanding the failure points in a presence of volumetric expansion of the cellular architecture associated with polysulfide shuttle and self-nucleating the cellular architecture from a carbon-containing vapor flow stream.

In some implementations, the carbon-containing vapor flow stream is flowed at substantially atmospheric pressure. The method can include forming the plurality of graphene platelets in one or more stacks of parallel carbon layer planes, defining a cavity in each stack, and coating exposed surfaces of the cavity with an electroactive material, as well as tuning a spacing between adjacent parallel carbon layer planes.

Still another innovative aspect of the subject matter described in this disclosure can be implemented in a reversible Li (Li)-based electrode architecture including an open porous scaffold formed of a plurality of parallel graphene layer stacks, a plurality of cavities, each cavity extending lengthwise into each stack of parallel graphene layers, an active material at least temporarily confined within each cavity and disposed between adjacent graphene layers, and a plurality of engineered failure points distributed throughout the open porous scaffold.

In some implementations, the plurality of engineered failure points can be configured to expand in a presence of a volumetric expansion of the open porous scaffold associated with transport of the active material. The open porous scaffold can be incorporated into a Li battery system to yield a specific capacity of the Li battery system of greater than 750 mAh/g. The plurality of parallel graphene layer stacks can be configured to undergo a transition from a substantially crystalline orientation to a random few-layer graphene (FLG) arrangement with nanoscopic pores. The transition can increase a specific capacity of a Li battery system incorporating the open porous scaffold.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1B:
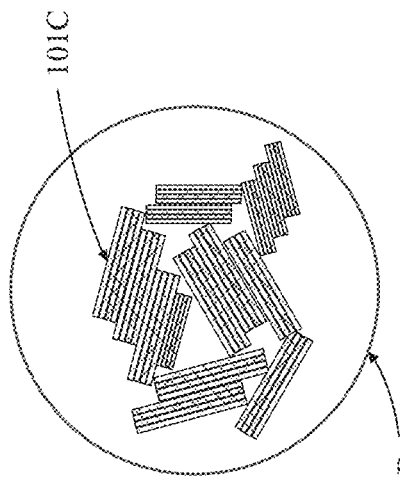
FIGS. 1A through 1E show diagrams of a carbon-based particle, agglomeration, scaffold, structure, and/or the like with regions for electrical conduction and ion transport, according to some implementations.

Various aspects of the novel systems, apparatuses, and methods are described more fully herein with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein can be embodied by one or more elements of a claim.

Although some examples and aspects are described herein, many variations and permutations of these examples fall within the scope of the disclosure. Although some benefits and advantages of the preferred aspects are mentioned, the scope of the disclosure is not intended to be limited to benefits, uses, or objectives. Rather, aspects of the disclosure are intended to be broadly applicable to a carbon-based particle self-nucleated in an atmospheric-pressure vapor flow stream of a carbon-containing gas such as methane, the carbon-based particle including multiple electrically conductive three-dimensional (3D) aggregates of graphene sheets defining void spaces and ion conduits therein, some of which are illustrated in the figures and in the following description of the preferred aspects. The detailed description and drawings are merely illustrative of the disclosure rather than limiting, the scope of the disclosure being defined by the appended claims and equivalents thereof.

Definitions

Li-Ion Batteries

A Li-ion battery is a type of secondary, alternatively referred to as a rechargeable, battery. Such battery technology has shown great promise in recent years as power sources that can lead to an electric vehicle (EV) revolution by facilitating the widespread implementation of EVs across numerous applications. Accordingly, the development of new materials for various components of Li-ion batteries is the focus of research in the field of materials science. Li-ion batteries power most modern portable devices and seem to have overcome psychological barriers of the consuming public against the use of such high energy density devices on a larger scale for more demanding applications, such as EVs.

Regarding operation, in Li-ion batteries, Li ions (Li+) migrate from the negative electrode, also referred to as the anode, through an electrolyte, which can be in any one or more of a liquid phase or a gel phase, to the positive electrode during discharge cycles and return during charging cycles. Conventional Li-ion batteries can use an intercalated Li compound as a formative material at the positive electrode and graphite at the negative electrode. Such batteries can be characterized by their relatively high energy density measured as a specific capacity having the units of milliamp hours per gram (mAh/g), no "memory-effect"—describing the situation in which nickel-cadmium batteries gradually lose their maximum energy capacity if they are repeatedly recharged after being only partially discharged—and low self-discharge. Unfortunately, unlike many non-Li conventional battery chemistries, Li ion batteries can, due to the highly reactive nature of elemental and ionic Li, present a safety hazard. Li batteries can deteriorate unexpectedly, including through explosions and fires, upon puncture, abrasive contact, or even excessively charged. In spite of such drawbacks, the high energy density of Li ion batteries remains attractive as it permits for longer usable lifespans of several hours between charging cycles as well as longer cycle life, referring to the electric current delivery or output performance of a given Li-ion battery over multiple repeat charge-discharge, such as partial or total charge depletion, cycles.

Overall, Li metal, due to its high theoretical specific capacity of 3,860 mAh/g, low density (0.59 g cm-3) and low negative electrochemical potential, such as −3.040 V compared to a standard hydrogen electrode, still appears as an ideal material for the negative electrode of secondary Li-ion batteries. But problems continue to persist, such as dendrite growth, referring the growth of a branching tree-like structure within the battery itself, which can be caused by Li precipitates. Dendrites, upon growing from one electrode to contact the other, can cause serious safety concerns related to short-circuits, and limited Coulombic efficiency, discussing to the charge efficiency by which electrons are transferred in batteries during deposition and stripping operations inherent in Li-ion batteries. Such challenges have previously impeded Li ion battery applications.

Concerns related to safety of earlier-developed Li secondary batteries have led to the development and refinement of current generation Li-ion secondary batteries. Such Li-ion batteries typically feature carbonaceous materials used as an anode, such carbonaceous anode materials including:

graphite;

amorphous carbon; and, graphitized carbon.

The first type of the three carbonaceous materials presented above includes naturally occurring graphite and synthetic graphite or artificial graphite, such as Highly Oriented Pyrolytic Graphite, HOPG. Either form of graphite can be intercalated with Li, such as that obtained from a molten Li metal source. The resulting Graphite Intercalation Compound (GIC) may be expressed as $Li_xC_6$, where X is typically less than 1. To limit or otherwise minimize loss in energy density due to the replacement of Li metal with the GIC, X in $Li_xC_6$ must be maximized and the irreversible capacity loss ($Q_{ir}$), in the first charge of the battery must be minimized.

As a result, the maximum amount of Li that can be reversibly intercalated into the interstices between graphene planes of a perfect graphite crystal is generally believed to occur in a graphite intercalation compound represented by $Li_xC_6$ (x=1), corresponding to a theoretical 372 mAh/g. However, such a limited specific capacity cannot adequately satisfy the demanding requirements of higher energy-density power needs of modern electronics and EVs. Accordingly, carbon-based anodes, such as graphite intercalated with Li, can demonstrate extended cycle lifespans due to the presence of a surface-electrolyte interface layer (SEI), which results from the reaction between Li and surrounding electrolyte, or between Li and the anode surface/edge atoms or functional groups, during the initial several charge-discharge cycles. Li ions consumed in this reaction, referring to the formation of the SEI, may be derived from some of the Li ions originally intended for charge transfer, referring to a process of the dissociation of elemental Li when intercalated with carbon in a carbon-based structure, such as within the anode.

Charge transfer can occur during Li ion movement in electrolyte across a porous separator to the cathode as related to electron release and transport to facilitate electric current conduction to power a load during typical Li ion battery discharge cycles. During repeated Li ion battery charge-discharge cycles, the SEI is formed and some of the Li ions migrating through the electrolyte become part of the inert SEI layer and are described as becoming "irreversible", in that they can no longer be an active element or ion used for charge transfer. As a result, it is desirable to minimize the amount of Li used for the formation of an effective SEI layer. In addition to SEI formation, $Q_{ir}$, has been attributed to graphite exfoliation caused by electrolyte/solvent co-intercalation and other side reactions.

Next, amorphous carbon contains no, or very little, micro- or nano-crystallites and can include both "soft carbon" and "hard carbon". Soft carbon refers to a carbon material that can be graphitized at a temperature of about 2,500° C. or higher. In contrast, hard carbon refers to a carbon material that cannot be graphitized at a temperature higher than 2,500° C. In practice and industry, the so-called "amorphous carbons" commonly used as anode active materials may not be purely amorphous, but rather contain some minute amount of micro- or nano-crystallites, each crystallite being defined as a small number of graphene sheets oriented as basal planes that are stacked and bonded together by weak van der Waals forces. The number of graphene sheets can vary between one and several hundreds, giving rise to a c-directional dimension, such as thickness $L_c$, of typically 0.34 nm to 100 nm. The length or width ($L_a$) of these crystallites is typically between tens of nanometers to microns. Among this class of carbon materials, soft and hard carbons can be produced by low-temperature pyrolysis (550-1,000° C.) and exhibit a reversible specific capacity of 400-800 mAh/g in the 0-2.5 V range. A so-called "house-of-cards" carbonaceous material has been produced with enhanced specific capacities approaching 700 mAh/g.

Research groups have obtained enhanced specific capacities of up to 700 mAh/g by milling graphite, coke, or carbon fibers and have explained the origin of the additional specific capacity with the assumption that in disordered carbon containing some dispersed graphene sheets, referred to as "house-of-cards" materials, Li ions are adsorbed on two sides of a single graphene sheet. It has been also proposed that Li readily bonds to a proton-passivated carbon, resulting in a series of edge-oriented Li to C—H bonds. This can provide an additional source of Li+ in some disordered carbons. Other research suggested the formation of Li metal monolayers on the outer graphene sheets of graphite nano-crystallites. The discussed amorphous carbons were prepared by pyrolyzing epoxy resins and may be referred to as polymeric carbons. Polymeric carbon-based anode materials have also been studied.

Chemistry, performance, cost, and safety characteristics may vary across Li ion battery variants. Handheld electronics may use Li polymer batteries using a polymer gel as electrolyte with Li cobalt oxide (LiCoO$_2$) as cathode material. Such a configuration can offer relatively high energy density but may present safety risks, especially when damaged. Li iron phosphate (LiFePO$_4$), Li ion manganese oxide battery (LiMn$_2$O$_4$, Li$_2$MnO$_3$, or LMO), and Li nickel manganese cobalt oxide (LiNiMnCoO$_2$ or NMC) all offer lower energy density yet provide longer useful lives and less likelihood of fire or explosion. Thus, such batteries are widely used for electric tools, medical equipment, and other roles. NMC in particular is often considered for automotive applications.

Lithium Sulfur (Li S) Batteries Featuring Expansion-Tolerant 3D Architectures

The lithium sulfur battery, referred to herein as a Li S battery, is a type of rechargeable battery, notable for its high specific energy. The relatively low atomic weight of Li and moderate atomic weight of S results in Li S batteries being relatively light, at about the density of water).

Li S batteries may succeed Li ion cells because of their higher energy density and reduced cost due to the use of sulfur. Li S batteries can offer specific energies at approximately 500 Wh/kg, which is significantly better than many conventional Li-ion batteries, which are typically in the range of 150-250 Wh/kg. Li—S batteries with up to 1,500 charge and discharge cycles have been demonstrated. Although presenting many advantages, a key challenge faced by the Li S battery is the polysulfide "shuttle" effect that results in progressive leakage of active material from the cathode resulting in an overall low life cycle of the battery. And, the extremely low electrical conductivity of a sulfur cathode requires an extra mass for a conducting agent to exploit the whole contribution of active mass to the capacity. Large volumetric expansion of S cathode from elemental S to Li$_2$S and a large amount of electrolyte needed are also problem areas demanding attention.

Chemical processes in the Li—S cell include Li dissolution from the anode surface and incorporation into alkali metal polysulfide salts during discharge, and reverse lithium plating to the anode while charging. At the anodic surface, dissolution of the metallic lithium occurs, with the production of electrons and lithium ions during the discharge and electrodeposition during the charge. The half-reaction is expressed as:

$$\text{Li} \rightleftharpoons \text{Li}^+ + e^- \quad \text{(Eq. 1)}$$

Similar to that observed in Li ion batteries, dissolution and/or electrodeposition reactions can cause, over time, problems of unstable growth of the solid-electrolyte interface (SEI), generating active sites for the nucleation and dendritic growth of Li. Dendritic growth is responsible for the internal short circuit in Li batteries and leads to the death of the battery itself.

In Li—S batteries, energy is stored in the sulfur electrode (S$_8$), which is the cathode. During cell discharge cycles, Li ions in the electrolyte migrate from the anode to the cathode where the S is reduced to lithium sulphide (Li$_2$S). The sulfur is reoxidized to S$_8$ during the refilling phase. The semi-reaction is expressed at a high level of abstraction, for explanatory purposes, as:

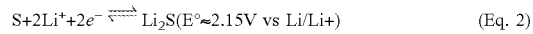

$$S + 2Li^+ + 2e^- \rightleftharpoons Li_2S(E° \approx 2.15V \text{ vs } Li/Li+) \quad \text{(Eq. 2)}$$

In reality, the S reduction reaction to Li$_2$S is significantly more complex and involves the formation of several Li polysulphides (Li$_2$S$_x$, 8<x<1) at decreasing chain length according to the order:

$$Li_2S_8 \rightarrow Li_2S_6 \rightarrow Li_2S_4 \rightarrow Li_2S_2 \rightarrow Li_2S \quad \text{(Eq. 3)}$$

The final product is a mixture of Li$_2$S$_2$ and Li$_2$S rather than just pure Li$_2$S, due to the slow reduction kinetics at Li$_2$S. This is in contrast with conventional Li ion cells, where the Li ions are intercalated in both of the anode and the cathode. For example, in Li S battery systems, each S atom can host two Li ions. Typically, Li ion batteries can accommodate only 0.5-0.7 lithium ions per host atom. As a result, Li—S allows for a much higher Li storage density. Polysulfides (PS) are reduced on the cathode surface in sequence while the cell is discharging:

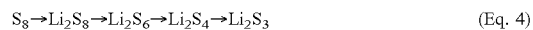

$$S_8 \rightarrow Li_2S_8 \rightarrow Li_2S_6 \rightarrow Li_2S_4 \rightarrow Li_2S_3 \quad \text{(Eq. 4)}$$

Across a porous diffusion separator, S polymers form at the cathode as the cell charges:

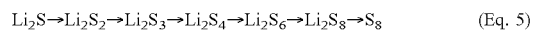

$$Li_2S \rightarrow Li_2S_2 \rightarrow Li_2S_3 \rightarrow Li_2S_4 \rightarrow Li_2S_6 \rightarrow Li_2S_8 \rightarrow S_8 \quad \text{(Eq. 5)}$$

These reactions can analogous to those in the sodium (Na)—S battery.

Primary challenges concerning Li S battery systems include the relatively low conductivity of S, its massive volume change upon discharging, and finding a suitable cathode, such as that constructed from any of the presently disclosed carbon-based structures, is the first step for commercialization of Li S batteries. Currently, conventional Li S batteries use a carbon and S cathode and a Li anode. Sulfur (S) is naturally abundant and relatively low cost, but has practically no electroconductivity, $5 \times 10^{-30}$ S·cm−1 at 25° C. A carbon coating provides the missing electroconductivity. Carbon nanofibers provide an effective electron conduction path and structural integrity, at the disadvantage of higher cost.

One problem with the Li S design is that when the S in the cathode absorbs Li, volume expansion of the $Li_xS$ compositions takes place, and predicted volume expansion of $Li_2S$ is nearly 80% of the volume of the original S. This causes large mechanical stresses on the cathode, which is a major cause of rapid degradation. Such process reduces the contact between the carbon (C), the S and prevents the flow of Li ions to the carbon surface.

To address such issues related to unwanted volumetric expansion of the cathode during cyclical charge-discharge cycles of Li S cells, disclosed are stable, reversible Li-based, battery electrode architectures, also referred to as expansion-tolerant conductive three-dimensional (3D) carbon host electrode architectures, such as that able to be defined by any one or more of the carbon particles, aggregates and/or the like shown in FIGS. 3B-3E. Effective management of the described volume expansion and related interface resistance during Li ion insertion/de-insertion in cycling Li S electrode operation occurs through the uniquely defined micro- and meso-porous channels or pathways, such as those defined by contiguous microstructures 107E shown in FIG. 1E, which are uniquely developed to micro-confine S to guard against both PS shuttle and unwanted volumetric expansion due to the formation of long-chain PS. Unique 3D carbon scaffolds that are defined by the contiguous microstructures 107E feature unique architectures, pore sizes and volumes, along with electrical conductivity, of the interconnecting contiguous microstructures 107E, that can be tuned to optimize reaction surface area, ion accessibility through mesoporous channels while also accommodating stresses and strains during cycling.

Figure 1C:

To create such an expansion-tolerant carbon-based electrode (such as a cathode suitable for Li and/or S infiltration) architecture:

active components, such as Li, or S in the case of S-loaded cathodes, are isolated or confined primarily to local reaction sites on the carbon scaffold, such as by being intercalated or confined to mesopores having a dimension of approximately less than 10 microns, without creating continuous or interconnecting solid networks between the localized sites of electroactive, such as Li, material, such as those potentially contributing to the formation of Li-based dendrites or dendritic structures that can contribute to a battery short circuit, engineered failure points can be incorporated into the scaffold structure, such as any one or more of the carbon-based aggregate and/or agglomerate structures shown in FIGS. 1A-1E, during fabrication that relaxes or collapses during initial electrode activation, such as in-situ, to create a more robust (such as stronger and/or more resilient) structure with and increasing number of cycles, use of interconnected graphene sheets, such as interconnected 3D agglomerations 101B of multiple layers of graphene sheets 101C and/or single layer graphene as schematically depicted in FIG. 1C, that are fused together to form the open porous scaffold 102A, with high modulus, to create a 3D hierarchical micro- and/or meso-porous compliant cellular architecture or scaffold that structurally relaxes with the imposition of stresses and/or strains from volume expansion during cyclical Li S battery operation.

Along with an expansion-tolerant, compliant 3D host carbon electrode structure is the activation or chemical modification/doping of the carbon surface to promote enhanced chemical adsorption or entrapment and corresponding electron transfer between the carbon host scaffold and the active material, such as Li or S. Doping with atoms, such as C or O, have not only increased the adsorption, inclusive of binding, to Li and Li PS species, but also enhance electron transfer across the exposed carbon surface to electrolyte interface (such as a solid-electrolyte interface, "SEI") as well increase the conductivity in a parent carbon phase of the contiguous microstructures 107E in the case of nitrogen. For a S cathode, a doped carbon structure provides a low resistance interface to the PS active material that is stable after repeated long term cycling.

Also, mechanical properties of the lithiated S compounds are strongly contingent on the Li content, and with increasing Li content, the strength of lithiated S compounds improves, although this increment is not linear with Li. One of the primary shortfalls of most Li S cells concerns unwanted reactions with the electrolyte. While S and $Li_2S$ are relatively insoluble in most electrolytes, many intermediate polysulfides (PS) are not such that dissolving $Li_2S_n$. into the electrolyte can cause irreversible loss of active S. Use of highly reactive Li as a negative electrode causes dissociation of most of the commonly used other type electrolytes. Use of a protective layer in the anode surface has been studied to improve cell safety, such as using Teflon coating showed improvement in the electrolyte stability, LIPON, $Li_3N$ also exhibited promising performance.

The shuttle effect has been observed to be the primary cause of degradation in a Li S battery. The Li PS $Li_2S_x$ ($6 \leq x \leq 8$) is highly soluble in the common electrolytes used for Li S batteries. They are formed and leaked from the cathode and they diffuse to the anode, where they are reduced to short-chain PS and diffuse back to the cathode where long-chain PS is formed again. This process results in the continuous leakage of active material from the cathode, lithium corrosion, low coulombic efficiency, and low battery life due to battery self-discharge. Moreover, the "shuttle" effect is responsible for the characteristic self-discharge of Li S batteries, because of slow dissolution of PS, which occurs also in rest state. The shuttle effect in Li—S battery can be quantified by a factor $f_c$ ($0 < f_c < 1$), evaluated by the extension of the charge voltage plateau. The factor $f_c$ is given by the expression:

$$fc = \frac{k_s q_{up} [S_{tot}]}{I_c} \quad \text{(Eq. 6)}$$

where $k_s$, $q_{up}$, $[S_{tot}]$ and $I_c$ are respectively the kinetic constant, specific capacity contributing to the anodic plateau, the total sulfur concentration and charge current.

Sulfur Cathodes—Cathode Design Criteria

Generally, the active material of a Li S cathode includes elemental S, carbon materials, and binders (although not necessarily always required in the disclosed implementations). Aqueous slurries of these components can be coated onto a current collector in a reel-to-reel coating process, and solvents can be removed by drying to leave behind only active components. Dry layer thicknesses can be in the range of 20-200 µm. Similar to Li ion battery cathodes, S cathodes can employ thin aluminum (Al) foils having an approximate thickness in the range of 10-20 µm as a current collector, and as a substrate of the active material layer. Primer coatings, based on carbon-filled polymer films, can be applied on the current collector prior to coating the active materials to enhance adhesion or decrease interface resistance to the active layer.

Due to the low electrical conductivity of S and the related discharge products (such as Li PS), the conductive carbon materials are key components within an active cathode layer. Carbons are typically applied in fractions of 20-50% wt % within the cathode composition. Particulate carbon materials, such as any one or more of the carbon-based structures disclosed herein and/or incorporating the contiguous microstructures 107E shown in FIG. 1E, can be added directly to the cathode slurry, or provided as a composite by premixing carbons with S. Polymer binders, in some examples, can be added in fractions of 3-20 wt % to enhance adhesion and cohesion of the layer. The S fraction is typically in a range of 46-75%.

Figure 1A:
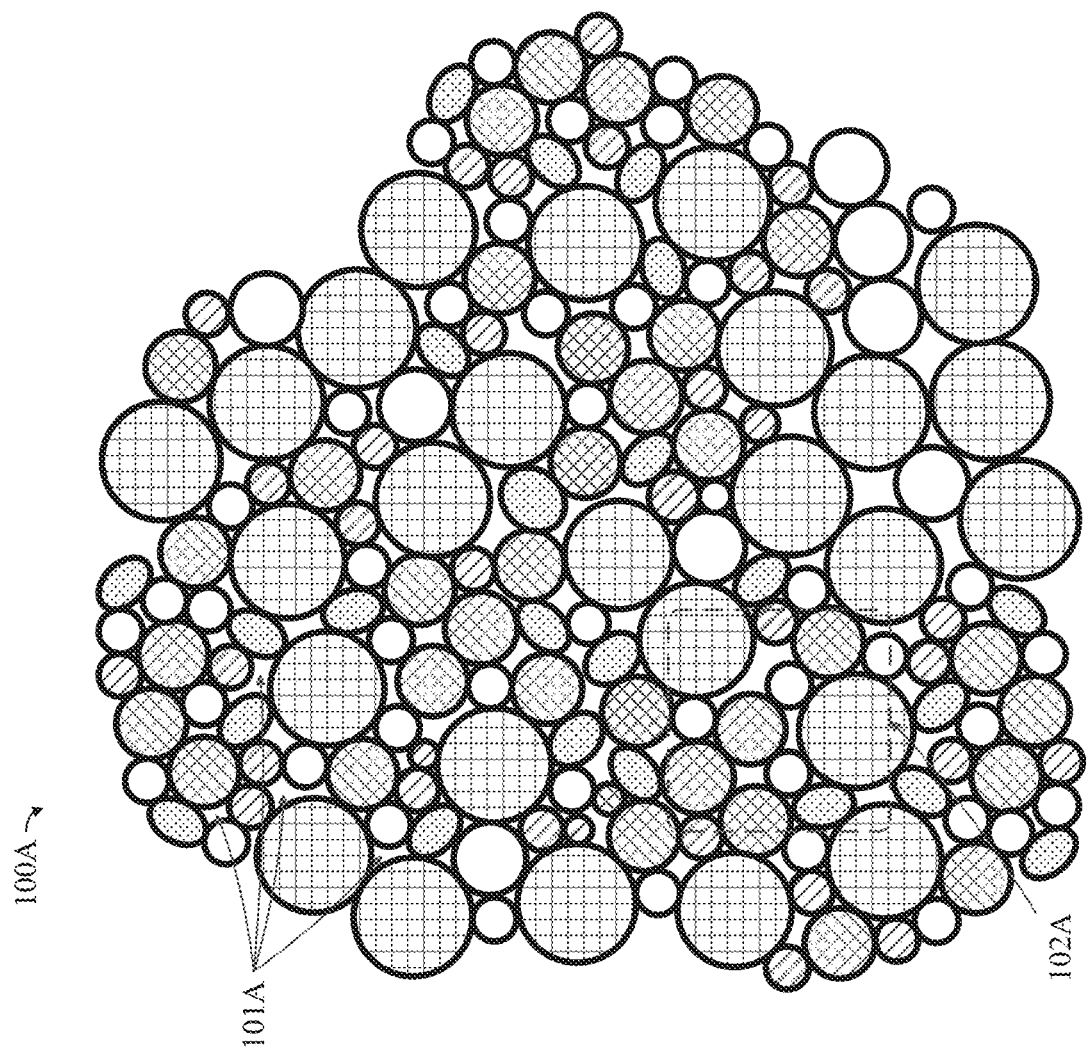
Figure 1E:
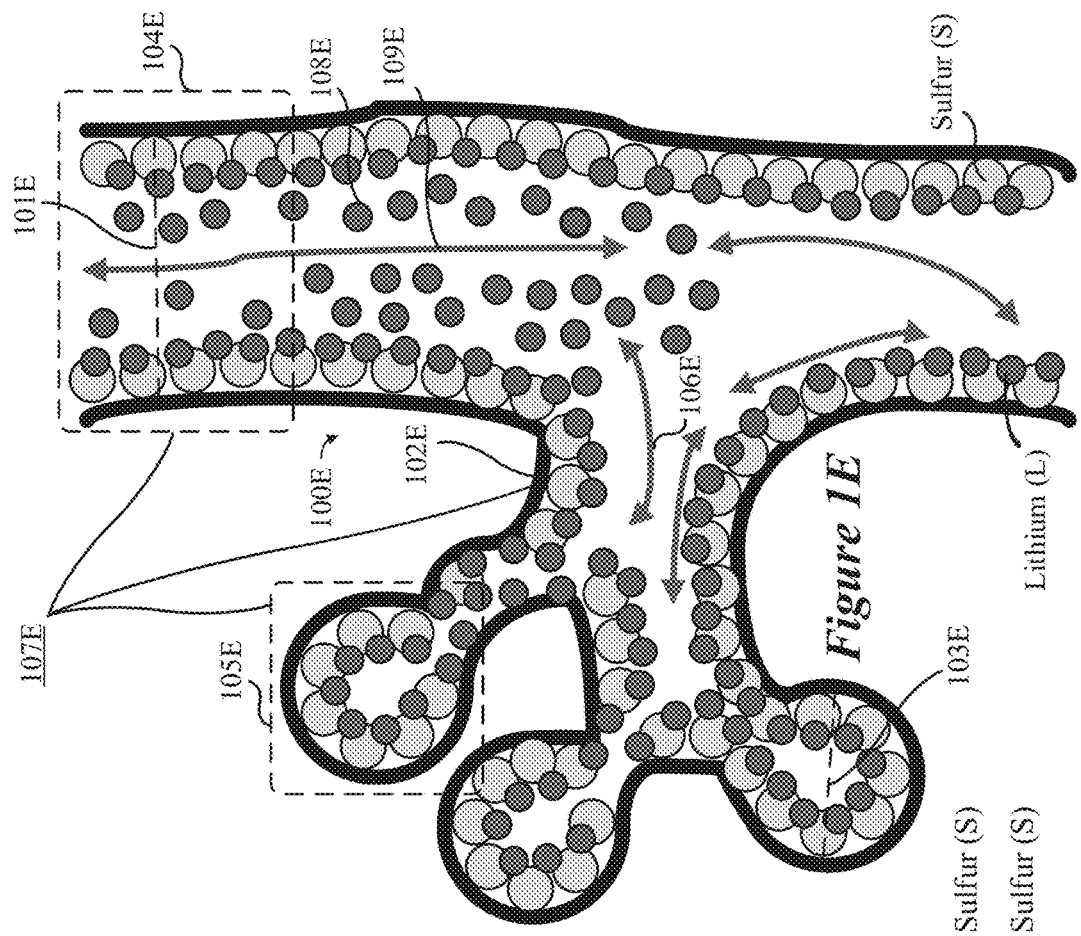

In S and carbon inclusive composite cathodes, carbon materials can fulfil multiple roles, including:
- the electrochemical conversion of S species takes place through charge transfer at the conductive carbon surface;
- the carbon materials, supported by the binder, form a porous and conductive scaffold providing free volume for the uptake of S and electrolyte;
- carbon-based scaffolds, inclusive of those disclosed herein featuring the contiguous microstructures of 107E shown in FIG. 1E and/or any one or more of the carbons and/or carbon-based structures shown in FIGS. 3B-3E, can be configured with expansion-tolerant architecture (as substantially discussed earlier) to provide mechanical stability to withstand volume changes as well as dissolution and precipitation reactions of S species during charging and discharging of Li S battery cells; and
- through its morphology or chemical surface properties, the carbon binder scaffold further affects the PS retention hindering the mass transport of PS to the anode.

Electrical Conductance of Carbon-Based Materials

Advances in high conductance carbon materials such as carbon nanotubes (CNT), graphene, amorphous carbon, and/or crystalline graphite in electronics allows for the printing of these materials onto many types of surfaces without requiring usage of printed circuit boards, and without the use of materials or compounds that have been identified as being toxic to humans. Usage of high conductance carbon as a feedstock material or other material during any one or more of the additive manufacturing processes described above may facilitate the fabrication of batteries with micro-lattice structures suitable for enhanced functionality, electric power storage and delivery, and optimal efficiency. Although many of the devices described may serve as power sources such as batteries or capacitors, those of skill in the art will appreciate that printing technologies, such as 3D printing, may be configured using high conductance carbon materials such as carbon nanotubes (CNT), graphene, amorphous carbon, or crystalline graphite to form other electronic devices.

Printing technologies using high conductance carbon materials such as carbon nanotubes (CNT), graphene, amorphous carbon, or crystalline graphite may be implemented and/or otherwise incorporated in the fabrication of the following devices: antennas, tuned antennas, sensors, biosensors, energy harvesters, photocells, and other electronic devices.

Graphene

Graphene is an allotrope of carbon in the form of a single layer of atoms in a two-dimensional hexagonal lattice in which one atom forms each vertex. It is the basic structural element of other allotropes, including graphite, charcoal, carbon nanotubes and fullerenes. It can also be considered as an indefinitely large aromatic molecule, the ultimate case of the family of flat polycyclic aromatic hydrocarbons.

Graphene has a special set of properties which set it apart from other elements. In proportion to its thickness, it is about 100 times stronger than the strongest steel. Yet its density is dramatically lower than any other steel, with a surfacic, such as surface-related, mass of 0.763 mg per square meter. It conducts heat and electricity very efficiently and is nearly transparent. Graphene also shows a large and nonlinear diamagnetism, even greater than graphite and can be levitated by Nd—Fe—B magnets. Researchers have identified the bipolar transistor effect, ballistic transport of charges and large quantum oscillations in the material. Its end-use application areas are widespread, finding unique implementations in advanced materials and composites, as well as being used as a formative material to construct ornate scaffolds usable in Li ion battery electrodes to enhance ion transport and electric current conduction to yield specific capacity and power delivery figures not otherwise attainable by conventional battery technologies.

Chemical Functionalization of Graphene

Functionalization implies the process of adding new functions, features, capabilities, or properties to a material or substance by altering the surface chemistry of the material. Functionalization is used throughout chemistry, materials science, biological engineering, textile engineering, and nanotechnology and may be performed by attaching molecules or nanoparticles to the surface of a material, with a chemical bond or through adsorption, the adhesion of atoms, ions or molecules from a gas, liquid or dissolved solid to a surface to create a film of the adsorbate on the surface of the adsorbent without forming a covalent or ionic bond thereto.

Functionalization and dispersion of graphene sheets may be of critical importance to their respective end-use applications. Chemical functionalization of graphene enables the material to be processed by solvent-assisted techniques, such as layer-by-layer assembly, spin-coating, and filtration and also prevents the agglomeration of single layer graphene (SLG) during reduction and maintains the inherent properties of graphene. Currently, the functionalization of graphene may be performed by covalent and noncovalent modification techniques. In both instances, surface modification of graphene oxide followed by reduction has been carried out to obtain functionalized graphene. It has been found that both the covalent and noncovalent modification techniques are very effective in the preparation of processable graphene.

However, electrical conductivity of functionalized graphene has been observed to decrease significantly compared to pure graphene. Moreover, the surface area of the functionalized graphene prepared by covalent and non-covalent techniques decreases significantly due to the destructive chemical oxidation of flake graphite followed by sonication, functionalization, and chemical reduction. To overcome these problems, studies have been reported on the preparation of functionalized graphene directly from graphite in a one-step process. In all these cases, surface modification of graphene can prevent agglomeration and facilitates the formation of stable dispersions. Surface modified graphene can be used for the fabrication of polymer nanocomposites, Li ion battery electrodes, super-capacitor devices, drug delivery system, solar cells, memory devices, transistor device, biosensor, etc.

Oxidation-Reduction (Redox) Reactions

Redox are a type of chemical reaction in which the oxidation states of atoms are changed. Redox reactions are characterized by the transfer of electrons between chemical species, most often with one species, the reducing agent, undergoing oxidation by losing electrons while another species, such as the oxidizing agent, undergoes reduction by gains electrons. The chemical species from which the electron is stripped is said to have been oxidized, while the chemical species to which the electron is added is said to have been reduced.

Intercalation

Intercalation implies the reversible inclusion or insertion of a molecule, or ion, into materials with layered structures. Examples are found in graphite, graphene, and transition metal dichalcogenides.

Li Intercalation into Bi— or Multi-Layer Graphene

Electrical storage capacity of graphene and the Li-storage process in graphite currently present challenges requiring further development in the field of Li ion batteries. Efforts have therefore been undertaken to further develop three-dimensional bi-layer graphene foam with few defects and a predominant Bernal stacking configuration, a type of bilayer graphene where half of the atoms lie directly over the center of a hexagon in the lower graphene sheet, and half of the atoms lie over an atom, and to investigate its Li-storage capacity, process, kinetics, and resistances. Li atoms may be stored only in the graphene interlayer. Further, various physiochemical characterizations of the staged Li bilayer graphene products further reveal the regular Li-intercalation phenomena and illustrate this Li storage pattern of two-dimensions.

Overview

Introduction

Technological advances concerning modern carbon-based materials such as graphene have, in turn, enhanced applications of such materials in many end-use areas, such as in advanced secondary batteries. Such batteries can employ electrochemical Li intercalation or de-intercalation to take advantage of favorable properties of carbon and carbon-based materials, which can depend significantly on their respective morphology, crystallinity, orientation of crystallites, and defects as well. For instance, the electric storage capacity of a Li-ion battery can be enhanced by the selection and integration of desirable nano-structured carbon materials such as carbon in certain allotropes such as graphite and graphene, or nano-sized graphite, nanofibers, isolated single walled carbon nanotubes, nano-balls, and nano-sized amorphous carbon, each having small carbon nanostructures in which no dimension is greater than about 2 µm.

Known methods for fabricating carbon and Li-ion electrodes for rechargeable Li cells include steps for forming a carbon electrode. Such a carbon electrode can be composed of graphitic carbon particles adhered to each other by an ethylene propylene diene monomer binder used to achieve a carbon electrode capable of subsequent intercalation by Li-ions. The carbon electrode is then reacted with infiltrated lithium (Li) metal to incorporate Li-ions obtained therefrom into graphitic carbon particles of the electrode. A voltage can be repeatedly applied to the carbon electrode to initially cause a surface reaction between the Li-ions and to the carbon and subsequently cause intercalation of the Li-ions into crystalline layers of the graphitic carbon particles. With repeated application of the voltage, intercalation can be achieved to near a theoretical maximum and assist in the conduction of electrical current as may be desirable.

Other exfoliated graphite-based hybrid material compositions relate to:

micron- or nanometer-scaled particles or coating which are capable of absorbing and desorbing alkali or alkaline metal ions, particularly, Li ions; and, exfoliated graphite flakes that are substantially interconnected to form a porous, conductive graphite network including pores defined therein.

The particles or coating resides in a pore of the network or is attached to a flake of the network. The exfoliated graphite amount is in the range of 5% to 90% by weight and the number of particles or amount of coating is in the range of 95% to 10% by weight.

Also, high capacity silicon-based anode active materials have been shown to be effective in combination with high capacity Li rich cathode active materials. Supplemental Li is shown to improve the cycling performance and reduce irreversible capacity loss for some silicon based active materials. Silicon based active materials can be formed in composites with electrically conductive coatings, such as pyrolytic carbon coatings or metal coatings, and composites can also be formed with other electrically conductive carbon components, such as carbon nano fibers and carbon nanoparticles.

And, known rechargeable batteries of an alkali metal having an organic electrolyte experiences little capacity loss upon intercalation of the carbonaceous electrode with the alkali metal. The carbonaceous electrode may include a multi-phase composition including both highly graphitized and less graphitized phases or may include a single phase, highly graphitized composition subjected to intercalation of Li at above about 50° C. Incorporation of an electrically conductive filamentary material such as carbon black intimately interspersed with the carbonaceous composition minimizes capacity loss upon repeated cycling.

Otherwise, a known Li based anode material can be characterized by including 1 $m^2/g$ or more of carbonaceous anode active material specific surface area, a styrene-butadiene rubber binder, and a fiber diameter formed to 1,000 nanometers of carbon fiber. Such anode materials are used for Li batteries, which have desirable characteristics, such as a low electrode resistance, high strength of the electrode, an electrolytic solution having excellent permeability, high energy density and a high rate charge/discharge. The negative electrode material contains 0.05 to 20 mass % of carbon fibers and a styrene at 0.1 to 6.0% by mass. Butadiene rubber forms the binder and may further contain 0.3 to 3% by mass thickener, such as carboxymethyl methylcellulose.

Existing technologies have been shown that relate to a battery that has an anode active material that has been:

pre-lithiated; and, pre-pulverized.

Such an anode may be prepared with a method that comprises:

providing an anode active material;

intercalating or absorbing a desired amount of Li into the anode active material to produce a pre-lithiated anode active material;

comminuting, referring to the reduction of solid materials from one average particle size to a smaller average particle size, by crushing, grinding, cutting, vibrating, or other processes, the pre-lithiated anode active material into fine particles with an average size less than 10 µm, preferably <1 µm and most preferably <200 nm; and, combining multiple fine particles of the pre-lithiated anode active material with a conductive additive and/or a binder material to form the anode.

The pre-lithiated particles are protected by a Li ion-conducting matrix or coating material. The matrix material is reinforced with nano graphene platelets.

Graphitic nanofibers have also been disclosed and include tubular fullerenes, commonly called "buckytubes", nano tubes and fibrils, which are functionalized by chemical substitution, are used as electrodes in electrochemical capacitors. The graphitic nanofiber-based electrode increases the performance of the electrochemical capacitors. Preferred nanofibers have a surface area greater than about 200 m²/gm and are substantially free of micropores.

And, known high surface area carbon nanofibers have an outer surface on which a porous high surface area layer is formed. Methods of making the high surface area carbon nanofiber include pyrolizing a polymeric coating substance provided on the outer surface of the carbon nanofiber at a temperature below the temperature at which the polymeric coating substance melts. The polymeric coating substance used as the high surface area around the carbon nanofiber may include phenolics such as formaldehyde, polyacrylonitrile, styrene, divinyl benzene, cellulosic polymers and cyclotrimerized diethynyl benzene. The high surface area polymer which covers the carbon nanofiber may be functionalized with one or more functional groups.

Synthesis of the Presently Disclosed Carbons

As presented above, conventional Li-intercalated carbon-based compositions or compounds may include traditional battery electrode materials such as:

graphene or multi-layer 3D graphene particles;
electrically conductive carbon particles; and,
binder, such as that provided as a fluid, such as a liquid, form and/or in particulate form, configured to retain carbon-based particle in their respective desired positions and to provide overall structural integrity to carbon-based systems.

In conventional techniques, particles are all typically deposited, such as being dropped into, existing slurry cast electrodes including current collectors made from metal foil such as copper. Slurry typically is prepared to contain an organic binder or binder material referred to as NMP, an organic compound consisting of a 5-membered lactam, used in the petrochemical and plastics industries as a solvent, exploiting its nonvolatility and ability to dissolve diverse materials. The ratio of active materials to conductive carbon or carbon-based particles is usually at 5 parts of conductive carbon to a predominant balance of active material with a nominal quantity of binder or binding material, such as NMP, included as well. The relative amounts of binder and conductive phases of carbon may be dictated by creating an electrically conductive path or paths between larger particles of those mentioned.

Regarding difficulties related to binder implementation and usage in secondary batteries, studies have shown that developing high-performance battery systems requires the optimization of every battery component, from electrodes and electrolyte to binder systems. However, the conventional strategy to fabricate battery electrodes by casting a mixture of active materials, a nonconductive polymer binder, and a conductive additive onto a metal foil current collector usually leads to electronic or ionic bottlenecks and poor contacts due to the randomly distributed conductive phases, which can be an issue that can be observed in either the anode or the cathode.

And, when high-capacity electrode materials are employed, the high stress generated during electrochemical reactions can disrupt the mechanical integrity of traditional binder systems, resulting in decreased cycle life of batteries. Thus, there is a critical need to design novel and robust binder systems, or scaffolded carbon-based electrode structures that demonstrate structural integrity absent of usage of a binder, that can provide reliable, low-resistance, and continuous internal voids, micropores, and pathways to retain active material when and where desirable during battery charge-discharge cycles, and to connect all regions of the electrode.

In contrast to that traditionally done, and to address shortcomings of binder performance related to decreased cycle life of batteries, the presently disclosed inventive compositions of matter and methods or processes for the production thereof can eliminate:

any and all forms of a binder phase; and,
potentially certain regions, features and/or aspects of a conductive phase defined by larger carbon-based particles, such as those including graphite, and/or forms of graphene extracted or otherwise created from the exfoliation of graphite.

This is done by fabricating a particle where interconnected 3D agglomerations of multiple layers of graphene sheets fuse or sinter together, such as randomly, or with controlled directionality such as orthogonally, or otherwise adjoin together to serve as a type of intrinsic, self-supporting, "binder" or joining material that serves as a binder replacement, effectively allowing for the elimination of a separate traditional binder material to achieve substantial weight reduction. Such a format also permits for the elimination of a separate and dedicated current collector, which is typically a required component of many batteries. Elimination of the binder phase and/or the current collector, provide for beneficial and desirable features, such as:

having low per-unit production cost allowing for mass-producibility,
high reversible specific capacity,
low irreversible capacity,
small particle sizes, such as permitting for high through-put/rate capacity,
compatibility with commonly used electrolytes for convenient integration and usage in commercial battery applications, and
long charge-discharge cycle life for consumer benefit, across any number of demanding end-use applications, including automobiles, airplanes, and spacecraft.

Notably, techniques disclosed herein yield unexpected favorable results. They do not require traditional processes to create graphene sheets such as from the exfoliation of graphite, and instead synthesize one or more a multi-modal carbon-based s from an atmospheric plasma-based vapor flow stream. Synthesis of carbon-based particles can occur either in-flight to nucleate from an initially formed carbon-based homogenous nucleation or during deposition directly onto a supporting or sacrificial substrate. Therefore, any one or more of the presently disclosed techniques permit for the growth of ornate carbon-based structures independent of a traditionally required seed particle upon which nucleation occurs.

In conventional techniques, the production of functional graphene relies upon usage of graphite as a starting material. Graphite, being a conductive material, has been used as an electrode in batteries and other electrochemical devices. In addition to its function as an inert electrode, electrochemical methods have been employed to form graphite intercalation compounds (GICs) and, more recently, to exfoliate graphite into few-layered graphene. Exfoliation, as generally understood and as referred to herein, implies—in an intercalation chemistry related context—the complete separation of layers of material, and typically requires aggressive conditions involving highly polar solvents and aggressive reagents. Electrochemical methods are attractive as they eliminate the use of chemical oxidants as the driving force for intercalation or exfoliation, and an electromotive force is controllable for tunable GICs. More importantly, the extensive capabilities of electrochemical functionalization and modification enable the facile synthesis of functional graphene and its value-added nanohybrids.

Unlike exfoliation, inclusive of the thermal exfoliation of graphite to produce graphene, the presently disclosed methods relate to one or more carbon-inclusive gaseous species, such as those including methane ($CH_4$), being flowed into a reaction chamber of a microwave-based or thermal reactor. Upon receipt of energy, such as that provided by electromagnetic radiation and/or thermal energy, incoming gaseous species spontaneously crack to form allotropes with other cracked carbons from additional gaseous species supplied into the reactor to create an initial carbon-based site such as a formed particle, which either has or otherwise facilitates:

additional particles that grow or nucleate off of defects from that initial formed particle;

or, orthogonally fusing or sintering additional carbon-based particles, where there is sufficient local energy at the collision spot for the colliding particles to combine.

System Structure

Carbon-Based Particles—in Detail

FIG. 1A shows a carbon-based particle 100A having controllable electrical and ionic conducting gradients therein, within which various aspects of the subject matter disclosed herein may be implemented. The carbon-based particle 100A can be synthesized through self-assembly independent of a binder to feature multi-modal dimensions, including various orifices, conduits, voids, pathways, conduits, or the like, any one or more defined to have a specific dimension, such as being mesoporous. A mesoporous material implies a material containing pores with diameters between 2 and 50 nm, according to IUPAC nomenclature. For the purposes of comparison, IUPAC defines microporous material as a material having pores smaller than 2 nm in diameter and macroporous material as a material having pores larger than 50 nm in diameter.

Mesoporous materials may include various types of silica and alumina that have similarly sized mesopores. Mesoporous oxides of niobium, tantalum, titanium, zirconium, cerium, and tin have been researched and reported. Of all the variants of mesoporous materials, mesoporous carbon, such as carbons and carbon-based materials have voids, orifices, pathways, conduits or the like having at least one mesoporous dimension, has achieved particular prominence, having direct applications in energy storage devices. Mesoporous carbon can be defined as having porosity within the mesopore range, and this significantly increases the specific surface area. Another common mesoporous material is activated carbon, referring to a form of carbon processed to have small, low-volume pores that increase the surface area. Activated carbon, in a mesoporous context, is typically composed of a carbon framework with both mesoporosity and microporosity, such as depending on the conditions under which it was synthesized. According to IUPAC, a mesoporous material can be disordered or ordered in a mesostructure. In crystalline inorganic materials, mesoporous structure noticeably limits the number of lattice units, and this significantly changes the solid-state chemistry. For example, the battery performance of mesoporous electroactive materials is significantly different from that of their bulk structure.

The carbon-based particle 100A is nucleated and grown in an atmospheric plasma-based vapor flow stream of reagent gaseous species such as methane ($CH_4$) to form an initial carbon-containing and/or carbon-based particle without specifically or explicitly requiring a separate stand-alone initial seed particle around which carbon structures are subsequently grown, as seen in conventional techniques. An initial carbon-based synthesized particle independent of a separate seed particle pursuant to the presently disclosed embodiments can then be expanded:

in-flight, describing the systematic coalescence pursuant to nucleation and/or growth from an initial carbon-based homogenous nucleation independent of a seed particle of additional carbon-based material derived from incoming carbon-containing gas mid-air within a microwave-plasma reaction chamber; or, by being grown and/or deposited directly onto a supporting or sacrificial substrate, such as a current collector, within a thermal reactor.

Coalescence implies a process in which two phase domains of the same composition come together and form a larger phase domain. Alternatively put, the process by which two or more separate masses of miscible substances seem to pull each other together should they make the slightest contact. The carbon-based particle 100A, may be alternatively referred to as just particle, and/or by any other similar term. The term mesoporous, as both generally understood and as used herein, may be defined as a material containing pores with diameters between 2 and 50 nm, according to International Union of Pure and Applied Chemistry (IUPAC) nomenclature.

Synthesis and/or growth of carbon-based particle 100A within a reaction chamber in and/or otherwise associated with a microwave-based reactor, such as a reactor is disclosed by Stowell, et al., "Microwave Chemical Processing Reactor", U.S. Pat. No. 9,767,992, filed on Sep. 19, 2017, incorporated by reference herein in its entirety. Synthesis can occur in systems other than microwave reactors such as taking place in a thermal reactor, referring generally to a chemical reactor defined by an enclosed volume in which a temperature-dependent chemical reactor occurs.

Figure 1D:
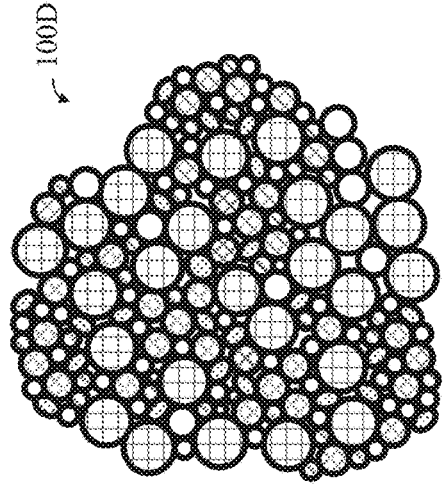

The carbon-based particle 100A, also shown as a carbon-based particle 100D in FIG. 1D, is synthesized as so described herein with a three-dimensional (3D) hierarchical structure comprising short range, local nano-structuring in combination with long range approximate fractal feature structuring, which in this context refers to the formation of successive layers positioned orthogonally to each other. Orthogonally here is defined as involving the 90-degree rotation of each successive layer relative to the one beneath it, and so on and so forth, allowing for the creation of vertical, or substantially vertical, layers and/or intermediate layers.

Contiguous microstructures 107E suitable for incorporation within an electrochemical cell cathode for lithium-sulfur (Li S) secondary systems are shown in FIG. 1E, which itself shows an enlarged and more detailed view of the hierarchical pores 101A shown in FIGS. 1A and 1D. In some implementations, contours and shapes of the contiguous microstructures 107E can structurally define the open porous scaffold 102A, as shown in FIG. 1A, with diffusion pathways 109E, which are suitable for Li ion transport from the anode to the cathode during discharge-charge cycles. The contiguous microstructures 107E can include:

microporous frameworks, such as the diffusion pathways 109E, defined by a dimension 101E of >50 nm that provide tunable Li ion conduits;

mesoporous channels defined by a dimension 102E of about 20 nm to about 50 nm (generally defined under IUPAC nomenclature and referred to as mesopores or mesoporous) that act as Li ion-highways for rapid Li ion transport therein; and microporous textures, such as pores 105E, defined by a dimension 103E of <4 nm for charge accommodation and/or active material, such as sulfur (S) in Li S systems, confinement.

A hierarchical porous network 100E including the diffusion pathways 109E, in addition to providing pores 105E for confining active material and defining pathways for ion transport, can be configured to define the contiguous microstructures 107E for providing active Li intercalating structures. Accordingly, the hierarchical porous network 100E of the carbon-based particle 100D can be implemented in either an anode or a cathode or, for example, a Li ion or a Li S battery system with a specific capacity rated at between about 744 mAh/g to about 1,116 mAh/g. For either Li ion or Li S configurations, Li can infiltrate open porous scaffold, such as when provided by molten Li metal via capillary infusion, to at least partially chemically react with exposed carbon therein in reactive systems.

One or more physical, electrical, chemical and/or material properties of the carbon-based particle 100A may be defined during its synthesis. Also, dopants, referring to traces of impurity element that is introduced into a chemical material to alter its original electrical or optical properties, such as Si, SiO, SiO2, Ti, TiO, Sn, Zn, and/or the like. may be dynamically incorporated during synthesis of the carbon-based particle 100A to at least in part affect material properties including electrical conductivity, wettability, and/or ion conduction or transport through the hierarchical porous network 100E. Microporous textures having dimension 103E and/or hierarchical porous network 100E more generally may be synthesized, prepared, or created to include smaller pores for chemical, such as sulfur (S), micro-confinement, the smaller pores being defined as ranging from 1 to 3 nm. Also, each graphene sheet, such as shown in FIG. 1C, may range from 50 to 200 nm in diameter ($L_a$).

The open porous scaffold 102A may be synthesized independent of a binder, such as a traditional, nonconductive polymer binder typically used in conjunction with and a conductive additive onto a metal foil current collector in battery end-use applications. Traditional configurations involving usage of a binder can lead to electronic/current conduction-related or ionic constrictions and poor contacts due to randomly distributed conductive phases. Moreover, when high-capacity electrode materials are employed, relatively high physical stress generated during electrochemical reactions can disrupt mechanical integrity of traditional binder systems, therefore, in turn, reducing cycle life of batteries.

A vapor flow stream used to synthesize the carbon-based particle 100A, or the carbon-based particle 100D, which is or can be identical to the carbon-based particle 100A, may be at least flowed in part into a vicinity of a plasma, such as that generated and/or flowed into a reactor and/or chemical reaction vessel. Such a plasma reactor may be configured to propagate microwave energy toward the vapor flow stream to at least in part assist with synthesis of carbon-based particle 100A, may involve carbon-particle based and/or derived nucleation and growth from constituent carbon-based gaseous species, such as methane ($CH_4$), where such nucleation and growth may substantially occur from an initially formed carbon-based homogenous nucleation independent of a seed particle within a reactor. Such a reactor accommodates control of gas-solid reactions under non-equilibrium conditions, where the gas-solid reactions may be controlled at least in part by any one or more of:

ionization potentials and/or thermal energy associated with constituent carbon-based gaseous species introduced to the reactor for synthesis of the carbon-based particle; and/or kinetic momentum associated with the gas-solid reactions.

The vapor flow stream may be flowed into a reactor and/or reaction chamber for the synthesis of carbon-based particle 100A at substantially atmospheric pressure. And, change in wettability of carbon-based particle 100A and/or any constituent members such as open porous scaffold 102A at least in part may involve adjustment of polarity of a carbon matrix associated with carbon-based particle 100A.

Procedures for Synthesis

Microwave Reactor

A vapor flow stream including carbon-containing constituent species, such as methane ($CH_4$), may be flowed into one of two general reactor types to produce the carbon-based particle 100A:

a thermal reactor; or, a microwave-based reactor. Suitable types of microwave reactors are disclosed by Stowell, et al., "Microwave Chemical Processing Reactor", U.S. Pat. No. 9,767,992 files on Sep. 19, 2017, incorporated herein by reference in its entirety.

The term in-flight implies a novel method of chemical synthesis based on contacting particulate material derived from inflowing carbon-containing gaseous species, such as those containing methane ($CH_4$), to crack such gaseous species. Cracking, as generally understood and as referred to herein, implies the technical process of methane pyrolysis to yield elemental carbon, such as high-quality carbon black, and hydrogen gas, without the problematic contamination by carbon monoxide, and with virtually no carbon dioxide emissions. A basic endothermic reaction that may occur within a microwave reactor to create the carbon-based particle 100A is shown as equation (7) below:

$$CH_4 + 74.85 \text{ kJ/mol} \rightarrow C + 2H_2 \quad (7)$$

Carbon derived from the above-described cracking process and/or a similar or a dissimilar process may fuse together while being dispersed in a gaseous phase, referred to as in-flight, to create carbon-based particles, structures, substantially 2D graphene sheets, 3D agglomerations, and/or pathways defined therein, including:

interconnected 3D agglomerations 101B of multiple layers of the graphene sheets 101C and/or single layer graphene as schematically depicted in FIG. 1C, that are fused together to form the open porous scaffold 102A that facilitates electrical conduction along and across contact points of the graphene sheets 101C, which, as shown in FIG. 1B, may include and/or refer to 5 to 15 layers of few-layer graphene that are oriented in a stacked configuration to have a vertical height referred to as a stack height ($L_c$); and, any one or more of the contiguous microstructures 107E interspersed with or otherwise defined in shape by the interconnected 3D agglomerations 101B; in some configurations, the interconnected 3D agglomerations can be prepared to comprise one or more of single layer graphene (SLG), few layer graphene (FLG) defined as ranging from 5 to 15 layers of graphene, or many layer graphene (MLG).

As introduced earlier, the agglomerations 101B substantially orthogonally fused together to serve as a type of intrinsic, self-supporting, binder or joining material allowing for the elimination of a separate traditional binder material. Such procedures are substantially different from conventional sintering, or frittage, as commonly understood and as referred to herein, which implies the process of compacting and forming a solid mass of material by heat or pressure without melting it to the point of liquefaction where materials are bonded at specific acute angles to one-another.

Few layer graphene (FLG), defined herein as ranging from 5 to 15 layers or sheets of graphene, are fused at an angle that is not flat relative to other FLG sheets to nucleate and/or grow at an angle and therefore self-assemble over time. Moreover, process conditions may be tuned to achieve synthesis, nucleation, and/or growth of the carbon-based particle 100A, also referring to a plurality of carbon-based particles, on a component and/or a wall surface within a reaction chamber, or entirely in-flight upon contact with other carbon-based materials.

Electrical conductivity of deposited carbon and/or carbon-based materials may be tuned by adding metal additions into the carbon phase in the first part of the deposition phase or to vary the ratios of the various particles discussed. Other parameters and/or additions may be adjusted, as a part of an energetic deposition process, such that the degree of energy of deposited carbon and/or carbon-based particles will either:
bind together; or,
not bind together.

By nucleating and/or growing the carbon-based particle 100A in an atmospheric plasma-based vapor flow stream either in-flight or directly onto a supporting or sacrificial substrate, a number of the steps and components found in both traditional batteries and traditional battery-making processes can be eliminated. Also, a considerable amount of tailoring and tunability can be enabled or otherwise added into the discussed carbons and/or carbon-based materials.

For instance, a traditional battery may use a starting stock of active materials, graphite, etc., which may be obtained as off-the-shelf materials to be mixed into a slurry. In contrast, the carbon-based particle 100A disclosed herein may enable, as a part of the carbon or carbon-based material synthesis and/or deposition process, tailoring and/or tuning the properties of materials, in real-time, as they are being synthesized in-flight and/or deposited onto a substrate. This capability presents a surprising, unexpected, and substantial favorable departure from that currently available regarding creation of carbon-based scaffolded electrode materials in the secondary battery field.

Reactor and/or reactor design of that disclosed by Stowell, et al., "Microwave Chemical Processing Reactor", U.S. Pat. No. 9,767,992 filed on Sep. 19, 2017 may be adjusted, configured and/or tailored to control wanted or unwanted nucleation sites on internal surfaces of reaction chambers exposed to carbon-based gaseous feedstock species, such as methane ($CH_4$). In-flight particles qualities may be influenced by their solubility in the gaseous species in which they are flowed in such that once a certain energy level is achieved, it is not inconceivable for carbon to crack off, as described by thermal cracking, and form its own solid in a microwave reactor.

Adjusting for Unwanted Carbon Accumulation on Reaction Chamber Walls

Moreover, tuning of disclosed reactors and related systems may be performed to both proactively, such as prior to the observation of undesirable process conditions, and reactively, such as after such conditions are observed, address issues associated with carbon-based microwave reactor clogging. For instance, open surfaces, feed holes, hoses, piping, and/or the like may accumulate unwanted carbon-based particulate matter as a by-product of synthetic procedures performed to create carbon-based particle 100A. A central issue observed in a microwave reactor may include this tendency to experience clogging in and/or along orifices, the reason being related to walls and other surfaces exposed to in-flowing gaseous carbon-containing species having carbon solubility as well. Therefore, is it possible to unwantedly grow on the walls of a reaction chamber and/or on the exit tube. Over time, those growths will extend out and ultimately impinge flow and can shut down chemical reactions occurring within the reactor and/or reaction chamber. Such a phenomena may be akin to tube, such as an exhaust, wall build-up of burnt oil in a high-performance or racing internal combustion engine, where, instead of burning, such as combusting, fossil-fuel based gasoline, methane is used to result in the unwanted deposit of carbon on reaction chamber wells since metal inside the reaction chamber itself has a carbon solubility level.

Although methane is primarily used to create carbon-based particle 100A, any carbon-containing and/or hydrocarbon gas, like $C_2$ or acetylene or any one or more of: $C_2H_2$, $CH_4$, butane, natural gas, biogas, such as that derived from decomposition of biological matter, will likewise function to provide a carbon-containing source. The described uncontrolled and unwanted carbon growth within exposed surfaces of a microwave reactor may be compared to that occurring within an internal combustion engine exhaust manifold, as opposed to the cylinder bore, of the engine, especially where the plume of plasma, such as hot and excited gas about to enter into the plasma phase, is at the onset of the manifold, and burnt gas and carbon-based fragments are traveling down and plugging-up flow through the manifold, cross-pipes, and catalytic converter, and exit-pipes. Process conditions may therefore be proactively tuned to adjust and therefore accommodate for potential carbon-build-up in the microwave reactor, which relies on the presence of a plasma for hydrocarbon gas cracking. To maintain this plasma, a certain set of conditions must be maintained, otherwise back-pressure accumulation can destroy the plasma prior to its creation and subsequent ignition, etc.

Thermal Reactor

In the alternative or addition to synthesis of carbon-based particle 100A in a microwave reactor, structured carbons can be created by thermally cracking hydrocarbons by heat application in a reactor, such as a thermal reactor. Example configurations may include exposure of incoming carbon-based gaseous species, such as any one or more of the aforementioned hydrocarbons, to a heating element, similar to a wire in a lightbulb.

The heating element heats up the inside of a reaction chamber where incoming carbon-containing gas is ionized. The carbon-containing gas is not burnt, due to the absence of sufficient oxygen to sustain combustion, but is rather ionized from contact with incoming thermal radiation, such as in the form of heat, to cause nucleation of constituent members of carbon-based particle 100A, and ultimately synthesize, via nucleation, carbon-based particle 100A, and/or carbon-based particles similar to it, in its entirety. In thermal reactors, at least some of the observed nucleation of carbon-based particles can occur on walls or on the heating element itself. Nevertheless, particles can still nucleate which are small enough to be cracked by the speed of flowing gas, where such particles are captured to assist in the creation of carbon-based particle 100A.

Cracked carbons can be used to create a multi-shell fullerene carbon nano-onion (CNO), and/or other fullerenes, and smaller fractions of carbons with fullerene internal crystallography. In comparing synthesis of carbon-based particle 100A via microwave and thermal reactors, the following distinctions have been observed:

- microwave reactors can provide tuning capabilities suitable to provide a broader range of allotropes of carbon; whereas,
- thermal reactors tend to allow for the fine-tuning of process parameters, such as heat flow, temperature, and/or the like, to achieve the needs of specific end-use application targets of carbon-based particle 100A.

For instance, thermal reactors are currently being used to build Li S electrochemical cell electrodes, such as anodes and cathodes. Typical treatment process temperatures range in the thousands of Kelvin, to produce the carbon-based particle 100A and/or carbon-based aggregates associated therewith, when compressed, have an electrical conductivity greater than 500 S/m, or greater than 5,000 S/m, or from 500 S/m to 20,000 S/m. Optimal performance has been observed at between 2,000-4,000 K.

Carbon-Based Particle—Physical Properties & Implementation in Li Ion and Li S Batteries Any of the carbon-based structures shown in FIGS. 1A-1F may be incorporated into a secondary battery electrode, such as that of a lithium (Li) ion battery, as substantially set forth by Lanning, et al., "Lithium Ion Battery and Battery Materials", U.S. Pat. Pub. No. 2019/0173125, published on Jun. 6, 2019, incorporated by reference herein in its entirety. Disclosed implementations typically relate to Li incorporation or infusion within the anode, although carbon-based systems can be revised for compatibility and integration with the cathode, especially in Li S systems where microconfinement of S is desirable to mitigated unwanted polysulfide (PS) shuttle and cell self-discharge.

Particulate carbon contained in and/or otherwise associated with carbon-based particle 100A may be implemented in a Li ion battery anode or cathode as a structural and/or electrically conductive material and be characterized by hierarchical porous network 100E with a wide distribution of pore sizes, also referred to as a multi-modal pore size distribution. For example, particulate carbon can contain multi-modal distribution of pores in addition or in the alternative to the contiguous microstructures 107E, as shown in FIG. 1E, that at least in part further define open porous scaffold 102A with one or more the diffusion pathways 109E. Such pores may have sizes from 0.1 nm to 10 nm, from 10 nm to 100 nm, from 100 nm to 1 micron, and/or larger than 1 micron. Pore structures can contain pores with a multi-modal distribution of sizes, including smaller pores, with sizes from 1 nm to 4 nm, and larger pores, with sizes from 30 to 50 nm.

Such a multi-modal distribution of pore sizes in carbon-based particle 100A can be beneficial in Li S battery system configurations, where S-containing cathodes in Li S batteries can be confined in the pores 105E having the dimension 103E of approximately less than 1.5 nm or in the range 1 to 4 nm in size. Control of saturation and crystallinity of S and/or of generated S compounds in a carbon-based cathode including the contiguous microstructures 107E in larger pores or pathways ranging from 30 to 50 nm in size, or pores greater than twice the size of solvated lithium ions (such as lithium, Li, ions 108E), can enable and/or facilitate rapid diffusion, or, mass transfer, of solvated Li ions in the cathode.

As introduced earlier, the Li S battery, is a type of rechargeable battery, notable for its high specific energy. A Li S battery can include sulfur (S) infiltrated or infused for confinement within the pores 105E and along exposed surfaces of the contiguous microstructures 107E of carbon-based particle 100D. Accordingly, S can infiltrate the open porous scaffold 102A, when incorporated into a cathode of a Li S battery, to deposit on internal surfaces of the carbon-based particle 100A, 100D and/or within the contiguous microstructures 107E, as shown in FIG. 1E and by schematic 10F shown in FIG. 1F, which shows intermediate steps associated with the reduction of sulfur to the sulfide ion ($S^{2-}$).

Carbon-Based Particle—Formed to Address Polysulfide (PS)-Related Challenges

Figure 1F:
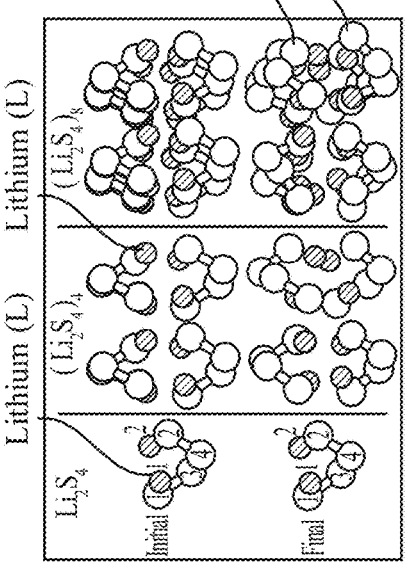
FIG. 1F shows diagrams representative of intermediate steps for the reduction of S and/or the formation of polysulfides (PS), according to some implementations.

Seeking to address at least some of the challenges associated with such polysulfide (PS) systems, carbon-based particle 100A and cathodic active material form a meta-particle framework, where cathodic electroactive materials, such as elemental sulfur that may form PS compounds 100F as shown in FIG. 1F, are arranged within carbon pores/channels, such as within any one or more of the contiguous microstructures 107E, as shown in FIG. 1E, including pores 104E, 105E, and/or pathways 106E and/or the diffusion pathways 109E. S can be, for example, substantially incorporated within the contiguous microstructures 107E at a loading level that represents 35-100% of the total weight/volume of active material in carbon-based particle 100A and/or 100E overall.

This type of organized particle framework can provide a low resistance electrical contact between the insulating cathodic electroactive materials, such as elemental S, and the current collector while providing relatively high exposed surface area structures that are beneficial to overall specific capacity and that may assist Li ion micro-confinement as enhanced by the formation of Li S compounds temporarily retained in the contiguous microstructures 107E, such as in the pores 105E, to in turn control and direct migration of Li ions as may be related to electric current conduction in a battery electrode and/or system. Implementations of carbon-based particle 100A can also benefit cathode, as well as anode, stability by trapping at least some portion of any created polysulfides by using tailored structures, such as that shown by the contiguous microstructures 107E, to actively prevent them from unwantedly migrating through electrolyte to the anode resulting in unwanted parasitic chemical reactions associated with battery self-discharge.

Migration of Polysulfides (PS) During Li S Battery System Usage

As introduced earlier, with reference to PS shuttle mechanisms observed in Li S battery electrodes and/or systems, PS dissolve very well in electrolytes. This causes another Li—S cell characteristic, the shuttle mechanism. The PS $S_{n2}$—that form and dissolve at the cathode, diffuse to the Li anode and are reduced to $Li_2S_2$ and $Li_2S$. The PS species $S_n^{2-}$ that form at the cathode during discharging dissolve in the electrolyte there. A concentration gradient versus the anode develops, which causes the PS to diffuse toward the anode. Step by step, the PS are distributed in the electrolyte. Subsequent high-order PS species react with these compounds and form low-order polysulfides $S_{(n-x)}$. This means that the desired chemical reaction of sulfur at the cathode partly also takes place at the anode in an uncontrolled fashion, where both chemical and electrochemical reactions are conceivable, which negatively influences overall cell characteristics.

If low-order PS species form near the anode, they diffuse to the cathode. When the cell is discharged, these diffused species are further reduced to $Li_2S_2$ or $Li_2S$. As a result, the cathode reaction partly takes place at the anode during the discharging process or, rather, the cell self-discharges. Both are undesirable effects decreasing specific capacity. In contrast, the diffusion to the cathode during the charging process is followed by a re-oxidation of the PS species from low order to high order. These PS then diffuse to the anode again. This cycle is generally known as the shuttle mechanism, which can be very pronounced, it is possible that a cell can accept an unlimited charge to be chemically short-circuited. In general, the shuttle mechanism causes a parasitic sulfur active matter loss. This is due to the uncontrolled separation of $Li_2S_2$ and $Li_2S$ outside of the cathode area and it eventually causes a considerable decrease in cell cycling capability and service life. Further aging mechanisms can be an inhomogeneous separation of $Li_2S_2$ and $Li_2S$ on the cathode or a mechanical cathode structure breakup due to volume changes during cell reaction.

Pores of Carbon-Based Particle Confine Sulfur and Prevent PS Shuttle to the Anode To address the phenomenon of PS shuttling, any one or more of the contiguous microstructures 107E of carbon-based particle 100A in a cathode can provide a region formed with an appropriate dimension, such as the pores 105E having the dimension 103E of less than 1.5 nm, to drive the creation of lower order polysulfides, such as S and $Li_2S$, and therefore prevent the formation of the higher order soluble polysulfides, $Li_xS_y$, with y greater than 3, that facilitate Li shuttle, such as loss to the anode. As described herein, the structure of the particulate carbon and the cathode mixture of materials can be tuned during particulate carbon formation within a microwave plasma or thermal reactor. In addition, cathodic electroactive materials, such as elemental sulfur, solubility and crystallinity in relation to Li phase formation, can be confined/trapped within the micro- and/or meso-porous framework of the contiguous microstructures 107E of carbon-based particle 100A.

A multi-modal distribution of pore sizes can be indicative of structures with high surface areas and a large quantity of small pores that are efficiently connected to the substrate and/or current collector via material in the structure with larger feature sizes to provide more conductive pathways through the structure. Some non-limiting examples of such structures are fractal structures, dendritic structures, branching structures, and aggregate structures with different sized interconnected channels composed of pores and/or particles that are roughly cylindrical and/or spherical.

Example particulate carbon materials used in the Li ion or Li S batteries described herein are described in U.S. Pat. No. 9,997,334, entitled "Seedless Particles with Carbon Allotropes," which is assigned to the same assignee as the present application, and is incorporated herein by reference. The particulate carbon materials can contain graphene-based carbon materials that include a plurality of carbon aggregates, each carbon aggregate having a plurality of carbon nanoparticles, each carbon nanoparticle including graphene, optionally including multi-walled spherical fullerenes, and optionally with no seed particles such as with no nucleation particle. In some cases, the particulate carbon materials are also produced without using a catalyst. The graphene in the graphene-based carbon material has up to 15 layers. A ratio of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$ or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5,000 S/m, or from 500 S/m to 20,000 S/m.

Distinctions Between the Disclosed Implementations and Conventional Technology

Conventional composite-type Li-ion or Li S battery electrodes may be fabricated from a slurry cast mixture of active materials, including conductive additives such as fine carbon black and graphite for usage in a battery cathode at a specific aspect ratio, and polymer-based binders that are optimized to create a unique self-assembled morphology defined by an interconnected percolated conductive network. While, in conventional preparations or applications, additives and binders can be optimized to improve electrical conductivity there-through by, for example, offering lower interfacial impedance and therefore correspondingly yield improvements in power performance and delivery, they represent a parasitic mass that also necessarily reduces specific, also referred to as gravimetric, energy and density, an unwanted end result for current demanding high-performance battery applications.

To minimize losses due to parasite mass, such as that caused by increased active and/or inactive ratio, and concurrently enable faster access of electrolyte to the complete surface of an electrode, the diffusion pathways 109E may be re-oriented to effectively shorten Li ion diffusion path lengths for charge transfer. The hierarchical pores 101A and/or the open porous scaffold 102A may be created from reduced-size carbon particles and/or active materials down to nanometer scales. The external specific surface area (SSA), defined as the total surface area of a material per unit of mass, with units of $m^2/kg$ or $m^2/g$, or solid or bulk volume (units of $m^2/m^3$ or $m^{-1}$) is a physical value of any one or more of the presently disclosed carbon particles that can be used to determine the type and properties of a material. For instance, the SSA of a sphere increases with decreasing diameter. However, as the particle size is decreased down into the nanometer size range there are associated attractive van der Waal forces that can impede dispersion, facilitate agglomeration, and thereby increase cell impedance and reduce power performance.

Another approach to shortening ion diffusional pathways, referring to the diffusion pathways 109E shown in FIG. 1E, is to uniquely engineer the internal porosity of the constitutive carbon-based particles, such as those created by the agglomerations 101B to create the contiguous microstructures 107E. A surface curvature can be referred to as a pore if its cavity is deeper than it is wide. As a result, this definition necessarily excludes many nanostructured carbon materials where just the external surface area is modified, or in close packed particles where voids, such as intra-particular spaces or regions, are created between adjacent particles, as in the case of a conventional slurry cast electrode.

With respect to the engineering, referring to the synthesis, creation, formation, and/or growth of carbon-based particle 100A either in-flight in a microwave-based reactor or via layer-by-layer deposition in a thermal reactor as substantially described earlier, reactor process parameters may be adjusted to tune the size, geometry, and distribution of hierarchical pores 101A and/or the contiguous microstructures 107E within carbon-based particle 100A. Hierarchical pores 101A and/or the contiguous microstructures 107E within carbon-based particle 100A may be tailored to achieve performance figures particularly well-suited for implementation in high-performance fast-current delivery devices, such as supercapacitors.

As generally described earlier, a supercapacitor (SC), also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much, much faster than batteries, and tolerates many more charge and discharge cycles than rechargeable batteries.

In many of the available off-the-shelf commercial carbons used in early supercapacitor development efforts, there were worm-like narrow pores which became a bottleneck or liability when operating at high current densities and fast charge- and discharge rates, as electrons may encounter difficulty in flow through, in or around such structures or pathways. Even though pore dimensions were fairly uniform but still adjustable to accommodate a wide range of length scales, real-life achievable performance was still self-limited, as based on the structural challenges inherent to the worm-like narrow pores.

Compared to conventional porous materials with uniform pore dimensions that are tuned to a wide range of length scales, the presently disclosed 3D hierarchical porous materials, such as that shown by hierarchical pores 101A and/or the contiguous microstructures 107E within carbon-based particle 100A, may be synthesized to have well-defined pore dimensions, such as the contiguous microstructures 107E including pores 104E, 105E, and/or pathways 106E and/or the diffusion pathways 109E and topologies to overcome the shortcomings of conventional mono-sized porous carbon particles by creating multi-modal pores and/or channels having the following dimensions and/or widths:

meso (2 nm<$d_{pore}$<50 nm) pores;

macro ($d_{pore}$>50 nm) pores 201A to minimize diffusive resistance to mass transport; and, micro ($d_{pore}$<2 nm) pores 202 to increase surface area for active site dispersion and/or ion storage, capacitance relating to density and number of ions that can be stored within a given pore size, such as that shown by the pore 105E having the dimension 103E in FIG. 1E.

Although no simple linear correlation has been experimentally established between surface area and capacitance, the carbon-based particle 100A provides optimal micropore size distributions and/or configurations that are different for each intended end-use application and corresponding voltage window. To optimize capacitance performance, the carbon-based particle 100A may be synthesized with very narrow pore size distributions (PSD); and, as desired or required voltages are increased, larger pores are preferred. Regardless, current state-of-the-art supercapacitors have provided a pathway to engineering the presently disclosed 3D hierarchical structured materials for particular end-use applications.

In supercapacitors, capacitance and power performance is primarily governed by, for example:

surface area of the pore wall;

size of pore; and interconnectivity of the pore channels, which affects electric double layer performance.

In contrast, Li ion and/or Li—S storage batteries undergo faradaic reduction/oxidation reactions within the active material and thereby may need many of the Li ion transport features of a supercapacitor, such as efficiently oriented and/or shortened Li ionic diffusion pathways. Regardless, in any application, including a supercapacitor as well as a traditional Li ion or Li S secondary battery, a 3D nanocarbon-based framework/architecture, such as that defined open porous scaffold 102A, can provide continuous electrical conducting pathways, such as across and along the agglomerations 101B, alongside, for example, highly-loaded active material having high areal and volumetric specific capacity.

Carbon-Based Particle Used as a Formative Material for a Cathode

To address prevailing issues with relatively low electrical and ionic conductivities, volume expansion and polysulfide (PS) dissolution in current Li S cathode electrode designs, the carbon-based particle 100A has the hierarchical pores 101A and/or the contiguous microstructures 107E formed therein to define the open porous scaffold 102A, which includes the pores 105E with microporous textures having the dimension 103E, such as approximately less than 1.5 nm or 1-4 nm cavities suitable to confine elemental sulfur and/or Li S related compounds. The open porous scaffold 102A, while confining sulfur, also provides a host scaffold-type structure to manage S expansion to ensure electron conduction across the sulfur-carbon (S—C) interface, such as at contact and/or interfacial regions of S and C within the pores 105E by, for example, tailored in-situ nitrogen (N) doping of the carbon (C) within the reactor. Confining S within a nanometer (nm) scale cavity, such as within the pores 105E and/or the microporous textures having the dimension 103E, favorably alters both:

the equilibrium saturation, such as the solubility product; and, crystalline behavior of S, such that S remains confined as may be necessary for desirable electrical conduction upon dissociation of Li S compounds, etc., within microporous textures or the pores 105E having the dimension 103E, with no external driving force required to control unwanted PS migration to the anode electrode.

As a result, the dimension 103E of the pores 105E results in no need for separators that attempt to impede polysulfide (PS) diffusion while, at the same time, negatively impacting cell impedance, such as the effective resistance of an electric circuit or component to alternating current, arising from the combined effects of ohmic resistance and reactance, and polarization. By using carbon with optimum, relative to elemental S, Li and/or Li S micro-confinement, and non-optimum multi-modal, referring to the contiguous microstructures 107E including pores 104E, mesoporous channels have the dimension 102E, and/or microporous textures having the dimension 103E, or (alternatively) bi-modal pore distributions, the carbon-based particle 100A demonstrates operation of the principle of micro-confinement in properly optimized structures.

Figure 1G:
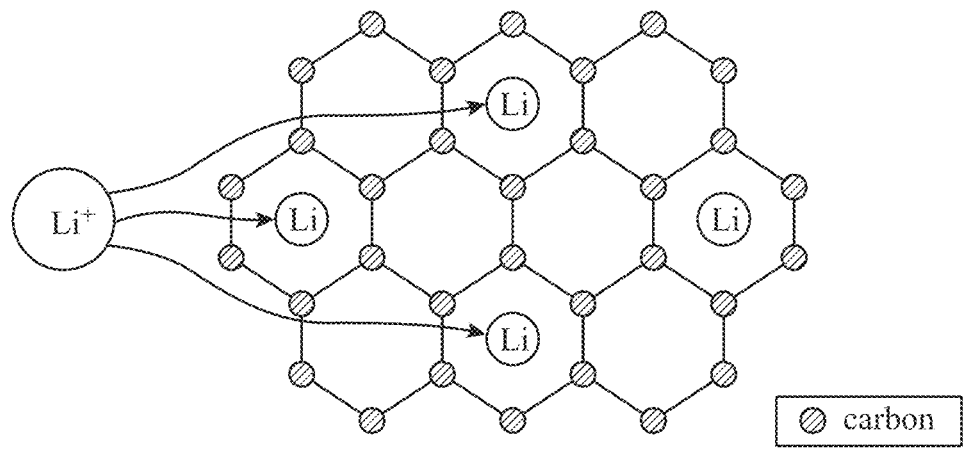
FIGS. 1G and 1H show schematics for placement and/or intercalation of Li ions in carbon lattices and structures, respectively, according to some implementations.
Figure 1H:
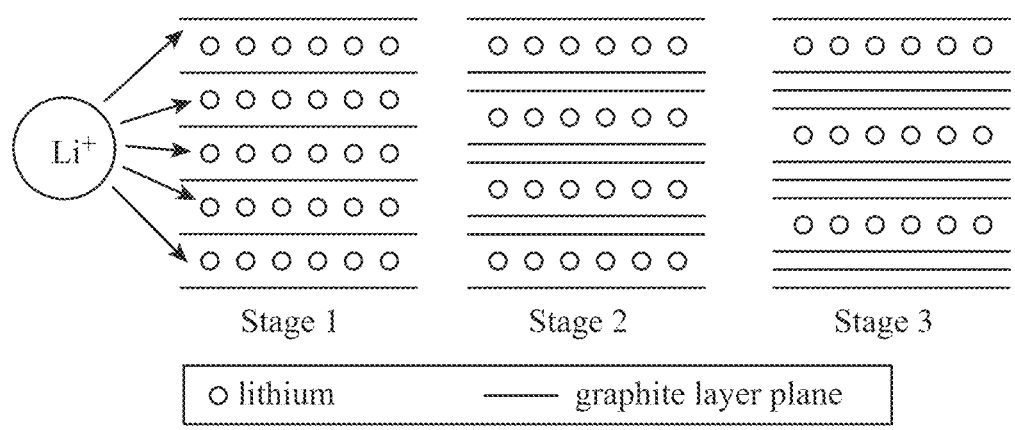

Such optimized structures include incorporation with the agglomerations 101B, which can themselves be prepared to include parallel stacked graphene layers, such as that produced from graphite having strong (002) dimensionality to random few-layer (FL) graphene with nanoscopic pores having low (002) dimensionality. FIGS. 1G and 1H show systematic intercalation of Li ions in carbon lattices and structures, being positioned within individual graphene layer cells in FIG. 1G, and in-between adjacent and parallel graphene layers in FIG. 1H. The configurations shown in FIG. 1H can include multiple stages, including Stages 1 through 3, each state representing various dimensions and spacing levels of graphite layer planes to yield a theoretic specific capacity of approximately 372 mAh/g at the cathode, or more.

Figure 2:
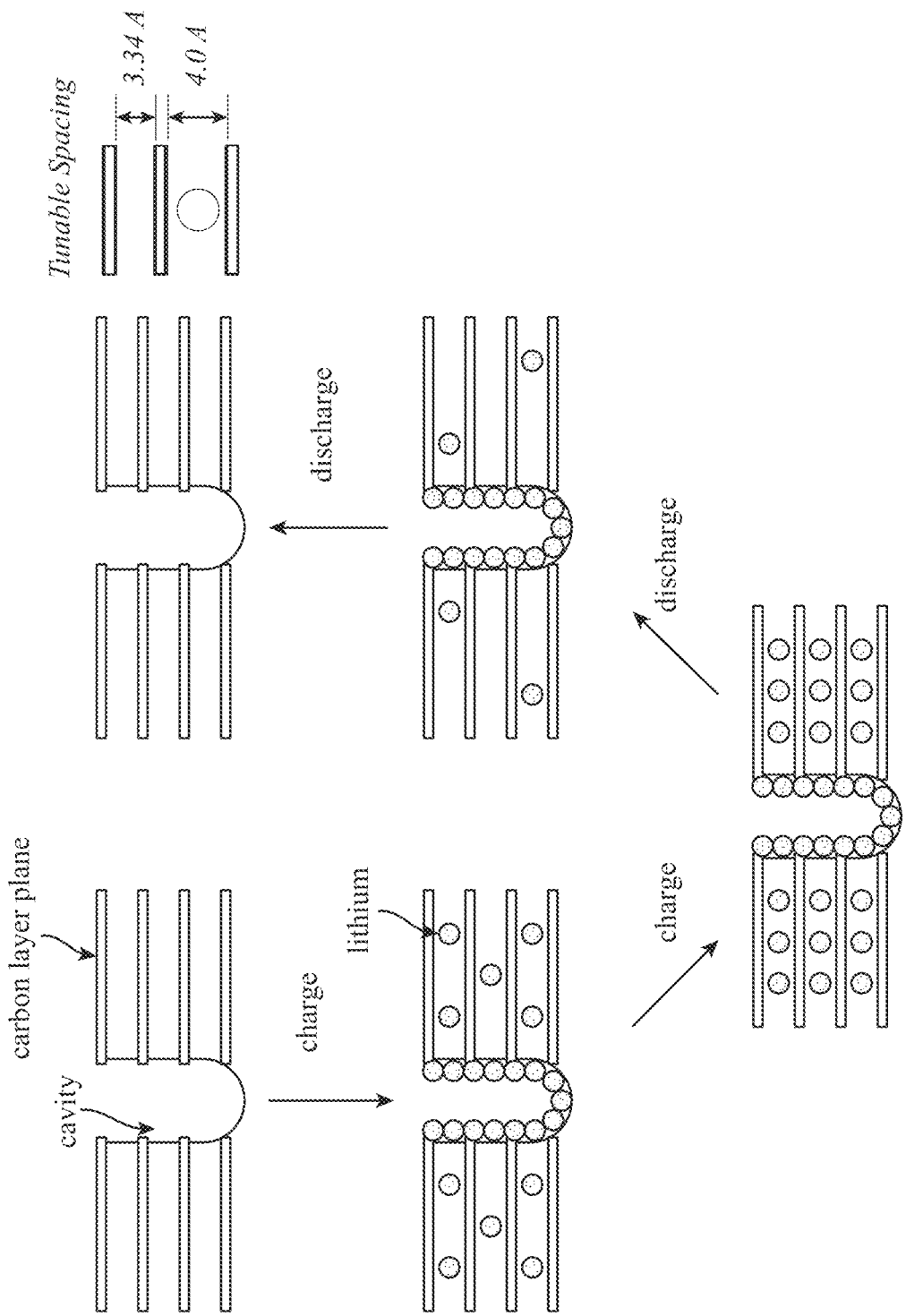
FIG. 2 show schematics for cavities that are formed in stacked FL graphene layers, according to some implementations.

FIG. 2 shows an evolution beyond conventional adjacent stacked FL graphene layers shown in Stages 1 to 3 in FIG. 1H, where cavities are formed extending depth-wise into several of the adjacent stacked FL graphene layers, each layer having tunable D-spacing ranging from approximately 3.34 Å to 4.0 Å, or 3 Å to 20 Å. Accordingly, Li ions can be intercalated between adjacent graphene layers as well as forming a layer on exposed surfaces of the cavity, also referred to as a nanoscopic pore, to yield a specific capacity range in excess of 750 mAh/g. When viewed collectively, an example enlarged section of the 3D self-assembled binder-less carbon-based particle can coalesce to form a carbon-based network, lattice, scaffold, or particle, which may include any one or more of the presently-disclosed carbon-based structures shown in FIG. 1A through FIG. 1E, according to some implementations. The carbon-based network can include any one or more of a plurality of macropores or micropores 202.

The carbon-based particle 100A also provides the ability to effectively load or infuse a carbon scaffold with elemental Li, such as that provided from molten Li metal or a vapor derivative thereof. An example carbon scaffold can be created in-reactor by either:

layer-by-layer deposition of multiple carbon-based particles 100A by a slurry-case method; or, by a continuous sequence of a group of plasma spray-torches that are also configured to deposit or infiltrate with sulfur, such as elemental sulfur.

For Li S battery performance to reliably exceed conventional Li ion batteries, industry-scalable techniques must achieve high S loading, such as >70% sulfur per unit volume, relative to all additives and components of a given cathode template, while maintaining the native specific capacity of the S active material. Attempts to incorporate S into a cathode host, such as by any one or more of, performed independently or in any combination: electrolysis, wet chemical, simple mixing, ball milling, spray coating, and catholytes, have either not fully incorporated the S as desirable, or are otherwise not economically scalable or manufacturable.

Unlike melt infiltration where small pores are thermodynamically inaccessible, presently disclosed synthetic approaches can use an isothermal vapor technique, introduced and reacted at substantially atmospheric pressure, where the high surface free energy of nanoscale pores or surfaces drives the spontaneous nucleation of sulfur containing liquids until a conformal coating of sulfur and/or lithium-containing condensate is reached on inner-facing surfaces of hierarchical pores 101A and/or the contiguous microstructures 107E. In essence, unique vapor infusion process infuses sulfur into fine pores, such as any one or more of hierarchical pores 101A and/or the contiguous microstructures 107E and/or pores 104E, 105E and/or pathways 106E and/or the diffusion pathways 109E at the core of carbon-based particle 100A, and therefore not just at its surface.

Carbon-Based Particles Used to Create an Electrically Conductive Scaffold

Carbon-based particle 100A, may be fabricated any number of ways using both known and novel techniques disclosed herein, including:

slurry-casting, referring to conventional metalworking, manufacturing and/or fabrication techniques in which a liquid material is usually poured into a mold, which contains a hollow cavity of the desired shape, and then allowed to solidify; or a plasma spray-torch system which may be used to perform layer-by-layer deposition to grow carbon-based particle 100A incrementally.

Figure 3A:
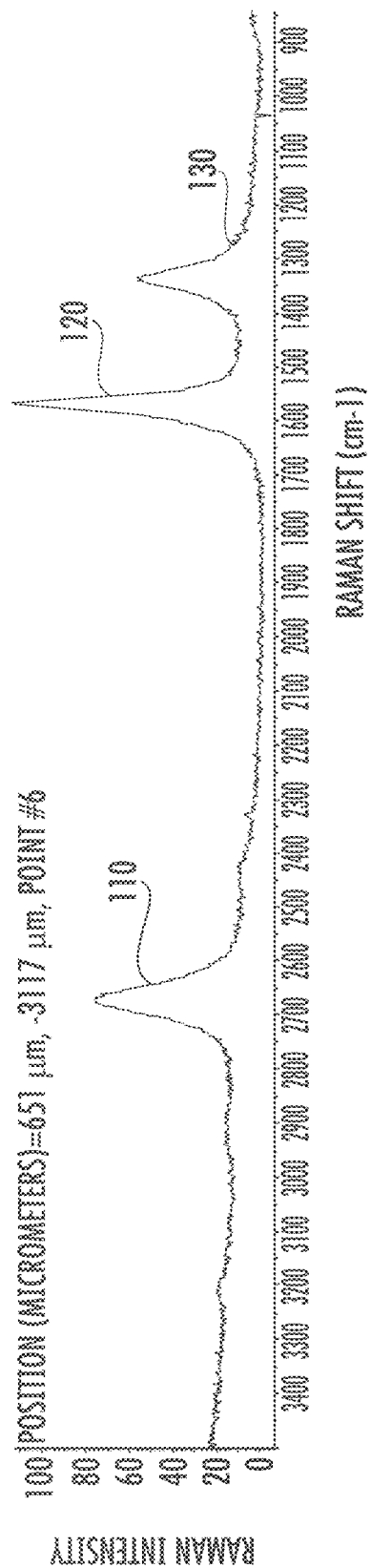
FIG. 3A shows a Raman spectrum for an example carbon-based structure including graphene, according to some implementations.
Figure 3B:
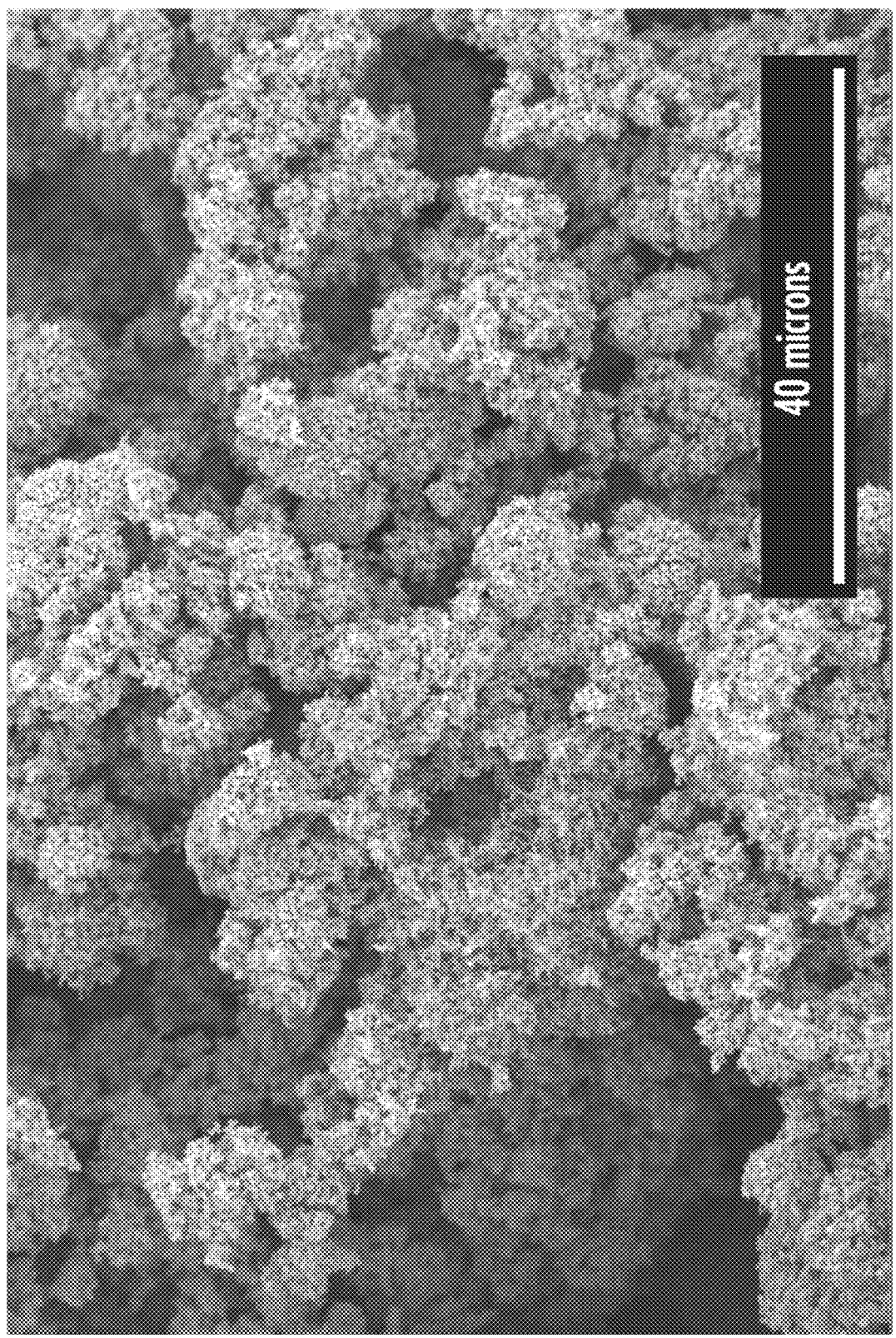
FIGS. 3B and 3C show scanning electron microscope (SEM) images for example carbon-based structures including graphene, according to some implementations.

Either technique as described above, or any other known or novel fabrication techniques, may be used to produce a carbon scaffold in a graded manner. Control over the electrical gradients can result in the carbon scaffold having varying degrees of electrical conductivity as dictated at least in part by any one or more of electrical gradients and ionic conductive gradients, described as follows:

electrical gradients can be defined by the agglomerations 101B including graphene sheets and/or graphene platelets substantially orthogonally fused together form the open porous scaffold 102A, where electrical conduction occurs along and across contact points of the agglomerations 101B; and, ionic conductive gradients, such as Li ion transport, movement, or migration through the hierarchical pores 101A and the contiguous microstructures 107E, can be benefited, in certain configurations of the carbon-based particle 100 by the effective shortening of the diffusion pathways 109E throughout thickness of the carbon scaffold in the vertical height direction A as shown in FIG. 3B to, for example, permit Li ions intercalated between adjacent few-layer graphene sheets, such as the agglomerations 101B, to escape and migrate toward a liquid electrolyte surrounding the carbon scaffold on route to the cathode curing electrochemical cell discharge-charge cycling.

Reference has been made throughout the presently disclosed implementations to various forms of carbon synthesized in-flight within a reactor to create the agglomerations 101B, which are interconnected and conduct electricity along contact points and may vary in shape, size, position, orientation, and/or structure. Such variances can be influenced in differences in crystallinity and the particular type of carbon allotrope(s) used for creation of electrically conductive interconnected agglomerations of the agglomerations 101B. Crystallinity implies the degree of structural order in a solid. In a crystal, atoms or molecules are arranged in a regular, periodic manner. The degree of crystallinity therefore has a significant influence on hardness, density, transparency, and diffusion.

Accordingly, the carbon-based particle 100 can be produced in the form of an organized scaffold, such as a carbon-based scaffold, out of a reactor or be created during post-processing activities taking place outside of primary synthesis within a reactor.

Plasma processing and/or plasma-based processing, may be conducted within a reactor as disclosed by Stowell, et al., "Microwave Chemical Processing Reactor", U.S. Pat. No. 9,767,992, issued on Sep. 19, 2017, where supply gas is used to generate a plasma in the plasma zone to convert a process input material, such as methane and/or other suitable hydrocarbons in a gaseous phase, into separated components in a reaction zone to facilitate in-flight synthesis of carbon-based materials.

Alternative to synthesis by or within a microwave reactor as described above, thermal energy may be directed toward or near carbon-containing feedstock materials supplied in a gaseous phase onto a sacrificial substrate 306 of the carbon scaffold shown in FIG. 3 to sequentially deposit multiple layers of carbon-based particles 100A by, for example, a plasma spray-torch system. Such particles may be either fused together in-flight, in a microwave reactor, or deposited, in a thermal reactor, in a controlled manner to achieve varying concentration levels of carbon-based particles 100A to therefore, in turn, achieve graded electrical conductivity proportionate to concentration levels of carbon-based particles 100A in the carbon scaffold. Such procedures may be used to formulate porous carbon-based electrode structure, such as carbon scaffold, that has a high degree of tunability, such as in electrical conductivity and ionic transport, while also eliminating many production steps and otherwise retaining a conventional outward appearance.

The open porous scaffold 102A can be produced with an open cellular structure such that a liquid-phase electrolyte can easily infiltrate into various pores, such as any one or more of the pathways, voids, and the like of the contiguous microstructures 107E, therein. Skeletal portions of open porous scaffold 102A may be referred to as a matrix or a frame, and pores, such as hierarchical pores 101A and/or the contiguous microstructures 107E, can be infiltrated with a fluid, liquid or gas, whereas, skeletal material is usually formed as a solid material.

Porosity of the Carbon-Based Particle

A porous medium, such as carbon-based particle 100A, can be characterized by its porosity. Other properties of the medium, such as permeability, tensile strength, electrical conductivity, and tortuosity, may be derived from the respective properties of its constituents, of solid matrix and fluid interspersed therein, as well as media porosity and pore structure. Carbon-based particle 100A having the contiguous microstructures 107E interspersed throughout therein can be created out of a reactor to achieve desirable porosity levels that are conducive for Li ion diffusion. Related to such Li ion diffusion, the agglomerations 101B facilitate electron conduction along contact points thereof while also allowing for electrons to reunite with positive Li ions at reaction sites.

Regarding, porosity and tortuosity of open porous scaffold 102A of carbon-based particle 100A, an analogy may be made to marbles in a glass jar. Porosity, in this example, refers to spacing between the marbles that allows liquid-phase electrolyte to penetrate into void spaces between the marbles, similar to the contiguous microstructures 107E that define the diffusion pathways 109E within the carbon-based particle 100A. The marbles themselves may be like swiss cheese, by allowing electrolyte not only to penetrate in cracks between the agglomerations 101B, but also into each graphene sheet themselves, an individual graphene sheet is shown in FIG. 1C. In this example as well as others, the relative shortening of the diffusion pathways 109E refers to how long it takes Li ions infiltrated therein by, for example, capillary action to contact active material, such as S confined within pores 105E. The diffusion pathways 109E accommodate convenient and rapid infiltration and diffusion of electrolyte, which may contain Li ions, into carbon-based particle 100A, which can then be grown or otherwise synthesized further to create a carbon scaffold with graded electric conductivity.

The shortening of the diffusion pathways 109E refers toward the shortening of diffusion lengths through which Li ions move within open porous scaffold 102A in a carbon scaffold and not of the active material, such as S, itself confined within the pores 105E of the contiguous microstructures 107E. This is on contrast to conventional techniques that require the diffusion length of the active material to be shortened only by making the thickness of the active material lesser or smaller. The diffusion pathways 109E within the contiguous microstructures 107E can act as Li ion buffer reservoirs by controlling flow and/or transport of Li ions therein to provide a freer flowing structure for Li ion transport therein, as may be beneficial for Li ion confinement, as reacted with S coated on exposed carbon surfaces of the pores 105, and later Li ion transport during electrochemical cell charge-discharge cycles. Transport of Li ions throughout the diffusion pathways 109E in the general directions shown in FIG. 1E can take place in a liquid electrolyte initially infused and captured within open porous scaffold 102A, where such infusion of electrolyte occurs prior to cyclic carbon scaffold usage in discharge-charge cycles.

Examples exist permitting for the initial diffusion and distribution of liquid-phase electrolyte in open porous scaffold 102A of carbon-based particle 100A to fill up and occupy hierarchical pores 101A and/or the contiguous microstructures 107E prior to usage of carbon scaffold, synthesized or otherwise created by layer-on-layer deposition of carbon-based particles 100A. Vacuum or air may also be used to fill hierarchical pores 101A and/or the contiguous microstructures 107E, which may allow or assist with wetting of electrolyte with carbon-containing exposed surfaces within open porous scaffold 102A.

Li ions bounce from one location to another by a chain reaction, similar to the striking of newton balls, where one hits to result in force transference resulting in the movement of other balls. Similarly, each Li ion moves a relatively short distance, yet remains able to move great numbers of Li ions in the collective through this type of chain reaction as described. The extent of individual Li ion movement may be influenced by the quantity of Li ions supplied altogether to a carbon scaffold via capillary infusion into open porous scaffold 102A, as may be the crystallographic arrangement of Li ions and/or particles in, around, or within the agglomerations 101B.

Li Ion and/or Li S Batteries Featuring 3D Hierarchical Carbon Structures

Li ion and/or Li S batteries with improved cathodes, anodes, separators and/or electrolytes are described. The electrodes, such as the anodes and cathodes, can contain a substrate, such as a carbon substrate and/or a metal foil substrate. The Li ion batteries described herein are Li S batteries, or Si—S-graphene batteries. The present cathodes can contain the substrate and a cathode mixture containing S and/or $Li_2S$ and a carbon additive, such as particulate carbon. The cathode mixtures can also contain conventional Li ion battery cathode materials such as nickel cobalt manganese (NCM) or Li iron phosphate (LFP). The present anodes can contain the substrate and an anode mixture containing silicon and/or lithiated silicon particles, and a carbon additive, such as particulate carbon.

The cathode and/or anode materials are arranged on a substrate. Substrates for the present cathodes and/or anodes can be dense or porous and can contain any electrically conductive material. The substrates can contain a single layer, multiple layers, an interpenetrating network of conductive and non-conductive materials, and/or conductive porous or solid films or coatings on non-conductive base materials. The electrolytes of the present Li ion batteries can contain one or more solvents, a Li salt, and optionally a redox additive. A separator can also optionally be used, where the separator is saturated with the electrolyte and is arranged between the anode and cathode. The separator can contain a polymeric blend and can optionally contain incorporated electrically non-conductive particles.

Compared to conventional Li S and Li ion batteries, the materials and the structure of the cathodes and anodes and the composition of the electrolytes described herein improves the performance, manufacturability and/or stability of the batteries. The structure of the cathode of the present Li ion batteries improves the longevity of Li S batteries compared to batteries with conventional cathodes by providing high surface area with many small pockets where the polysulfides formed during charging and discharging are trapped. As a result, the migration of the polysulfides to the anode is mitigated which improves battery performance, for example, by increasing efficiency and mitigating the capacity loss per cycle.

The present carbon additives in the cathode and/or anode have improved properties compared to conventional carbon additive materials, such that batteries containing electrodes utilizing the present carbon additives have improved battery performance, such as improved capacity or stability. For example, the present carbon additive in the cathode and/or anode can contain particulate carbon with high compositional purity, high electrical conductivity, and a high surface area. The particulate carbon has a mesoporous structure with a wide distribution of pore sizes, such as a multimodal distribution. The improved carbon additives described herein are beneficial to both electrodes because they have high electrical conductivity and high surface area to efficiently conduct electrons, such as with low resistive losses, to the abundant electrode/electrolyte interfaces, such as enabled by the high surface area particulate carbons. The improved carbon additives described herein are also beneficial to cathodes because the small pores in the micro- and/or meso-porous structure can trap some portion of the created polysulfides (PS) preventing them from migrating through the electrolyte to the anode to therefore result in a potential self-discharge scenario.

The incorporation, such as through doping of exposed carbon-inclusive surfaces attributable to the higher surface-area to volume ratios provided by the disclosed 3D hierarchical carbon-based structures, such as the carbon-based particle 100A, 100D, and/or the like, of silicon (Si) in the anode of the present Li ion batteries improves the performance and safety of the batteries compared to conventional anodes made from elemental Li. Elemental Li is highly reactive, which can create safety issues during battery operation. Elemental Li electrodes in Li S batteries can also suffer from poor performance, such as low coulombic efficiency, and poor durability, such as capacity losses during cycling.

Redox additives in the present electrolytes improve the longevity of Li S batteries compared to batteries with conventional electrolytes by preventing the polysulfides from migrating to the anode. This can be accomplished using different mechanisms including promoting the reaction of the polysulfides into $Li_2S$ and S and tethering the polysulfides at the cathode as well as by the formation of a more stable solid/electrolyte interface at the anode and/or the cathode. The S and/or $Li_2S$ can be mixed with conventional cathode materials such as NCM or LFP to improve performance and provide an overcharge safety mechanism.

Cathodes for Li Ion Batteries

The cathodes for Li ion, such as Li S, batteries contain a substrate and a cathode mixture containing a S material such as elemental S and/or $Li_2S$. The cathode mixture contains a material containing S, one or more particulate carbon materials, and optionally may include a binder. The cathode mixture can be formed using wet coating processes where a slurry containing the cathode mixture and one or more solvents, where the solvent can be fully or partially removed upon drying, is deposited onto a substrate, or using dry deposition processes. One example of a dry deposition process is using a plasma torch where components, such as particles and/or other feedstock materials, are deposited onto a substrate using a plasma jet. The cathode mixture contains a material containing S, one or more particulate carbon materials, a conventional Li ion cathode material such as NCM or LFP, and optionally may include a binder.

A Li S battery with a S-containing cathode is fabricated using the methods described herein, including depositing S-containing cathodic materials within the pores of a structured composite material containing an electrically conductive material, such as the particulate carbon. The cathodes can contain S, $Li_2S$, $Li_xS_y$ (such as where x=0-2 and y=1-8), doped S, doped $Li_2S$, or combinations thereof. The cathodes can contain composite materials containing S, $Li_2S$, $Li_xS_y$, doped S, doped $Li_2S$, doped $Li_xS$, NCM, LFP, or combinations thereof, either in the form of a solid or as a suspension/dissolved solution. Some examples of doped S, doped $Li_2S$, or doped $Li_xS$ include S, $Li_2S$, or $Li_xS$, doped with P, N, C and/or F.

The cathode contains particles containing $Li_xS_y$ (such as where x=0-2 and y=1-8), with particle sizes from 5 nm to 100 microns. As used herein, $Li_xS_y$ can refer to doped or undoped $Li_xS_y$ materials. Some non-limiting examples of $Li_xS_y$ materials include S, $Li_2S$, doped S, doped $Li_2S$, or combinations thereof. The particles are contained in a liquid phase mixture containing $Li_xS_y$. The cathodes contain $Li_xS_y$ complexed with solvents such as acetonitrile, or any of the cathode slurry solvents described herein. The cathodes contain $Li_xS_y$ complexed with a cathode solvent, such as acetonitrile, and with an active redox additive, such as a metallocene such as ferrocene. The cathodes contain a binder containing polyethylene oxide/polyvinylpyrrolidone (PEO/PVP), Nafion (such as a sulfonated tetrafluoroethylene-based fluoropolymer-copolymer), polyvinylidene difluoride (PvDF), and combinations thereof.

The particulate carbon in the cathode has a mesoporous structure with a wide distribution of pore sizes, such as a multimodal distribution. For example, mesoporous particulate carbon can contain multimodal distribution of pores with sizes from 0.1 nm to 10 nm, from 10 nm to 100 nm, from 100 nm to 1 micron, and/or larger than 1 micron. For example, the pore structure can contain pores with a bimodal distribution of sizes, including smaller pores, such as with sizes from 1 nm to 4 nm, and larger pores, such as with sizes from 30 to 50 nm. Such a bimodal distribution of pore sizes in a mesoporous particulate carbon material can be beneficial in S-containing cathodes in Li ion batteries, because the smaller pores, such as 1 to 4 nm in size, can confine the S, and in some cases control of saturation and crystallinity of S and/or of generated S compounds, in the cathode, and the larger pores, such as 30 to 50 nm in size, or pores greater than twice the size of solvated Li ions, can enable rapid diffusion (or, mass transfer) of solvated Li ions in the cathode.

The multi-modal porous particulate carbon and cathodic active material form a meta particle framework, where the cathodic electroactive materials, such as elemental S, can be arranged within mesoporous carbon pores/channels. Meta particle frameworks, such as particles and/or materials having deconvoluted properties, within the presently disclosed carbon-based structures can provide a low resistance electrical contact between the insulating cathodic electroactive materials, such as elemental S, and the current collector while providing high surface area structures that are beneficial to battery capacity. Deconvoluted properties can imply two properties put into close proximity which collectively provide an over-arching new property, such as magnetic and/or electrical susceptibility. Such thresholds may not be conventionally attainable through traditional monolithic materials.

Disclosed carbon-based structures featuring multi-modal porous structures, scaffolds, agglomerations, and/or the like can also benefit cathode stability by trapping some portion of the created polysulfides preventing them from migrating through the electrolyte to the anode. For example, the small pores in a mesoporous particulate carbon in a cathode can drive the creation of lower order polysulfides, such as S and $Li_2S$, and prevent the formation of the higher order soluble polysulfides, such as $Li_xS_y$, with y greater than 3, that facilitate Li shuttle to the anode. As described herein, the structure of the particulate carbon and the cathode mixture of materials can be tuned during particulate carbon formation, such as within a microwave plasma or thermal reactor. In addition, cathodic electroactive materials, such as elemental S, solubility, and crystallinity in relation to Li phase formation, can be confined/trapped within the micro/meso porous framework.

Anodes for Lithium Ion Batteries

The anodes for Li ion and/or Li S batteries contain a substrate, such as a metal foil substrate or a carbon substrate, and an anode mixture. The anode mixture contains a silicon material, such as elemental Si, LiSi, silicon-doped carbon allotropes, and the graphene-containing particulate carbons described herein doped with Si, one or more particulate carbons such as the graphene-containing and/or doped particulate carbons described herein, optionally graphene oxide, optionally one or more polymeric materials, and optionally one or more binders. The anode mixture can be formed from any process. For example, the anode mixture can be formed using wet coating processes where a slurry containing the anodes mixture and one or more solvents, where the solvent can be fully or partially removed upon drying, is deposited onto a substrate, or using dry deposition processes. One example of a dry deposition process is using a plasma torch where components, such as particles and/or other feedstock materials, are deposited onto a substrate using a plasma jet. The anodes contain silicon-carbon composite materials, and/or silicon particles coated with carbon materials. The anodes contain core-shell particles containing silicon, with either silicon or carbon materials at the core. The anodes contain multi-layer particles containing one or more layers of silicon and one or more layers of carbon, with either silicon or carbon materials at the core. The core-shell and multi-layer particles can be any shape, including those with large surface areas and/or mesoporous geometries.

A Li S battery with a silicon-containing anode is fabricated using the methods described herein, including depositing silicon-containing anodic materials within the pores of a structured composite material containing a porous media and an electrically conductive material, such as the particulate carbon. The anodes contain a slurry containing silicon particles. The silicon particles can contain elemental silicon or Li-silicon compounds and carbon composites thereof. Some examples of Li-silicon compounds are $Li_{22}Si_5$, $Li_{22-x}Si_{5-y}$, (where x=0-21.9, and y=1-4.9), and $Li_{22-x}Si_{5-y-z}M_z$ (where x=0-21.9, y=1-4.9, z=1-4.9, and M is S, Se, Sb, Sn, Ga, or as). The silicon materials can be amorphous, crystalline, semi-crystalline, nano-crystalline, or poly-crystalline. The silicon particles can be nanoparticles such as with median diameter below 50 nm, or about 100 nm, or about 500 nm, or about 1 micron, or micron sized particles with diameters from about 500 nm to about 10 microns.

The anodes contain graphene oxide. The graphene oxide provides oxygen to the materials in the anode during processing and/or operation. The oxygen can be provided to the materials in the anode via another method, such as by incorporating an oxygen containing compound other than graphene oxide into the anode. The anodes contain one or more polymeric materials, such as polyacrylonitrile (PAN). In some cases, the polymeric materials are carbonized, such as through a higher than room temperature anneal in an inert gas to form a phase of conductive carbon in the anode. In some cases, the polymeric material will remain a polymer in the anode, and act as a binder for particulate materials forming the anode. For example, polythiophene, PvDF-HFP, CMC, Nafion, PAN, SBR, or combinations thereof, can be used as binders in the anode.

The anode contains an active anodic material and a particulate carbon, where the particulate carbon has a mesoporous structure with a wide distribution of pore sizes, such as a multi-modal distribution. The anode includes silicon-containing anodic materials within the pores of a mesoporous particulate carbon. The mesoporous particulate carbon and anodic active material form a meta particle framework, where the anodic electroactive materials, such as silicon are arranged within the mesoporous carbon pores/channels. The meta particle framework can provide a low resistance electrical contact between the anodic electroactive materials, such as elemental Si, and the current collector while providing high surface area structures that are beneficial to battery capacity.

In some cases, the active silicon-containing anodic materials for the Li S battery anode contain silicon-containing particles with average particle size less than 100 nm, or less than 50 nm. Small Si particle sizes can be advantageous to prevent the Si containing anode materials from degrading, which commonly occurs in conventional silicon-containing anodes due to expansion of Si during battery operation. For example, in Li S batteries with anodes containing large Si particles, such as with average diameters greater than about 100 nm, or greater than about 50 nm, the expanded larger particles can fracture during battery operation due to the large volume expansion of Si during battery operation. In contrast, in Li S batteries with anodes containing smaller Si particles, such as with average diameters less than about 100 nm, or less than about 50 nm, the expanded size of the particles is relatively small, which mitigates fracturing of the Si particles during battery operation.

Carbon Particulates for Lithium Ion Batteries

The present Li ion batteries can incorporate particulate carbon into the cathode, anode, and/or one or both substrates with improved properties compared to conventional carbon materials. For example, the particulate carbon can have high compositional purity, high electrical conductivity, and a high surface area compared to conventional carbon materials.

The particulate carbon also has a structure that is beneficial for battery properties, such as small pore sizes and/or a mesoporous structure. In some cases, a mesoporous structure can be characterized by a structure with a wide distribution of pore sizes, such as with a multimodal distribution of pore sizes. For example, a multimodal distribution of pore sizes can be indicative of structures with high surface areas and a large quantity of small pores that are efficiently connected to the substrate and/or current collector via material in the structure with larger feature sizes, such as that provide more conductive pathways through the structure. Some non-limiting examples of such structures are fractal structures, dendritic structures, branching structures, and aggregate structures with different sized interconnected channels, such as composed of pores and/or particles that are roughly cylindrical and/or spherical.

The particulate carbon materials used in the substrates, cathodes and/or anodes described herein are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes. The substrate, cathode, and/or anode contains one or more particulate carbon materials. The particulate carbon materials used in the Li ion batteries described herein are described in U.S. Pat. No. 9,997,334, entitled "Seedless Particles with Carbon Allotropes," which is assigned to the same assignee as the present application, and is incorporated herein by reference as if fully set forth herein for all purposes. The particulate carbon materials contain graphene-based carbon materials that comprise a plurality of carbon aggregates, each carbon aggregate having a plurality of carbon nanoparticles, each carbon nanoparticle including graphene, optionally including multi-walled spherical fullerenes, and optionally with no seed particles, such as with no nucleation particle.

In some cases, the particulate carbon materials are also produced without using a catalyst. The graphene in the graphene-based carbon material has up to 15 layers. A ratio (such as percentage) of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$, or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5000 S/m, or from 500 S/m to 20,000 S/m.

The particulate carbon materials used in the substrates, cathodes and/or anodes in the Li ion batteries described herein are described in U.S. Pat. No. 9,862,606 entitled "Carbon Allotropes," which is assigned to the same assignee as the present application, and is incorporated herein by reference as if fully set forth herein for all purposes. The particulate carbon materials contain carbon nanoparticles comprising at least two connected multi-walled spherical fullerenes, and layers of graphene coating the connected multi-walled spherical fullerenes. Additionally, the carbon allotropes within the carbon nanoparticles can be well ordered. For example, a Raman spectrum of the carbon nanoparticle using 532 nm incident light can have a first Raman peak at approximately 1350 cm-1 and a second Raman peak at approximately 1580 cm-1, and a ratio of an intensity of the first Raman peak to an intensity of the second Raman peak is from 0.9 to 1.1. In some cases, the atomic ratio of graphene to multi-walled spherical fullerenes is from 10% to 80% within the carbon nanoparticles.

The particulate carbon materials described herein are produced using thermal cracking apparatuses and methods, such as any appropriate thermal apparatus and/or method described in U.S. Pat. No. 9,862,602, entitled "Cracking of a Process Gas," which is assigned to the same assignee as the present application, and is incorporated herein by reference as if fully set forth herein for all purposes. The particulate carbon used in the cathode and/or the anode contains more than one type of carbon allotrope. For example, the particulate carbon can contain graphene, spherical fullerenes, carbon nanotubes, amorphous carbon, and/or other carbon allotropes. Some of these carbon allotropes are further described in the related U.S. Patents and Patent Applications mentioned in this disclosure. Additionally, the different carbon allotropes in the particulate carbon can have different morphologies, such as mixtures of low and high aspect ratios, low and high surface areas, and/or mesoporous and non-mesoporous structures. The use of particulate carbon with combinations of different allotropes, and in some cases different morphologies, can enhance the electrical and mechanical properties of battery electrodes.

The mass ratio of a first carbon allotrope, such as with high electrical conductivity and/or a mesoporous structure, to a second carbon allotrope, such as a long chain carbon allotrope, in the particulate carbon can be from 70:30 to 99:1, or from 80:20 to 90:10, or from 85:15 to 95:5, or is about 85:15, or is about 90:10, or is about 95:5. For example, mesoporous carbon allotropes in the particulate carbon can provide high surface area and/or high electrical conductivity, and the addition of long chain, such as high aspect ratio, carbon allotropes in the particulate carbon can improve the mechanical strength, adhesion and/or durability of the battery, cathode and/or anode.

The particulate carbon used in the cathode and/or the anode contains particles containing graphene, such as with one or more of the properties described herein, and particles containing long chain carbon allotropes, such as spherical fullerenes connected in a string-like arrangement, or carbon nanotube bundles. The long chain carbon allotropes have aspect ratios greater than 10:1, or from 10:1 to 100:1, or about 10:1, or about 20:1, or about 50:1, or about 100:1. The long chain carbon allotropes have dimensions from 50 nm to 200 nm wide by up to 10 microns in length, or from 10 nm to 200 nm wide by from 2 microns to 10 microns in length. Additional particles containing long chain carbon allotropes are described in the related U.S. Patents and Patent Applications mentioned in this disclosure.

The mass ratio of a graphene-containing carbon allotrope to a long chain carbon allotrope in the particulate carbon can be about 85:15, or about 90:10, or about 95:5. The long chain carbon allotropes can interlock with other conductive, and in some cases structured, or mesoporous, carbon allotropes in the particulate carbon and can form an interlocked hybrid composite allotrope electrode with improved mechanical properties compared to electrodes without long chain carbon allotropes. The addition of long chain, such as fibrous like, carbon increases the medium range, such as 1 micron to 10 microns, conductivity, and the distribution of the other carbon allotrope, such as prevents agglomeration of the other carbon allotrope, such as mesoporous graphene particles, while improving mechanical stability.

Furthermore, the addition of long chain carbon allotropes can provide additional porosity around the carbon chain, which increases ion conductivity and mobility in the electrode. These long chain fibers enable reduced calendaring pressure during fabrication, leading to electrodes with increased local voidage or porosity, while maintaining the same or better mechanical stability, such as tolerance to delamination and/or cracking, as electrodes without long chain carbons that are calendared at higher pressures. Reduced calendaring pressure can be advantageous because the higher porosity achieved using a lower pressure leads to increase ion conductivity and/or mobility. Additionally, the addition of long chain carbon, such as fibers, can improve the elongation/strain tolerance over conventional slurry cast electrodes. In some cases, the elongation/strain tolerance, such as the maximum strain to failure, or the amount of performance degradation for a given strain, can be increased by as much as 50% over conventional slurry cast electrodes. The addition of long chain carbon allotropes to the particulate carbon in a battery electrode enables the use of less binder, or the elimination of the binder, in the electrode.

A mechanically robust, hybrid composite electrode film can contain particulate carbon with a combination of lower density, such as mesoporous, hierarchical graphene-containing particles, such as with particle sizes from 15 to 40 microns in diameter, and higher density particles containing long chains of connected spherical fullerenes, such as with sizes 50 to 200 nm wide by up to 10 microns in length. The mass ratio of graphene carbon allotropes to the long chain allotropes in this example is about 85:15. The particulate carbon in this example has high electrical conductivity, due to the high electrical conductivity of the graphene and/or spherical fullerenes, and the long chain allotropes provide mechanical reinforcement. In conventional battery electrodes containing conductive and/or active materials particles, a binder is often used to improve the electrode mechanical properties. The present battery electrodes are mechanically reinforced by long chain carbon allotropes, which enables the reduction or the elimination of a binder in the electrodes. For example, an interlocked hybrid composite allotrope electrode containing mesoporous graphene and long chain carbon allotropes can be formed with suitable mechanical properties without the use of a binder. Such electrodes with no binder can also be free-standing electrodes.

An interlocked hybrid composite allotrope electrode can be formed by sintering the particulate carbon after the carbon and active materials are combined in the assembly, such as after slurry casting. This process can be used to consolidate and strengthen the composite electrode structure. In a non-limiting example, carbon particles and aggregates containing graphite and graphene were generated using a microwave plasma reactor system, described in U.S. Pat. No. 9,767,992, entitled "Microwave Chemical Processing Reactor." The microwave plasma reactor in this example had a main body made from stainless steel with a quartz inner wall material. However, the quartz inner wall material is not needed in all cases, and similar carbon materials can be produced in reactors without quartz in or adjacent to the reaction zone.

It is beneficial to produce the particulate carbon in a reactor that does not have quartz in or adjacent to the reaction zone, because materials, such as oxygen, can decompose out of the quartz and become incorporated as unwanted impurities in the produced carbon materials. The reaction zone volume was approximately 45 $cm^3$. The precursor material was methane and was optionally mixed with a supply gas, such as argon. The flow rate of methane was from 1 to 20 L/min, the flow rate of the supply gas was from 0 to 70 L/min. With those flow rates and the tool geometry, the residence time of the gas in the reaction chamber was from approximately 0.001 second to approximately 2.0 seconds, and the carbon particle production rate was from approximately 0.1 g/hr to approximately 15 g/hr. After the aggregates were synthesized and collected, they were post-processed by annealing at a temperature from 1000 to 2200° C. in an inert atmosphere for a duration of approximately 60 to approximately 600 minutes. The particles produced in this example contained carbon aggregates containing a plurality of carbon nanoparticles, where each carbon nanoparticle contained graphite and graphene and did not contain seed particles. The particles in this example had a ratio of carbon to other elements, other than hydrogen, of approximately 99.97% or greater.

FIG. 3A shows a Raman spectrum of the particulate carbon of this example, taken using 532 nm incident light. The particles in FIG. 3A were produced using precursors containing argon. The spectrum has a 2D-mode peak 110 at approximately 2690 $cm^1$, a G-mode peak 120 at approximately 1580 $cm^{-1}$, and a D-mode peak 130 at approximately 1350 $cm^{-1}$, and the 2D/G intensity ratio is greater than 0.5. The 2D/G intensity ratio for the particles produced in FIG. 3A is approximately 0.7. The size of the aggregates in this example have a median of approximately 11.2 microns as synthesized, and approximately 11.6 microns after annealing. The size distribution of the as-synthesized aggregates had a 10th percentile of approximately 2.7 microns, and a 90th percentile of approximately 18.3 microns. The annealed aggregates size distribution had a 10th percentile of approximately 4.2 microns, and a 90th percentile of approximately 25.5 microns. The electrical conductivity of the aggregates was measured after being compressed into pellets. The as synthesized, such as before annealing, material had a conductivity of 800 S/m when compressed using 2000 psi of pressure, and a conductivity of 1200 S/m when compressed using 12,000 psi of pressure. The annealed material had a conductivity of 1600 S/m when compressed using 2000 psi of pressure, and a conductivity of 3600 S/m when compressed using 12,000 psi of pressure.

Figure 3C:
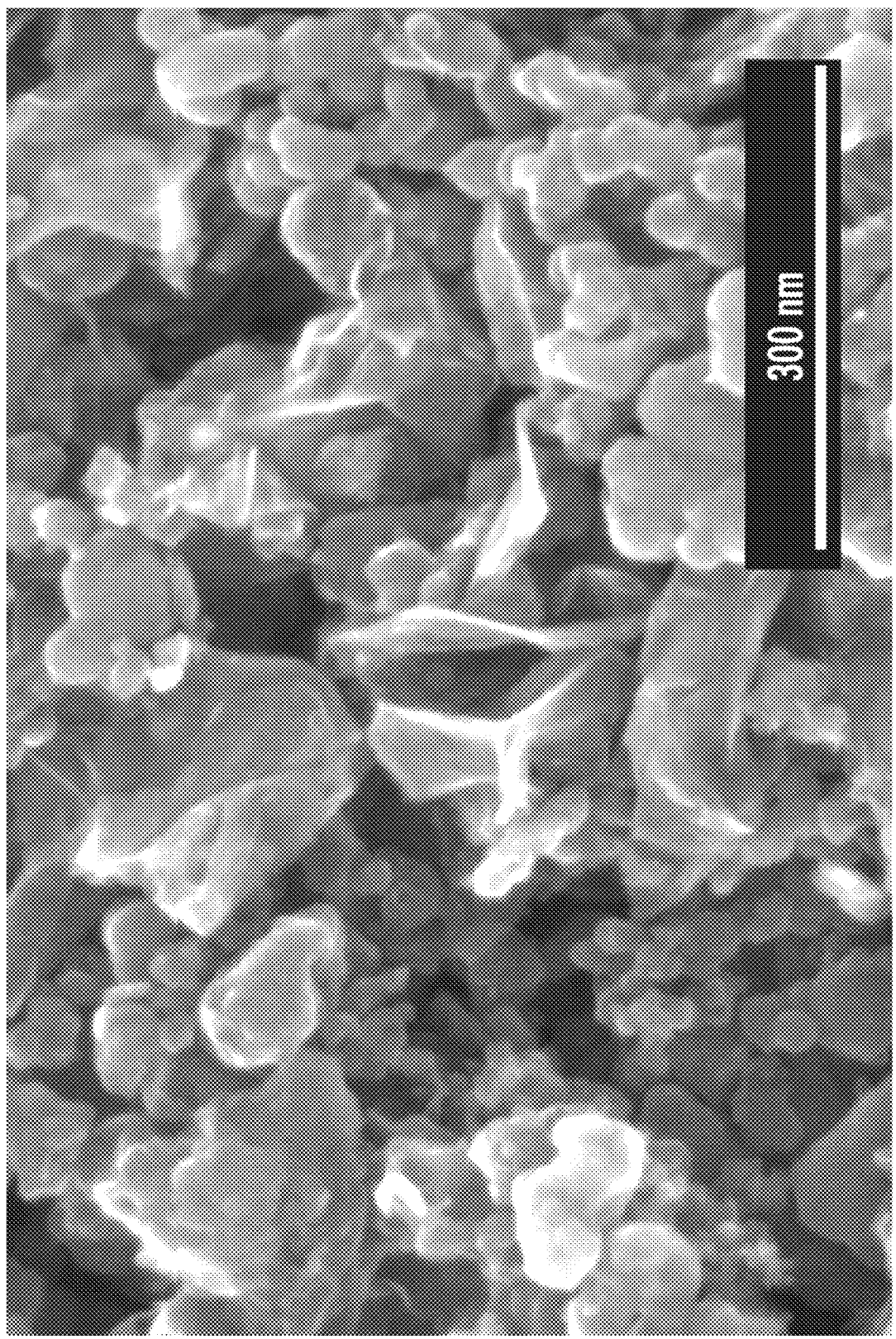
Figure 3D:
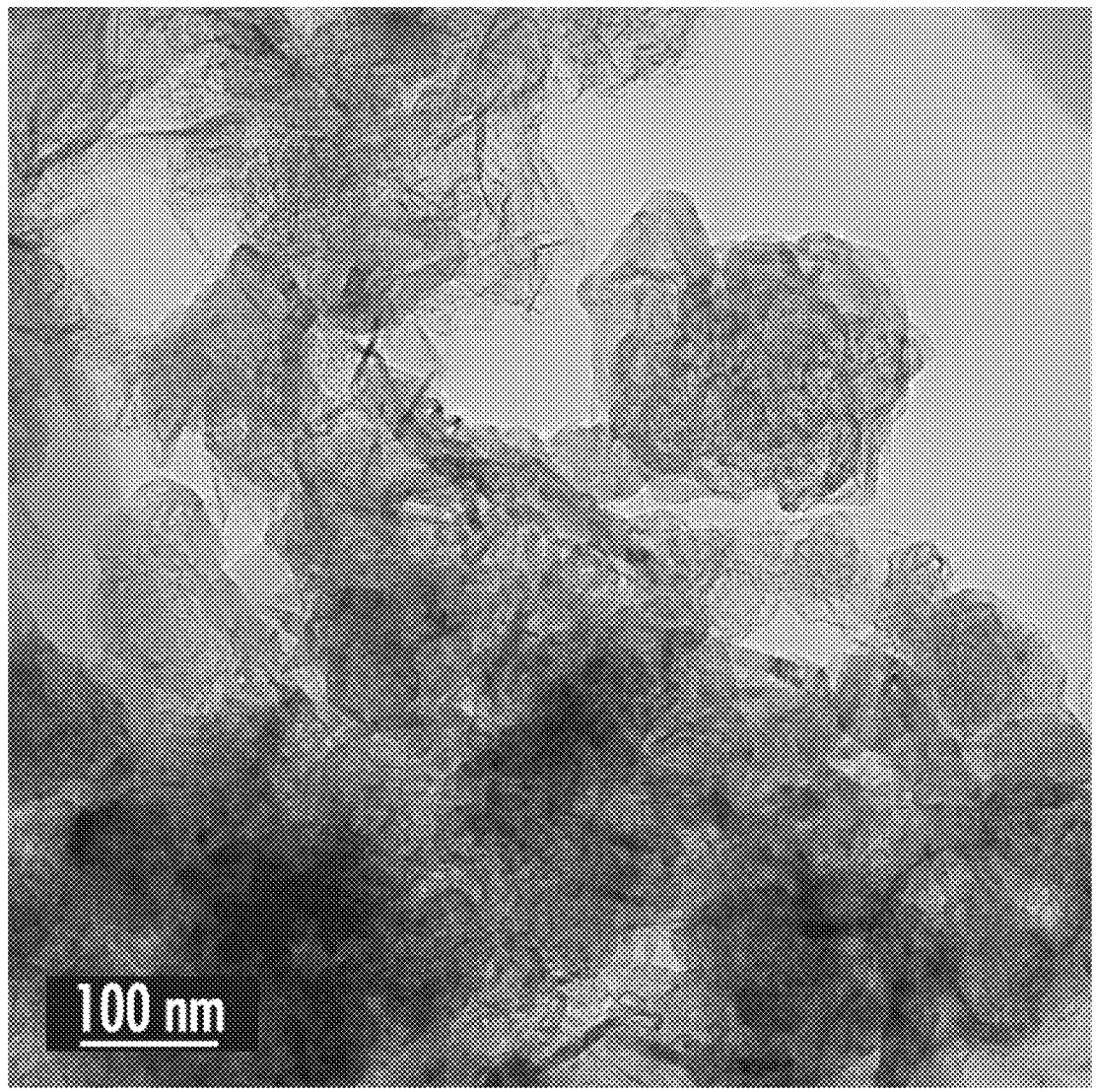
FIGS. 3D and 3E show transmission electron microscope (TEM) images for example carbon-based structures including graphene, according to some implementations.
Figure 3E:
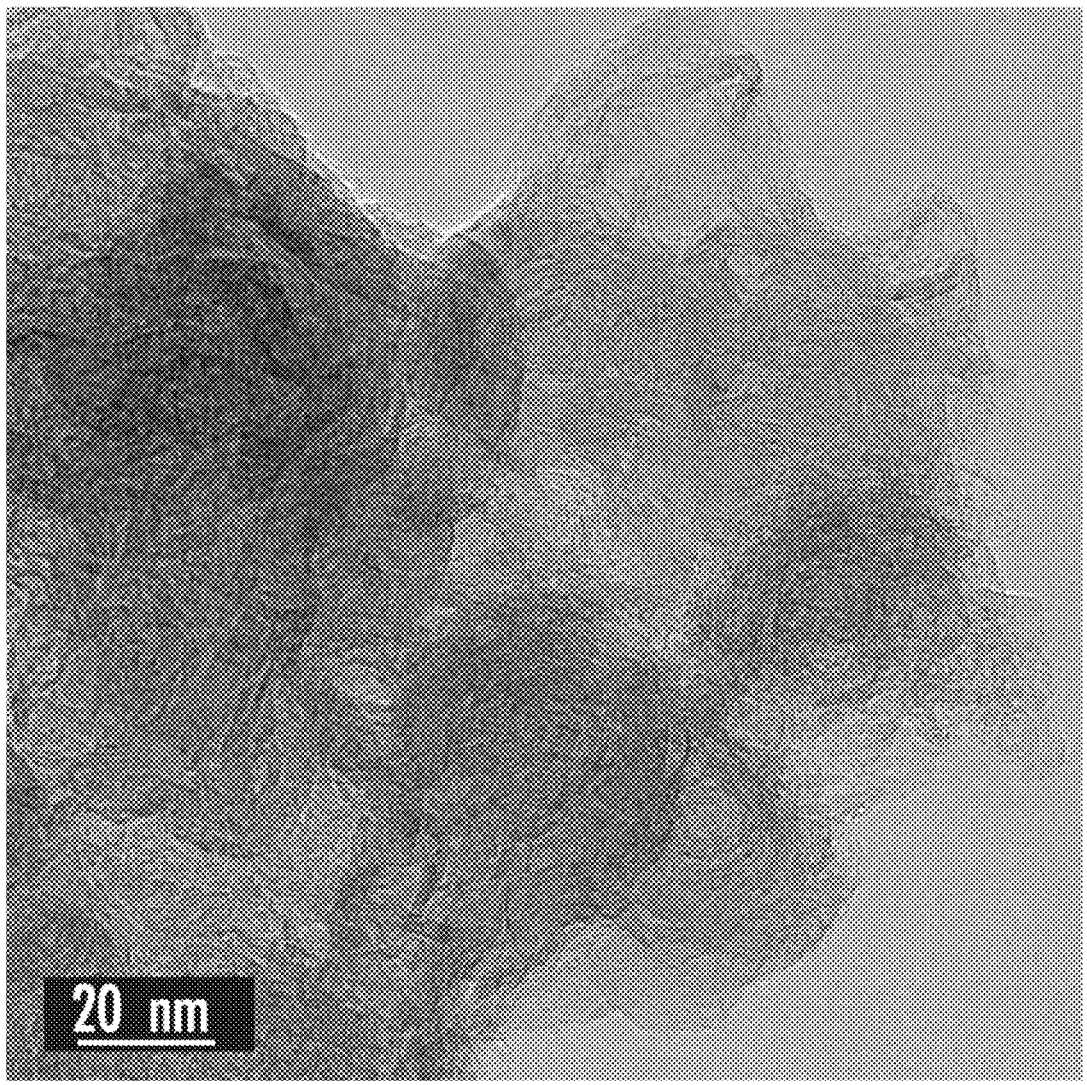

FIGS. 3B and 3C show SEM images, and FIGS. 3D and 3E show TEM images, of the carbon aggregates of the particulate carbon of this example showing graphite and graphene allotropes. The layered graphene is clearly shown within the distortion, such as wrinkles, of the carbon. The 3D structure of the carbon allotropes is also visible. The carbon allotropes in this example have a 3D structure with a hierarchical mesoporous, few layer, graphene structure with a specific edge-to-basal plane ratio. The edge-to-basal plane ratio for the graphene in the present particulate carbon is about 1:10, or about 1:100, or from 1:10 to 1:100.

The surface area of the aggregates in this example were measured using the nitrogen BET method and the density functional theory (DFT) method. The surface area of the aggregates as determined by the BET method was approximately 85.9 $m^2/g$. The surface area of the aggregates as determined by the DFT method was approximately 93.5 $m^2/g$. In contrast to conventionally produced carbon materials, the microwave plasma reactor produced carbon particles and aggregates in this example contained graphite and graphene had high purity, high electrical conductivities, and large surface areas. Additionally, these particles had Raman signatures indicating a high degree of order and contained no seed particles.

The particulate carbon in the cathode and/or the anode contains doped carbon materials, such as carbon doped with H, O, N, S, Li, Cl, F, Si, Se, Sb, Sn, Ga, As, and/or other metals, undoped carbon materials, or combinations thereof. Doped carbon can also include carbon with a matrix allotrope doped with carbon atoms, not in the matrix structure, and/or doped with other types of carbon allotropes. Doped carbon materials can also be doped with functional groups, such as amine ($NH_3$) groups. Doped carbon materials are formed using a dopant material, where the dopant material is introduced within a gas, liquid, or colloidal dispersion and fed into a reactor that is used to produce the doped particulate carbon. For example, dopant materials can be combined with a hydrocarbon precursor material and cracked in a reactor, such as a microwave plasma reactor or a thermal reactor, to produce a doped particulate carbon.

The particulate carbon in the cathode and/or the anode contains nano-mixed particulate carbon. The surface area, structure, and/or surface activity of the present particulate carbon materials are tuned by nano-mixing the carbon particles within the carbon materials with particles of other materials. Particles of nano-mix additive materials can be beneficially integrated with particles of the graphene-based carbon on a particle level, which shall be referred to as nano-mixing in this disclosure. The average diameter of the particles of the nano-mix additive material and the graphene-based carbon materials in the nano-mixed particulate carbon can be from 1 nm to 1 micron, or from 1 nm to 500 nm, or from 1 nm to 100 nm, or can be as small as 0.1 nm. The nano-mix additive material and the graphene-based carbon material are chemically bound, or are physically bound, together in the nano-mixed particulate carbon.

The nano-mixing involves introducing nano-mix additives during particulate formation, such as during a hydrocarbon cracking process in a microwave plasma reactor or in a thermal reactor, such that the nano-mix additive material is integrated into the graphene-based carbon material as the carbon material is produced, rather than combining a carbon raw material with an additive in a later process as in certain conventional methods. The nano-mix additive material can be introduced as a gas, liquid, or colloidal dispersion into a reactor that is used to produce the nano-mixed particulate carbon. As an example, silicon can be input into a reactor along with a hydrocarbon process gas, or other carbon-containing process material such as a liquid alcohol, to produce silicon nano-mixed with graphene, graphene-based carbon materials, and/or other carbon allotropes. In other examples, the resulting nano-mixed particulate carbon can contain particles of O, S, $Li_xS_y$ (where x=0-2 and y=1-8), Si, $Li_{22}Si_5$, $Li_{22-x}Si_{5-y}$ (where x=0-21.9, and y=1-4.9), and $Li_{22-x}Si_{5-y-z}Mz$ (where x=0-21.9, y=1-4.9, z=1-4.9, and M is S, Se, Sb, Sn, Ga, or As), and/or other metals.

The particulate carbon to be used in the cathode and/or the anode are produced and collected, and no post-processing is done. The particulate carbon to be used in the cathode and/or the anode are produced and collected, and some post-processing is done. Some examples of post-processing include mechanical processing, such as ball milling, grinding, attrition milling, micro-fluidizing, jet milling, and other techniques to reduce the particle size without damaging the carbon allotropes contained within. Some examples of post-processing include exfoliation processes such as shear mixing, chemical etching, oxidizing, such as Hummer method, thermal annealing, doping by adding elements during annealing, such as O, S, Li, Si, Se, Sb, Sn, Ga, As, and/or other metals, steaming, filtering, and lyophilizing, among others. Some examples of post-processing include sintering processes such as SPS, Spark Plasma Sintering, such as Direct Current Sintering, Microwave, and UV (Ultra-Violet), which can be conducted at high pressure and temperature in an inert gas. Multiple post-processing methods can be used together or in series. The post-processing will produce functionalized carbon nanoparticles or aggregates described herein.

Substrates for Lithium Ion Batteries

In some cases, the present cathode and/or anode materials are arranged on a dense or porous substrate and can contain any electrically conductive material. Some non-limiting examples of electrically conductive materials that can be included in the present substrates are metal foil, such as Ti foil, Ti alloy foil, stainless steel foil, Cu foil, Cu alloy foil, or other metallic foil, carbon paper, metal particles, oxide particles, carbon particles, carbon foam, and/or metal foam. The substrate of the electrodes, such as the anodes and/or cathodes, for Li ion, such as Li S, batteries contains carbon paper, carbon fibers, carbon nanofibers, carbon cloth, such as woven carbon fiber cloth, particulate carbon, or combinations thereof. The substrates can contain a single layer, multiple layers, an interpenetrating network of conductive and non-conductive materials, and/or conductive porous or solid films or coatings on non-conductive base materials, each of which can include one or more of the electrically conductive materials listed above. For example, a substrate can be formed from a metal foil coated with a porous layer containing conductive carbon allotropes, such as graphene. Another example of a substrate material is an interpenetrating network of carbon allotropes and non-conductive polymer.

The substrates can be carbon substrates that contain carbon materials that have high electrical conductivity, such as greater than 500 S/m, or greater than 1000 S/m, and/or high surface area, such as with surface area greater than 10 $m^2/g$, or greater than 50 $m^2/g$, when measured using a Brunauer-Emmett-Teller (BET) method with nitrogen as the adsorbate. The substrate can contain carbon paper. The carbon paper contains carbon fibers formed from a mixture of a particulate carbon, such as a particulate carbon described herein, and a polymer base material. The carbon fibers may be formed by, for example, by electrospinning. The polymer base material for the carbon paper can be, for example, polyacrylnitrile (PAN), polyaniline (PAni) or polythiophene (PTH), and may also include a co-polymer such as polyethylene oxide (PEO) or polyvinyl alcohol (PVA). The carbon paper can contain an active electrode material (such as S or silicon).

The substrates for the cathode and/or anode contain mixed allotrope carbon-based materials, such as electrically conductive carbon fiber mats that incorporate carbon fibers with more than one allotrope of carbon, such as a partially ordered carbon and graphene, or amorphous carbon and graphene. The carbon fibers of the mat comprise a matrix of a first carbon allotrope, such as amorphous or partially ordered carbon, and a second carbon allotrope that is highly ordered, such as graphene or fullerenes. The highly ordered second allotrope of carbon contains unique carbon materials, such the particulate carbon materials described herein, or fullerenes and/or connected fullerenes with properties that are improved over conventional carbon materials, such as improved atomic order, surface area, purity and/or electrical conductivity. Ordered or highly ordered carbon allotropes are carbon materials with a specific crystal structure, such as a crystal structure with hexagonally arranged carbon atoms in the case of graphene, and a low concentration of atomic defects, such as measured by Raman spectroscopy.

Additional substrates that can be used in the present batteries, including the mixed allotrope carbon fiber mats above, are described in U.S. patent application Ser. No. 15/905,157, entitled "Mixed Allotrope Particulate Carbon Films and Carbon Fiber Mats," which is assigned to the same assignee as the present application, and is incorporated herein by reference as if fully set forth herein for all purposes. The substrate is a carbon foam or a carbon paper that contains a further conductive additive and/or a non-conductive redox mediator additive. The redox mediator additive has a binding effect and is tethered to the carbon foam or carbon paper, and/or tethers polysulfides to the cathode.

The substrate is a carbon foam or carbon paper and contains a further metallic or non-metallic conductive substrate. The carbon foam or carbon paper is bonded to, or deposited on, a metallic or non-metallic conductive substrate. A metallic or non-metallic layer is deposited, such as by sputtering, onto the carbon foam or carbon paper. The metallic or non-metallic substrates described above can be porous or non-porous. The substrate is a carbon foam or carbon paper that includes carbon fibers made from polymer/carbon composites, such as ordered carbon particles mixed with PAN. In some cases, the polymer/carbon composites contain the particulate carbon materials described herein, graphene, graphene oxide, carbon nano-onions, graphite, and/or amorphous carbon. These types of carbon fibers can be formed using electrospinning, or other fiber spinning processes.

Additionally, metallic foams or wire meshes can be used for the substrates for the electrodes, such as the anodes and cathodes, for Li S or Li-ion batteries. Some examples of metallic foams that can be used as substrates are Ni foams, Cu foams and Al foams. Some examples of wire meshes that can be used as a substrate are Ni wire mesh, Cu wire mesh and Al wire mesh. The present substrates include particulate carbon with a mesoporous structure and the active cathode or anode materials are contained within the pores of the mesoporous substrate components. For similar reasons as described above, this structure can be beneficial to battery properties such as capacity and/or stability by providing high surface areas, small pores, and low resistance pathways from a current collector to the active materials. The substrates contain doped particulate carbon, such as a S-doped carbon, such as S-doped CNOs.

Electrolytes for Lithium Ion Batteries

The electrolyte can contain one or more solvents, a Li salt, and optionally a redox additive. In some cases, 1, 2, 3, or 4 solvents are used in the electrolyte. Some examples of solvents that can be used in the electrolyte are non-aqueous solvents, such as fluorinated solvents, vinyl solvents such as fluorinated ethers, and fluorinated dioxanes. Some examples of Li salts that can be used in the electrolyte are Li bis(fluorosulfonyl)imide (LiFSI), bis(trifluoromethane) sulfonimide Li salt (LiTFSI), and others. In addition to use in Li ion batteries, the electrolytes in this section can be used for other types of next generation secondary batteries including those where Na ions, Mg ions, or K ions replace the Li ions.

The redox additive can include one or more metallocenes. For example, the metallocene can contain a transition metal, such as a first d-block series transition metal, a second d-block series transition metal, and/or a third d-block series transition metal. Some examples of transition metals that can be in the redox additive are iron, ruthenium, osmium, rhodium, rhenium, iridium, and combinations thereof. In some cases, the metallocene can contain organic ligands. In some cases, these organic ligands can be electron donating and electron withdrawing group substituted N,N'-ligands. Some examples of organic ligands that can be included in the redox additives are cyclopentadienyl, pentamethylcyclopentadienyl, 2,2'-bipyridine (bpy), or combinations thereof. The concentration of the redox additive in the electrolyte is from 5 mM to 0.5 M. Some examples of redox additives are bis(cyclopentadienyl)ruthenium, bis(pentamethylcyclopentadienyl)ruthenium(II), ruthenium $(Bpy)_3$ $PF_6$, and bis(cyclopentadienyl)osmenium.

The electrolyte is soaked into a separator composed of a porous carbon-based polymeric material. Some non-limiting examples of polymers used in separators are polypropylene, poly-vinylidene fluoride and polyethylene or a mixture of said polymeric materials. Alternatively, the separator can be a gel or solid in the case of solid-state separators. In some cases, solid-state separators can be produced by printing. Alternatively, the separator can be a polymer mat containing Nafion or other polysulfide repelling agent and/or binding agent, and include a redox mediator as defined above. Polymer mat separators can be produced by techniques such as extrusion, spinning, weaving, electrospinning, or casting.

The binding agent, repelling agent, and/or redox mediator in separators, such as polymer mat separators, can act to retain the polysulfides near the cathode surface, mitigating migration thereof either by acting as a chemical repulsing, charge-based repelling agent or steric hindrance to polysulfide diffusion and/or migration away from the cathode through the separator or to the anode surface. Additionally, the particulate carbons described herein can be incorporated into the separators to further reduce polysulfide migration. Furthermore, the particulates incorporated into the separator can be comprised of a variety of particles, such as non-conductive oxides, doped oxides, nitrides, carbides, dispersed within the polymeric separator. The particles could also include other redox agents, such as the metallocenes discussed elsewhere in this disclosure. The particles incorporated into the separators could be of a variety of morphologies including nanoparticles, nanowires, and nanorods.

Combinations with Conventional Battery Materials

The cathodes, anodes, carbon substrates, and electrolytes described above can be utilized in Li ion batteries, such as Li S or Li-ion, in combination with conventional battery components. A Li-ion battery can be constructed using the cathodes described herein and a conventional Li ion anode material, such as Li, Si, graphite, C, etc., using associated conventional manufacturing processes and materials. A Li-ion battery can be constructed using the anodes described herein with a conventional Li ion cathode material, such as LCO, NCA, NMC, LFP, S, etc., using the associated conventional manufacturing processes and materials. A Li-ion battery can be constructed using the electrodes described herein with a conventional Li ion type electrolyte, such as containing Li salts such as $LiPF_6$, LiTFSI, LiFSI, etc., and solvents such as ethylene carbonate (EC), dimethyl carbonate (DMC), fluoroethylene carbonate (FEC), dioxolane (DOL), dimethoxyethane (DME), dioxane (DX), acetonitrile, etc.

Integration with a Li Ion and/or Li S Battery Electrode

Figure 4A:
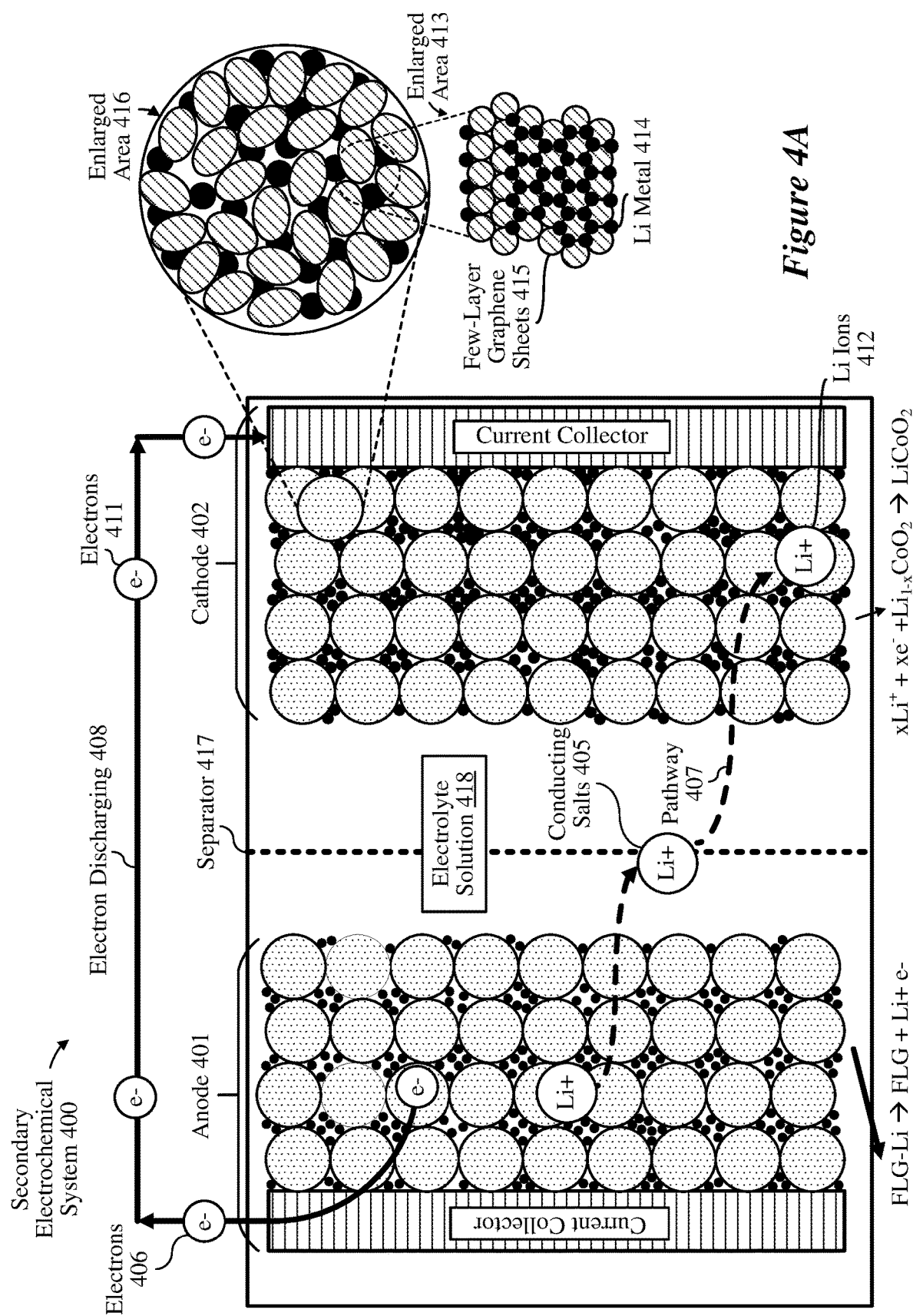
FIG. 4A shows a schematic diagram for an example Li ion or Li S battery, according to some implementations.

An example Li ion, or Li S, secondary electrochemical cell system 400 is shown in FIG. 4A, having an anode 401 and cathode 402 separated by a separator 417. Any one or more of the anode 401 and the cathode 402 can be substantially formed by a lithiated carbon scaffold, and represented here in a simplified representation of the larger and smaller carbon particles, structures, agglomerations, aggregates and/or the like shown in FIGS. 3B-3E, all of which are at least partially confine an electrolyte solution 418 containing dissociated Li ion conducting salts 405 as shown. The separator, a porous membrane to electrically isolate the anode 401 and the cathode 402 from each other, is also in the position showed. Single Li ions migrate through pathway 407 back and forth between the electrodes of the Li ion-battery during discharge-charge cycles and are intercalated into carbon-based active materials forming any one or more of the anode 401 and the cathode 402 for confinement therein as necessary for optimal secondary electrochemical cell 400 performance.

Electrolytes, such as the electrolyte solution 418, can be generally categorized into several broad categories, including liquid electrolytes and solid electrolytes. The liquid electrolyte is most commonly used electrolyte system across many conventional batteries due to its high ionic conductivity, low surface tension, low interface impedance, and good wettability within the electrode. In Li S battery systems, liquid electrolytes dominate because they help compensate for a lot of the potentially encountered poor electrochemical kinetics of S and lithium sulfide ($Li_2S$). In Li S systems, a liquid electrolyte containing an ether-based solvent can be used, since because ether-based solvents, unlike carbonates, do not negatively react with S and generally have better Li ionic transport properties. A potential drawback of using ether-based electrolytes includes solubility of long chain polysulfides (PS), which can eventually lead to Li S electrochemical cell degradation due to PS shuttle, migration, and volumetric expansion of the cathode leading to compromise of its structural integrity.

Outside of conventional liquid-phase electrolytes, solid state electrolytes can be potentially configured to stop formation and growth of Li dendrites, and to stop the PS shuttle as solid state electrolytes effectively convert Li S systems from a multi-phase system to a single-phase system, resulting in no internal shorting, no leakage of electrolytes, and non-flammability. Solid polymer electrolytes can be defined as a porous membrane possessing the ability to transport Li ions across that membrane. A solid electrolyte can be further categorized into solid polymer electrolytes, gel polymer electrolytes, and non-polymer electrolytes. A solid polymer electrolytes can be composed of a lithium salt dissolved in a high molecular weight polymer host. Common polymer hosts used are polyethylene glycol (PEO), polyvinylidene fluoride or polyvinylidene difluoride (PVDF), poly(p-phenylene oxide) or poly (PPO), poly(vinylidene fluoride-co-hexafluoropropylene) (PVDF-HFP), and poly(methyl methacrylate) (PMMA), etc.

Gel polymer electrolytes can be similar to solid polymer electrolytes in that they have a high molecular weight polymer, but also include a liquid component tightly trapped within the polymer matrix. Gel polymer electrolytes, in some implementations, were developed to compensate for poor ionic conductivity observed in solid polymer electrolytes. Over other forms of solid electrolytes, non-polymer solid electrolytes have advantages of high thermal and chemical stability.

Non-polymer solid electrolytes consist of a ceramic and commonly found non polymer electrolytes include LIthium Super Ionic CONductor (LISICON), $Li_7La_3Zr_2O_{12}$ (LLZO), $Li_7La_{2.75}Ca_{0.25}Zr_{1.75}Nb_{0.25}O_{12}$ (LLCZN), Garnet, and Ge-Doped $Li_{0.33}La_{0.56}TiO_3$ (Ge-LLTO) Perovskite, etc., and can have a thickness in a range of approximately 0.5 μm to 40 μm, which can be configured to substantially prevent any one or more of Li dendrite formation or growth. Nevertheless, some solid electrolytes can suffer from certain challenges including relatively poor Li ionic conductivity and weight. At the thicknesses needed to prevent Li dendrite growth, observed ionic impedance can so high that a so-equipped Li ion or Li S battery may not function as desired, while at the thicknesses needed to have acceptable Li ionic conductivities, Li dendrite growth may not be prevented.

During discharging, Li is deintercalated from the anode 401. The active materials of the cathode 402 can include mixed oxides. Active materials of the anode 401 can include primarily graphite and amorphous carbon compounds including those presented herein. These are the materials into which the Li is intercalated.

The Li ion conducting salt 405 can dissociate to provide mobile Li ions available for intercalation into any one or more of the unique carbon-based structures disclosed herein that can be incorporated into any or more of the anode 401 or the cathode 402 as a formative material to achieve specific capacity retention capability exceeding 1,100 mAh/g or more as facilitated by the contiguous microstructures 107E. Li ions form complexes and/or compounds with S in Li S systems and are temporarily confined during charge-discharge cycles at levels not otherwise achievable through conventional unorganized carbon structures that require adhesive definition and combination via a binder, which can as discussed earlier also inhibit overall battery performance and longevity.

The pores 105E of the contiguous microstructures 107E shown in FIG. 1E, which may form the carbon-based particle 100A, 100D, and/or the like and be used to produce conductive graded film layers for any one or more of the anode 501 or the cathode 502 can be defined, during synthesis, to include a micropore volume (pores<1.5 nm). Sulfur (S) is infused via capillary force into the pores 105E where the S is be confined. Successful microconfinement of sulfur would prevent dissolved polysulfides (PS), as presented earlier regarding Li S systems generally, from precipitating outside of their original pores. To achieve an active carbon composite capable of holding achievable quantities of S, a pore volume of 1.7 cc/g with all 1.7 cc/g attributed to pores with an opening <1.5 nm may be needed.

Operationally, in either Li ion or Li S systems, Li ions migrate from the anode 401 through the electrolyte solution 418 and the separator 417 to the cathode 402. Here, molten Li metal 414 micro-confined, as shown in enlarged areas 416 and 413, within few-layer graphene sheets 415 associated with any of the presently disclosed carbon-based structures used as formative materials for the anode 401 or the cathode 402. Molten Li metal may dissociate in the anode 401 pursuant to the following equation (8):

$$FLG-Li \rightarrow FLG+Li+e-  \qquad (8)$$

Eq. (8) shows electrons 406 and 411 discharging 408 to power an external load such that Li ions 412 migrating to cathode 402 return to a thermodynamically favored position within a cobalt oxide-based lattice pursuant to the following equation (9):

$$xLi^+ + xe^- + Li_{1-x}CoO_2 \rightarrow LiCoO_2. \qquad (9)$$

During charging, this process is reversed, where the lithium ion conducting salts can 405 return-migrate from the cathode 402 through the electrolyte solution 418 and the separator 417 to the anode 401.

Disclosed carbon-based structures, referring to the surprising favorable specific capacity values made possible by the unique multi-modal hierarchical structures of carbon-based particle 100A, 100D and/or derivatives thereof, including a carbon scaffold and lithiated carbon scaffold, any one or more of which can be configured to build upon traditional advantages offered by Li ion technology. Compared to sodium or potassium ions, the relatively smaller Li ion exhibits a significantly faster kinetics in the different oxidic cathode materials. Another difference includes that, as opposed to other alkaline metals, Li ions can intercalate and deintercalate reversibly in graphite and silicon (Si). And, a lithiated graphite electrode enables higher cell voltages. Disclosed carbon-based material therefore enhance the ease through which Li ions can intercalate and deintercalate reversibly between graphene sheets, due to the unique lay-out of few-layer graphene (FLG), such as 5-15 layers of the graphene sheets 101C in a substantially stacked orientation, as employed in carbon-based particle 100A and/or the like, and are suitable for application hardcase, pouch cell, and prismatic applications.

Lithium Ion Battery Performance

Figures 4B, 4C:
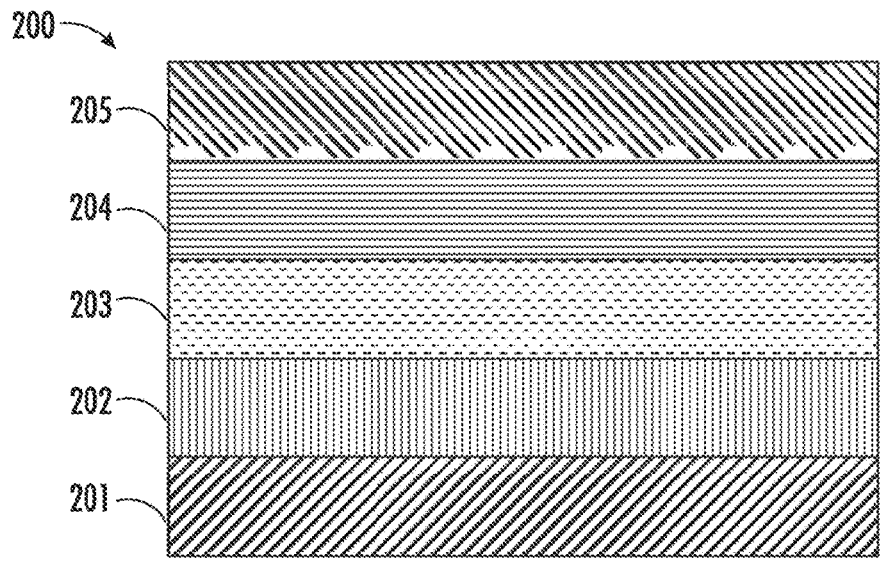
FIG. 4B is an example of a Li ion battery, according to some implementations.
FIG. 4C is a table showing the theoretical and/or practical capacities Li ion and/or Li S electrodes and/or batteries, according to some implementations.

FIG. 4B shows an example of a Li ion battery 200. In this example, a cathode 202 is arranged on a substrate 201, and an anode 204 is arranged on a substrate 205. The electrolyte 203, optionally including a separator, is arranged in between the cathode and anode electrodes to form the battery. The substrates 201 and 205, the cathode 202, the anode 204, and the electrolyte 203 can contain any of the materials described above.

FIG. 4C shows the theoretical and practical capacities for Li ion battery and/or a Li S battery electrodes and batteries containing non-limiting examples of different anode and cathode materials. FIG. 4C shows the promise of the present silicon-based anodes ($Li_{22-x}S_{5-y}$ or elemental Si in this example) compared to other conventional anode compounds, Li and $C_6$, for improving the capacity of the anodes in Li ion batteries. FIG. 4C also shows the promise of the present S cathodes, elemental S or $Li_2S$ in this example, compared to conventional cathode materials, LCO and NMC, for improving the capacity of the cathodes in Li ion batteries.

FIG. 4C also gives a non-limiting example of a full cell using $Li_2S$ cathodes and $Li_{22-x}S_{5-y}$ or elemental Si anodes compared to a conventional cell having an NMC cathode and LiC6 anode, where the practical battery specific energy, in units of Wh/kg, where the mass in kg refers to the mass of the entire integrated battery including packaging, has been improved from 160 Wh/kg to greater than 345 Wh/kg or greater than 600 Wh/kg, respectively. The capacity of a Li ion battery is greater than 300 Wh/kg, or greater than 400 Wh/kg, greater than 500 Wh/kg, or greater than 600 Wh/kg, or greater than 800 Wh/kg, or greater than 1000 Wh/kg. The capacity of a Li ion battery can be improved 2×, 3×, 4×, 5×, or greater than 5× compared to conventional Li ion batteries.

Figure 5:
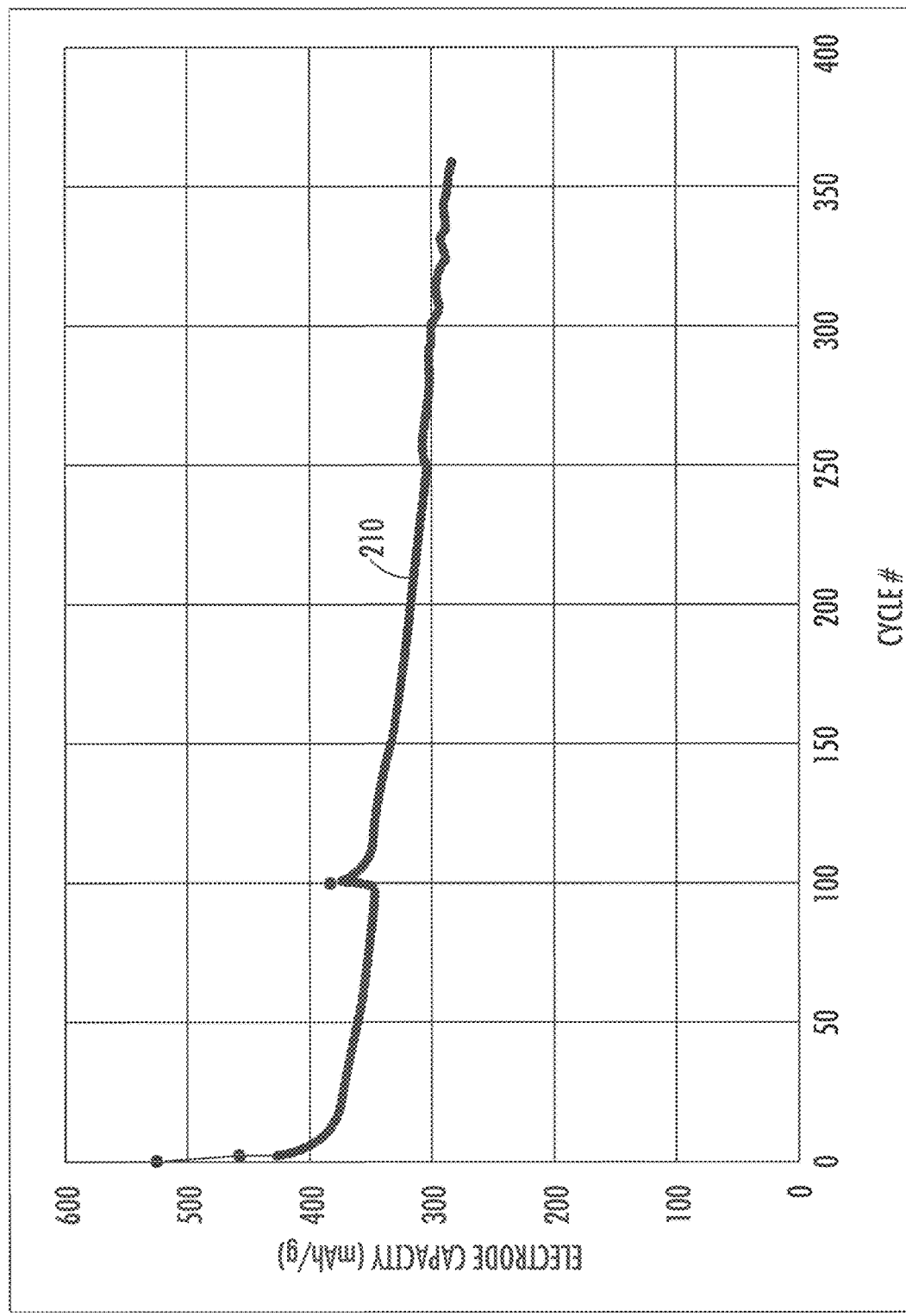
FIG. 5 shows an example of an electrode specific capacity of a S-loaded cathode, according to some implementations.

FIG. 5 shows an experimental example of the capacity of the S-based cathodes described herein, over about 350 charge/discharge cycles. In this example, the cathode contained $Li_2S$ active material, and particulate carbon in a mass ratio of 2:1. The anode was elemental Li, and the electrolyte was a mixture of Li bis(fluoromethane)sulfonimide, in a 1:1 volume ratio of DOL:DME solvent with a ferrocene redox mediator. The current collector for the cathode was carbon paper, and the current collector for the anode was copper foil. The particulate carbon in this example was produced using a microwave reactor as described in the aforementioned U.S. Patents." The y-axis for the capacity curve 210 is in the units of mAh per gram of total cathode (not per gram of S). The S cathode shown in curve 210, for example, has a capacity of about 300 mAh per gram of cathode material over about 300 cycles, about 2× that of a conventional metal oxide cathode in a Li ion battery. The results shown in FIG. 5 demonstrate that the capacity of the present cathodes are greater than 300 mAh, or greater than 400 mAh, or greater than 500 mAh, or from 300 to 600 mAh per gram of cathode. However, the processing conditions for the cathodes in this example were not optimized, and these results also indicate that upon further process optimization the capacity of the present cathodes can be greater than 400 mAh, or greater than 600 mAh, or greater than 800 mAh, or greater than 1000 mAh, or from 400 mAh to 1200 mAh per gram of cathode after 100 cycles, or after 200 cycles, or after 300 cycles, or after more than 300 cycles.

The present cathodes have high capacities, such as those shown in FIG. 5, and the high capacity is maintained at fast discharge rates. For example, the discharge rate for a S cathode described herein can be about 500 mAh per gram of cathode at slow discharge rates, such as C/18 and C/10 rates, where the total capacity C is discharged in 18 and 10 hours respectively, and can be reduced only slightly to about 400 mAh per gram of cathode at a rate that was about 10× faster, such as 1C rate, where the total capacity C is discharged in 1 hour. The reduction in capacity of a S-based cathode is from 2% to 10% between a rate of C/10 to C/2.

Figure 6A:
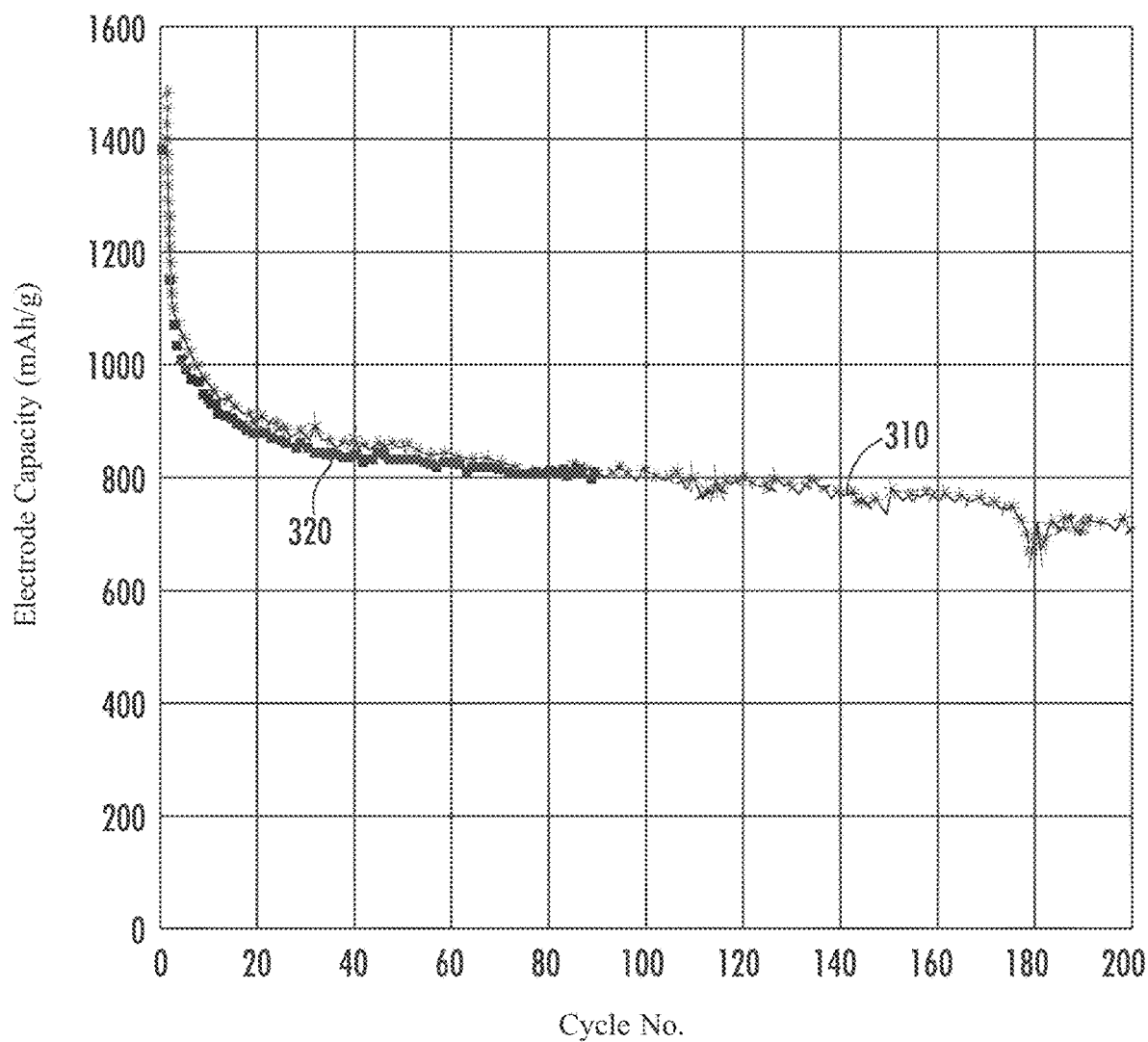
FIGS. 6A and 6B show graphs for the specific capacities of two different example silicon (Si) based anodes, according to some implementations.
Figure 6B:
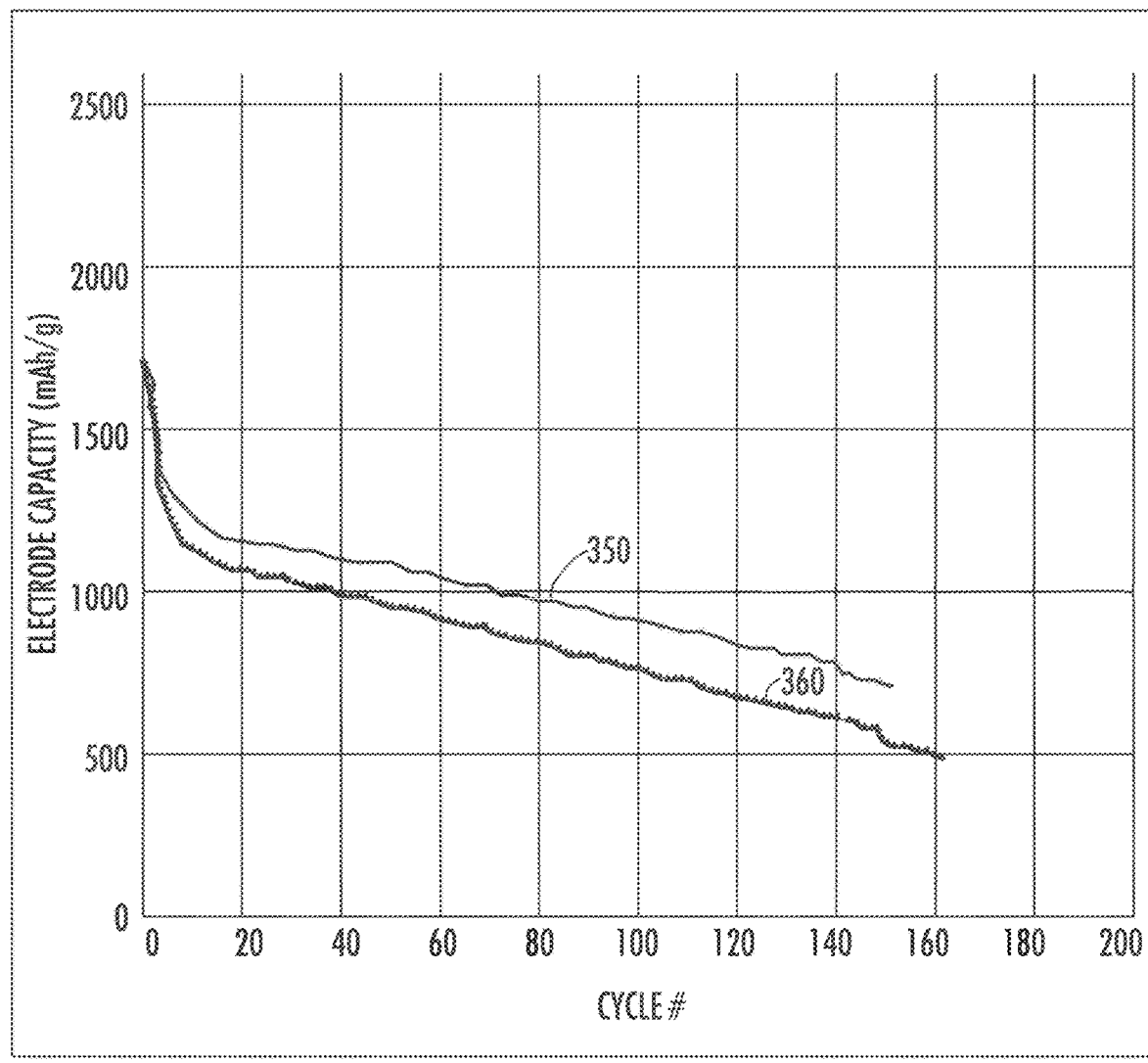

FIGS. 6A and 6B show example capacities of two different examples of silicon-based anodes described herein, in different examples over about 100 to 200 charge/discharge cycles. The anodes whose capacities are plotted in FIG. 6A contain particulate LiSi active material and particulate carbon in a mass ratio of 60:40. The anodes whose capacities are plotted in FIG. 6B contain 60% by mass particulate Si active material, 20% by mass PAN binder, 19% by mass S-doped particulate carbon, and 1% by mass graphene oxide. The particulate carbon and S-doped particulate carbon in both of these examples were produced using a microwave reactor as described in the aforementioned U.S. Patents."

The cathode in these examples was elemental Li foil, and the electrolyte was a mixture of Li bis(fluoromethane) sulfonimide, in a 1:1 volume ratio of DOL:DME solvent with a ferrocene redox mediator. The current collector for the cathode in these examples was Li foil, and the current collector for the anodes was carbon paper. The y-axis for the capacity curves in FIGS. 6A and 6B is in the units of mAh per gram to total anode, not per gram of silicon. The LiSi anodes shown in curves 310 and 320 in FIG. 6A, for example, have capacities of about 800 mAh per gram of anode material over more than 100 cycles, which is more than 2× that of a conventional graphite anode in a Li ion battery. The Si anode capacities are shown in curves 350 and 360. These anodes have capacities of about 750 mAh and 900 mAh per gram of anode material over more than 100 cycles, which is more than 2× or about 3× that of a conventional graphite anode in a Li ion battery.

The results shown in FIGS. 6A and 6B demonstrate that the capacity of the present anodes are greater than 500 mAh, or greater than 750 mAh, or greater than 900 mAh, or from 500 mAh to 1100 mAh per gram of anode after 100 cycles. However, the processing conditions for the anodes in this example were not optimized, and these results also indicate that upon further process optimization the capacity of the present cathodes can be greater than 1000 mAh, or greater than 1500 mAh, or greater than 2000 mAh, or greater than 3000 mAh, or from 1000 mAh to 3500 mAh per gram of anode after 100 cycles, or after 200 cycles, or after 300 cycles, or after more than 300 cycles.

The present anodes have high capacities, such as those shown in FIGS. 6A and 6B, and the high capacity is maintained at fast discharge rates. For example, the discharge rate for an example of a silicon-based anode described herein can be about 5× slower for a C/10 rate, where the total capacity C is discharged in 10 hours, compared to a C/2 rate, where the total capacity C measured at a low rate is discharged in 2 hours. The reduction in capacity of a silicon-based anode is from 2% to 10% between a rate of C/10 to C/2.

Figure 7:
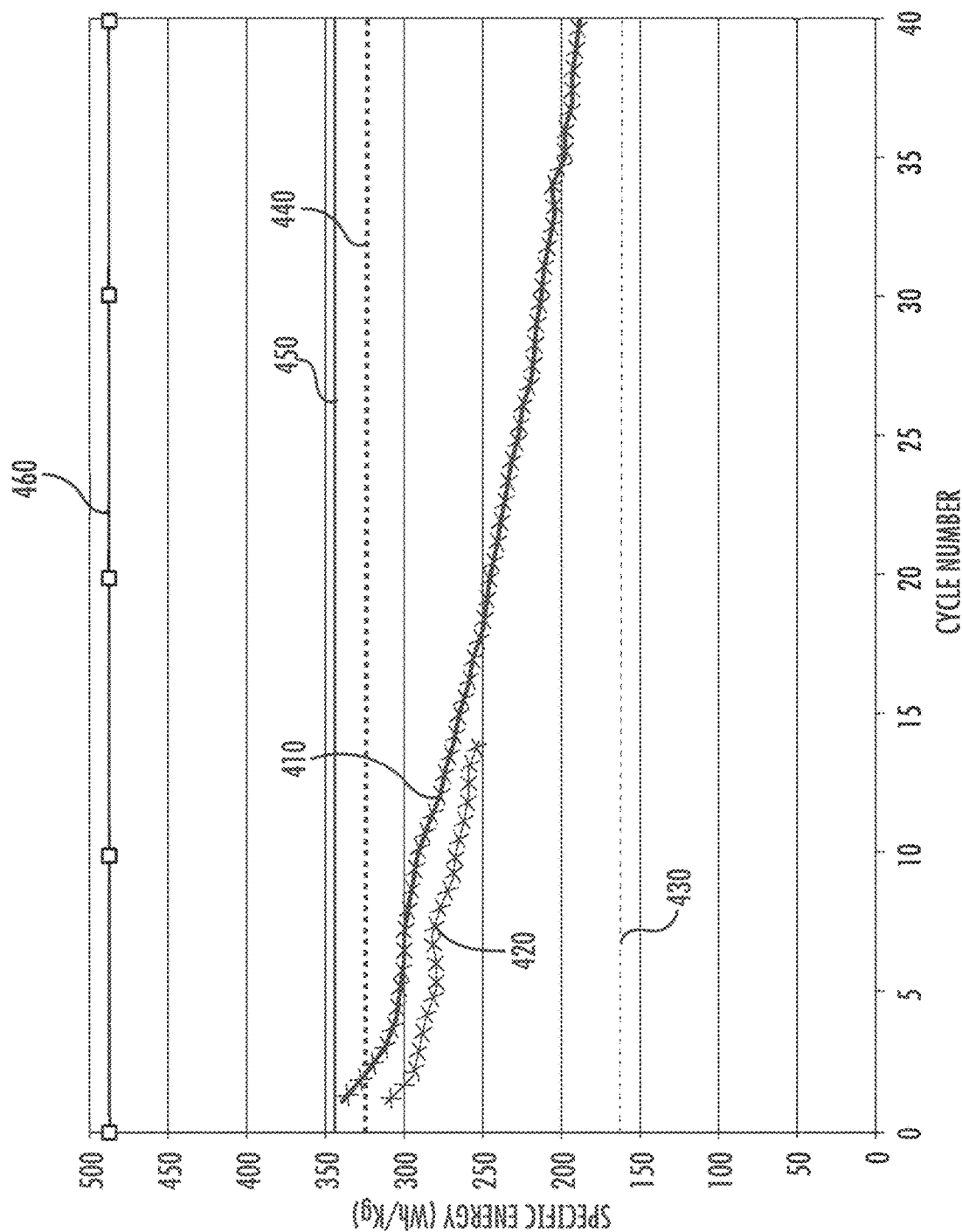
FIG. 7 shows a graph for the performance of two example Li ion batteries, according to some implementations.

FIG. 7 shows example performance of two examples of present Li ion batteries, such as cells, over about 40 charge/discharge cycles. The specific energy of the cells 410 and 420 are plotted in FIG. 7 in the units of Wh/kg, where the mass in kg refers to the mass of the entire integrated battery including packaging. The specific energy of a conventional Li ion battery, such as containing a metal oxide cathode and a graphite anode, is shown in 430, and 2X the specific energy of a conventional Li ion battery is shown in 440. The cells in this example included anodes containing particulate LiSi active material and a PAN binder in a mass ration of 0.75:1. The cells in this example included cathodes containing $Li_2S$ active material and particulate carbon in a mass ratio of 2:1. The cells in this example also included electrolytes containing LiFSI and a 1:2 ratio by volume DX:DME solvent with polysulfide additions. The current collectors for the anodes were copper foil, and the current collectors for the cathodes were aluminum foil. The cells in this example displayed initial specific energies from 300 Wh/kg to 350 Wh/kg, which is about 2× the specific energy of a conventional Li ion battery.

The curve 450 shows an example of a specific energy of a present cell. The results shown in FIG. 7 demonstrate that the specific energy of the present cells is greater than 200 Wh/kg, or greater than 250 Wh/kg, or greater than 300 Wh/kg, or from 200 Wh/kg to 350 Wh/kg after 10, 20, 30 or 40 cycles. However, the processing conditions for the cells in this example were not optimized, and these results also indicate that upon further process optimization the specific energy of the present cells can be greater than 350 Wh/kg, or greater than 400 Wh/kg, or greater than 450 Wh/kg, or greater than 500 Wh/kg, or from 300 Wh/kg to 600 Wh/kg after 10, 20, 30, 40, or more than 40 cycles. The specific energy is about 500 Wh/kg, and the energy density is about 500 Wh/L, where the volume in L refers to the volume of the entire battery including packaging. The energy density of a Li ion battery is greater than 300 Wh/L, or greater than 400 Wh/L, greater than 500 Wh/L, or greater than 600 Wh/L, or greater than 800 Wh/L, or greater than 1000 Wh/L, or from 300 to 1200 Wh/L.

Methods to Produce Li Ion and/or Li S Batteries

Figure 8:
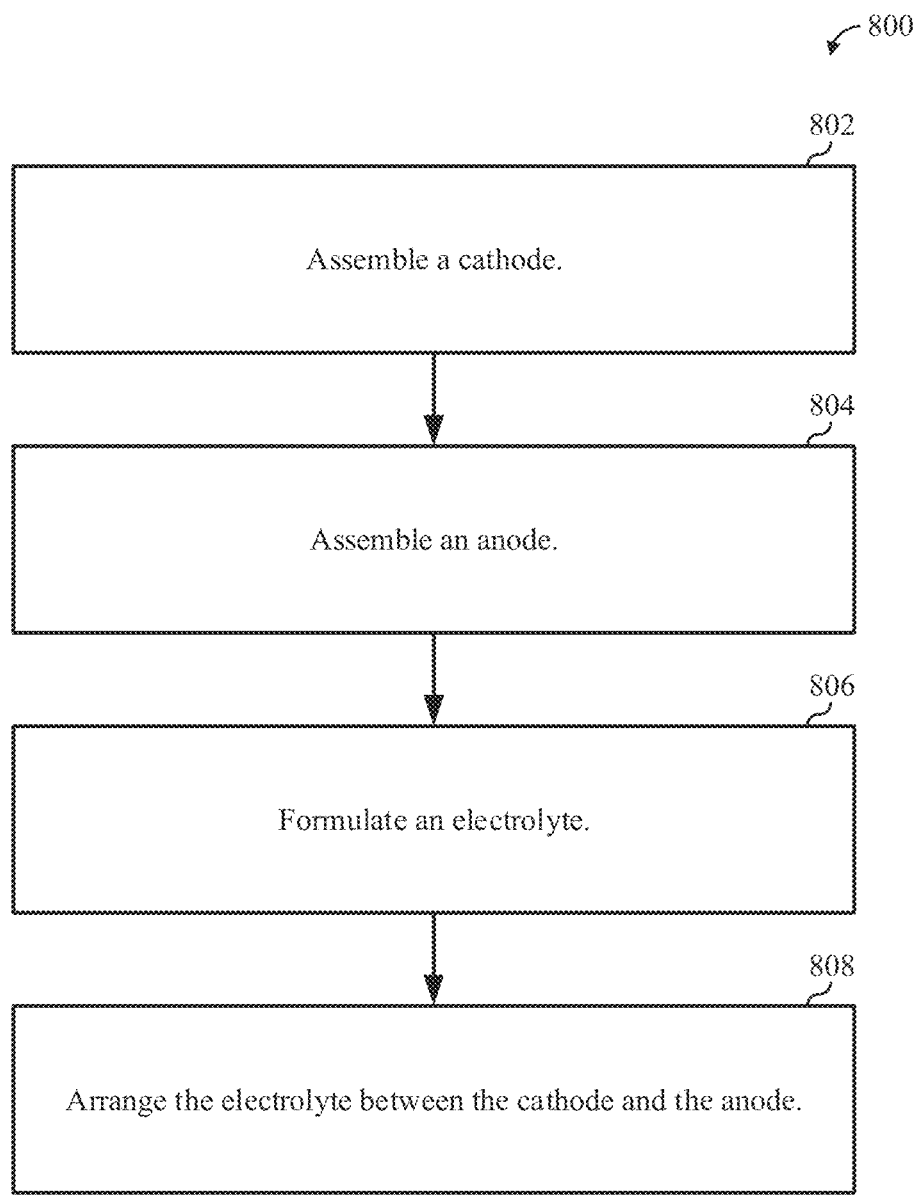
FIG. 8 is a flowchart of an example method to produce a Li ion battery, according to some implementations.

FIG. 8 shows an example of a method 800 to produce a Li ion battery. In this example, a method to produce a Li ion battery comprises assembling a cathode 802, assembling an anode 804, formulating an electrolyte 806, optionally providing a separator containing the electrolyte (not shown), and arranging the electrolyte and the optional separator between the anode and the cathode 808. Assembling the cathode 802 comprises the steps of: providing a substrate such as carbon fiber paper or metal foil; formulating a slurry comprising S, $Li_2S$, NCM, LFP, a first particulate carbon, and optionally a binder; and pressing the slurry into or on the substrate. Assembling the anode 804 comprises the steps of: providing a substrate such as carbon fiber paper or metal foil; formulating a slurry comprising silicon or LiSi particles, a second particulate carbon, graphene oxide (or other oxygen source), a polymer, and a first solvent; and pressing the slurry into or on the substrate.

The cathodes are formed from a cathode slurry containing a S material, such as elemental S and/or $Li_2S$, one or more particulate carbons, optionally a conventional Li ion cathode material, optionally one or more polymeric materials, optionally one or more binders, and one or more solvents. Some examples of solvents that can be included in the cathode slurry are acetonitrile, N-Methyl-2-pyrrolidone (NMP), diglyme, dimethoxyethane (DME), septane, hexane, benzene, toluene, dichloromethane, ethanol, and variants of the same. Some examples of conventional Li ion cathode materials include NCM, LFP, Li cobalt (LCO), and nickel cobalt aluminum (NCA).

The anodes are deposited from an anode slurry. In some cases, the anode slurry can be coated and dried on, or pressed onto or pressed into, the anode substrate to form the anode. The anode slurry contains silicon material, such as elemental Si, LiSi, silicon doped CNOs, one or more particulate carbons, one or more solvents, optionally graphene oxide, optionally one or more polymeric materials, and optionally one or more binders. Some examples of solvents that can be used in the anode slurry are dimethylformamide (DMF), diglyme, tetraethylene glycol dimethyl ether (TEGDME), polyethylene glycol dimethyl ether (PEGDME), water, N-Methyl-2-pyrrolidone (NMP), variants of the same, and other solvents compatible with the Si-based anodes used.

In some cases, cathodes can be produced using other solution-based methods. For example, $Li_2S$ active cathode material can be dissolved in a solvent, the solvent mixture can be coated on a substrate, and upon drying the $Li_2S$ can precipitates to form the $Li_2$—S particles in the cathode. Formulating the electrolyte 630 comprises the steps of: providing a second solvent, a Li salt, and a redox additive comprising a metallocene; and combining the second solvent, Li salt and redox additive. Reactors are used in the formation of the particulate carbon, for example by cracking gas, liquid, and/or colloidal dispersion precursors. In some cases, the reactors used to create the particulate carbon are configured to deposit the created particles directly onto a substrate, such as a moving substrate in a drum coater type configuration. Such methods can be advantageous since the slurry process can be eliminated, which simplifies manufacturing. The unique microwave plasma reactors described herein are used to produce the particulate carbon materials described herein and films composed of various carbon allotropes and/or numerous other elements and compounds in isolation or in combination.

Plasma spray methods are used to produce the anode and/or cathode structures of the present Li ion batteries. A plasma spray method comprises supplying a plurality of input particles, such as particulate carbon, doped particulate carbon, or nano-mixed particulate carbon and generating a plurality of ionic species from a target material, such as an active cathode or anode material, wherein the ionic species form coatings on the input particles, to form a plurality of coated particles, such as mesoporous particulate carbon with active cathode or anode material deposited within the pores. The plurality of coated particles is then ionized to form a plurality of ionized particles and a plasma jet comprising the plurality of ionized particles is generated. The plurality of ionized particles are then accelerated to form a plasma spray comprising the ionized particles in a third stage. The plurality of accelerated ionized particles are then directed to a substrate and form a coating on the substrate.

The substrate for the anode and/or cathode can contain a carbon paper. The carbon paper can be a carbon fiber paper formed from a mixture of a carbon particle material and a polymer base material. The carbon fibers may be formed by, for example, by electrospinning. The carbon particles may be, but are not limited to, graphene, carbon nano-onions and/or other carbon particles created by thermal or microwave cracking. The active material—that is, the S or silicon material or composites for the cathode or anode, respectively—may be incorporated into the carbon paper during manufacturing of the carbon paper.

Figure 9A:
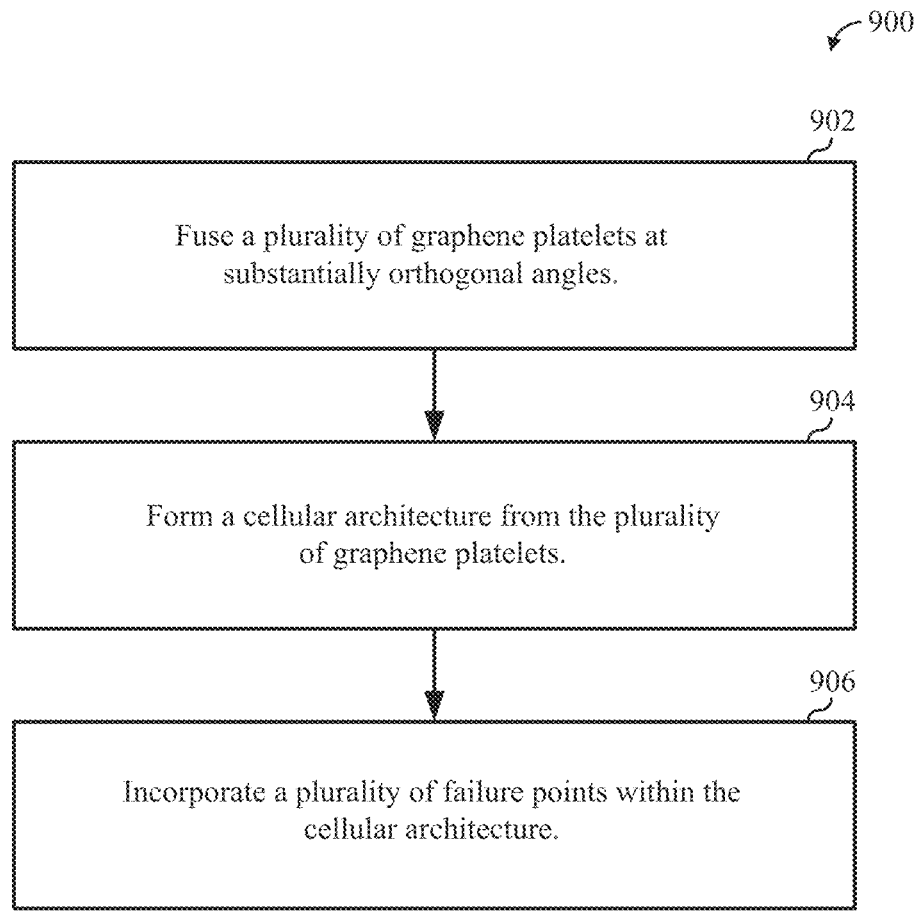
FIGS. 9A-9E are flowcharts of an example method to manufacture expansion-tolerant and electrically conductive three-dimensional (3D) carbon-based host electrode architectures, according to some implementations.

FIGS. 9A-9E are flowcharts of an example method to manufacture expansion-tolerant and electrically conductive three-dimensional (3D) carbon-based host electrode architectures. FIG. 9A shows an illustrative flowchart depicting an example operation 900 for fusing a plurality of graphene platelets. In some instances, the operation 900 may be an example of one or more of the operations and/or methods that may be used to self-nucleate any one or more of the carbon-based particles 100A and/or 100D shown in FIGS. 1A and/or 1D, respectively. At block 902, a plurality of graphene platelets are fused at substantially orthogonal angles. At block 904, a cellular architecture is formed from the plurality of graphene platelets. At block 906, a plurality of failure points are incorporated within the cellular structure. In some instances, such failure points can include points of flexure where the cellular structure can volumetrically expand, enlarge, or otherwise change in shape to, for example, accommodate volumetric expansion as caused by PS shuttle occurring within a Li S cathode during operational cycling.

Figure 9B:
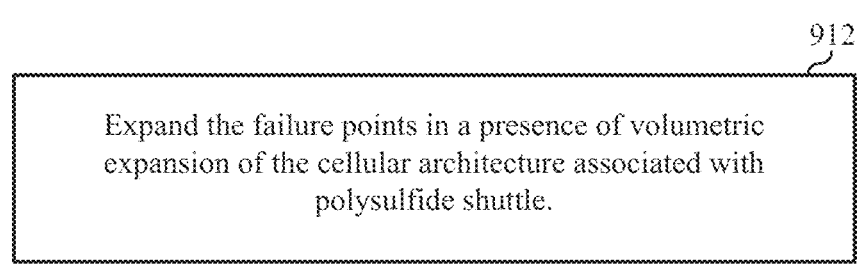
Figure 9C:
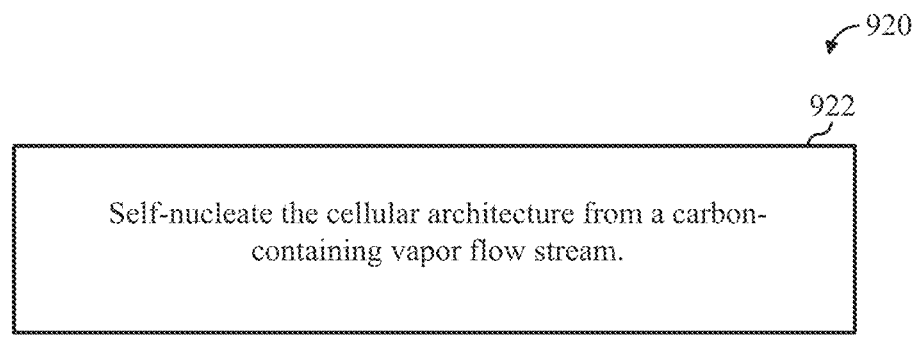
Figure 9D:
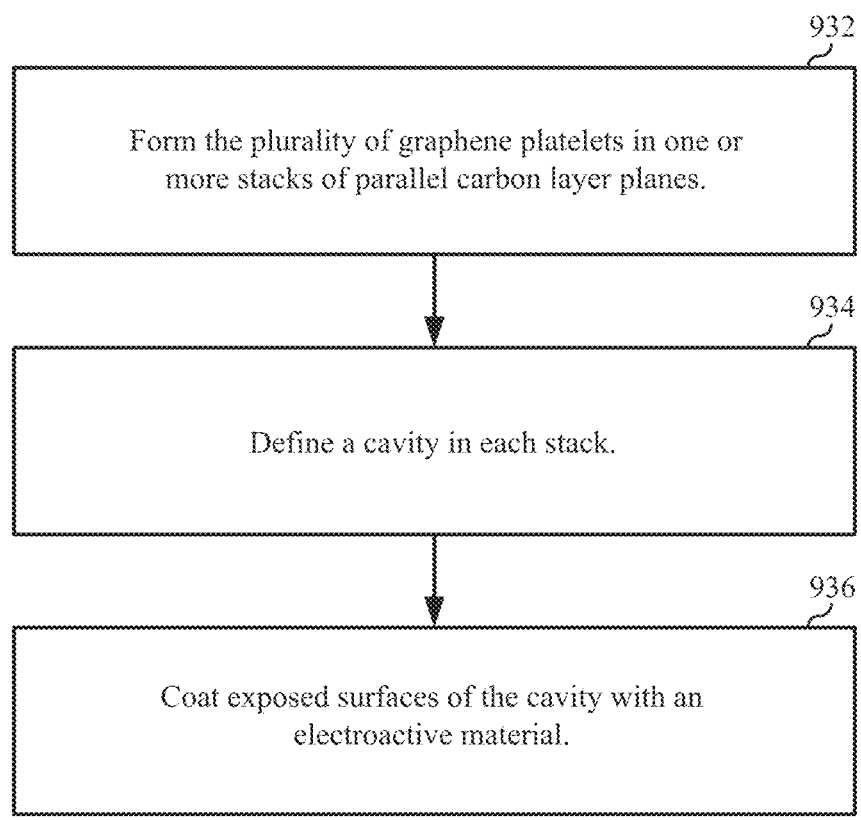
Figure 9E:
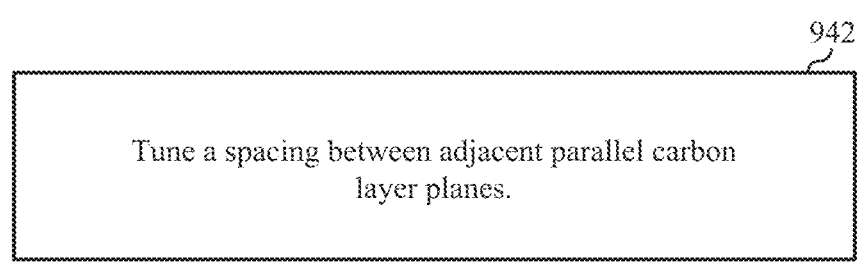

FIG. 9B shows an illustrative flowchart depicting an example operation 910 for expanding the failure points. At block 912, the failure points are expanded in a presence of volumetric expansion of the cellular architecture associated with polysulfide (PS) shuttle. FIG. 9C shows an illustrative flowchart depicting an example operation 920 for self-nucleating the cellular architecture. At block 922, the cellular architecture is self-nucleated from a carbon-containing vapor flow stream. FIG. 9D shows an illustrative flowchart depicting an example operation 930 for forming stacks of parallel carbon layer planes. At block 932, the plurality of graphene platelets are formed into one or more stacks of parallel carbon planes. At block 934, a cavity is defined in each stack. At block 936, exposed surfaces of the cavity are coated with an electroactive material. FIG. 9E shows an illustrative flowchart depicting an example operation 940 for tuning a spacing. At block 942, a spacing is tuned between adjacent parallel carbon planes.

Lithium (Li) Ion Batteries and Battery Materials Containing Carbon Meta Particles Conventional Li ion batteries have limitations, such as low energy density and poor cycle lifetime and/or stability. The inferior performance of conventional Li ion batteries is in part due to the insulating and micromechanically and chemically unstable nature of the electroactive materials in conventional Li ion batteries, such as when in contact with conventional liquid Li ion containing electrolytes. One approach to addressing the aforementioned limitations involves carbon meta particles in combination with electroactive materials.

Li ion batteries contain carbon meta particles and electroactive materials, such as silicon and S with theoretical specific capacities of 4199 mAh/g and 1672 mAh/g respectively, with higher specific capacity than conventional electroactive battery materials. The term "carbon meta particles" as used herein refers to mesoporous carbon particles with wide distributions of pore sizes, such as multimodal distributions or comprising pores with sizes from 0.1 nm to 10 nm and pores with sizes from 10 nm to 100 nm. Carbon meta particles can have improved characteristics compared to conventional carbon particles, such as higher surface area and electrical conductivity, as described above, and can be used in several components of Li ion batteries, such as anodes, cathodes, and current collectors. Carbon meta particles can also include materials other than carbon, such as electroactive materials, alkali metals, oxide materials, and/or impurities, such as hydrogen, and small quantities, such as less than 1%, of other elements such as oxygen and/or metals. Improved matched silicon/carbon anode and S/carbon cathode electrodes for Li ion batteries are also described, in which matched silicon/carbon anode and S/carbon cathode electrodes exhibit improved stability and/or cycle lifetime compared to conventional Li ion batteries. These electrodes are formulated into integrated full silicon-S cells. These integrated cells, such as batteries, are cells in a pouch type configuration.

The electrode architectures containing carbon meta particles are also inherently stable during lithiation/de-lithiation and reliably manufacturable at a large scale. There are many applications for Li ion batteries with high specific capacity that are stable over many cycles. For example, satellites and other space technologies, such as technologies for space-based communications, require reliable power and energy storage and hence, improvements in energy density and stability, such as safety and cycle lifetime, would be beneficial to those applications.

The unique mesoporous carbon meta particles provide an enabling platform/architecture for rechargeable battery electrode construction with the potential for disruptive performance gains and cost reductions over existing Li ion batteries. In some cases, the mesoporous carbon meta particles can be produced using a microwave reactor operating with atmospheric pressures. The carbon meta particles contain 3D nanostructures at different length scales, such as ranging from nanometers to microns, or contain hierarchical 3D structures, such as fractal-type structures, at different length scales, such as ranging from nanometers to microns. The present carbon meta particles can improve battery performance and durability by improving the functionality of the core carbon framework in terms of electronic conductivity, mechanical durability, and specific capacity.

Additionally, specific electroactive materials such as S, Si, F, Al, Ge, Sn, Sb, Fe, and combinations thereof can be incorporated into the mesoporous structures of the carbon meta particles, such as during particle fabrication, or electrode fabrication, to yield even greater capacity and stability, such as increased cycle lifetime with greater depth of discharge. Mesoporous carbon meta particles in combination with silicon and/or S electroactive materials produce batteries with improved performance and safety metrics compared to the current state of the art batteries. Batteries with the aforementioned carbon meta particles and/or electroactive materials have specific capacities from 1,350 mAh/g to 1,800 mAh/g at 100,000 cycles.

In some conventional Li-ion battery designs, key electronic and ionic conductive pathways and triple phase boundary sites for fast redox reactions, with high exchange current densities, are created by mixing carbon and active material particles, with sizes, such as from 1-3 m and a binder into a slurry, such as N-Methyl-2-pyrrolidone (NMP) based, casting the slurry mixture onto a metal current collector, such as copper and aluminum for anode and cathode respectively, and then drying the slurry-coated collector. In conventional batteries, the ratio of active to inactive material is adjusted to optimize performance, and anode/cathode electrode thicknesses are adjusted to optimize capacity, matching Li utilization/availability to each electrode.

Conventional liquid electrolyte chemistries have been tailored to form 'quasi-stable' solid electrolyte interfaces (SEIs) at the active particle surface to reduce capacity fade and instability, as well as increasing the electrochemical window stability. However, the interface between the active particle and the liquid electrolyte is inherently unstable and over time, with the volume expansion/contraction associated with Li intercalation/reaction, these 'quasi-stable' interfaces become more resistive partially due to increased SEI growth along with micromechanical fracturing of the SEI and parent active material. As a result, in conventional Li ion batteries, the Li ions are consumed by these processes as well as by other parasitic reactions.

The herein-disclosed batteries and battery materials overcome the inherent challenges and shortcomings, such as stability and lifetime, of conventional batteries, such as with mixed particle slurry construction. The approach described herein utilizes unique, as-deposited carbon meta particles, such as 3D mesoporous meta particle formulations with carbon-based particles, as the electrical conducting backbone of a battery electrode. Specific active and functionalizing elements can be incorporated, such as doped and/or absorbed, into the engineered carbon meta particle nanostructures during the particle reaction/particle formation process, such as in a thermal or a microwave reactor.

Post-processes such as mixing, milling, thermal processes, and/or plasma processes can also be utilized to selectively deposit or incorporate electroactive nanoparticles and/or a polymer binder in, and around, the carbon scaffold, to create a meta particle with stable SE. The polymer binder serves both as the glue and as a layer for reversible solid-state ionic transport/conduction. Reactor, and in some cases post-reactor, processing steps can be optimized to create carbon meta particles with 3D interconnected networks of electronically conducting ligaments and/or segments surrounded by open, porous cellular channels populated with pre-activated graphene fingers, electroactive materials, and/or open channels for liquid ion, such as Li conduction and/or shuttling. By controlling the 3D morphology of these materials, such as nanometer-scale pore sizes, the solubility and crystallinity of the Li phase formation during battery operation can be optimized at the local micro- and meso-scales. The as-fabricated carbon meta particle structure, with or without electroactive materials added, can be engineered to controllably adjust or relax in-situ after early stage conditioning, such as including lithiation/de-lithiation, to form a hardened, stable architecture with reversible, high energy storage and delivery (rate) performance.

The present anode and/or cathode electrodes are produced by slurry casting of the engineered, carbon meta particles onto a conducting foil, such as aluminum or copper. The reactors used in the formation of the carbon meta particles are configured to deposit the particles directly onto a moving substrate, such as in a drum coater type configuration, thereby eliminating the slurry process and enabling a more effective and efficient integrated electrode/current collector manufacturing process and/or design architecture. Unique microwave plasma reactors, such as described above, produce carbon meta particles and thin/thick films, such as composed of various carbon allotropes as well as numerous other elements and compounds in isolation or in combination. By addressing a number of key challenges in conventional Li ion battery manufacturing, such as particle handling and dispersion, the proposed carbon meta particle approach provides engineering and fabrication control at the nanometer scale for improved product reliability and performance, such as stability and energy/power density in the case of the battery.

Batteries contain the carbon meta particles described above in combination with conventional battery working (active) electrodes, such as elemental Li metal and/or conventional $LiCoO_2$ (LCO) electrodes. In some designs, the conventional materials are used as counter electrodes, such as anodes or opposite cathodes containing carbon meta particles, or as cathodes opposite anodes containing carbon meta particles. Conventional battery materials can also be used with the herein-disclosed carbon meta particles. For example, when conventional materials are used as counter materials along with the improved meta particles, they can assist with the effective optimization of Li ion shuttle performance, such as reducing loss mechanisms and optimizing reversibility, in batteries using the disclosed carbon meta particles.

Anode and cathode electrodes for Li ion batteries can contain carbon meta particles. Carbon meta particles are produced by thermal or by microwave reactors. The conditions within the reactor can be optimized to produce high capacity, carbon/Li intercalated particles, such as with specific capacity >350 mAh/g @200 cycles. Some examples of the properties of the innate, as-deposited carbon meta particles that can be tuned by changing reactor processing conditions include:
  morphology,
  basal-to-edge plane ratio,
  structure, such as crystallinity,
  chemical purity, and
  electrochemical performance, such as evaluated using Li intercalation in "2032" half cells between 0 1.5 V and at rates up to 0.5 C.

Reactor conditions can be tuned to create carbon meta particles with improved specific capacity, porosity, surface area, structure/crystallinity, purity/surface functionalization, and stability of SEIs, as compared to conventional battery materials.

Lithium loading/intercalation into the carbon meta particles can also be optimized for stability and reversibility, such as to serve as a potential source of Li ions for a full cell configuration. In addition to innate carbon meta particle development, polymeric artificial SEIs can be incorporated into the electrode materials for increased stability and performance. For example, a stabilized, such as cyclized, or carbonized, polyacrylonitrile (PAN) conductive binder, which exhibits both intrinsic electrical conductivity along with polymeric elasticity, can be infiltrated into the porous meta carbon structure to form an 'in-situ' solid electrolyte surface layer. An acrylonitrile (AN) monomer precursor solution is also used to enhance infiltration prior to polymerization and stabilization of the PAN. These artificial solid electrolyte surface layers can either be deposited in situ in the reactor during the carbon meta particle formation, such as in a multi-chamber reactor system in a chamber downstream from the chamber wherein the carbon meta particles are first formed, and before the particles leave the multi-chamber reactor, or in post-processes after the carbon meta particles are formed.

Some examples of techniques that can be used to characterize the current carbon meta materials, such as particles or deposited films, are Brunauer-Emmett-Teller (BET) measurements for surface area, scanning electron microscopy (SEM) for morphology, Raman spectroscopy for structure/crystallinity, and scanning tunneling electron microscopy with energy dispersive x-ray spectroscopy (STEM/EDX) for elemental mapping of active components/impurities. The carbon meta particles, with and without incorporated active components, have improved surface area, morphology, dispersion of incorporated active components, and/or impurity concentrations, compared to conventional battery materials.

Carbon meta particles can also be slurry cast onto copper foils to form electrode layers containing the particles, and these electrodes can be tested in a "2032" coin cell (and pouch cell) configuration with Li foil counter electrodes to evaluate the electrode properties. For example, charge-discharge, galvanostatic and potentiostatic, cyclic voltammetry and AC impedance can be used to measure specific capacity, coulombic efficiency, redox reaction mechanisms, diffusion, and DC resistance. Electrodes incorporating the carbon meta particles, with or without incorporated active components, have improved specific capacity, coulombic efficiency, redox reaction mechanisms, diffusion, and/or DC resistance, compared to conventional battery materials.

The carbon meta particles described above include active (anodic) silicon. For example, the meta carbon particles can contain discrete silicon nanoparticles or 'in-situ' formed nanostructured phases of silicon. In some cases, the carbon meta particles with active silicon can also contain one or more polymer binders for SEI control. In some cases, the carbon meta particles with active silicon have specific capacity of 1000 mAh/g @200 cycles. Both elemental silicon and silicon oxides can be incorporated into carbon meta particles for a battery electrode. Both elemental silicon and silicon oxides have specific capacities, such as 4200 mAh/g and 1600 mAh/g, respectively, greater than carbon/graphite. One challenge of incorporating silicon in situ, during the carbon meta particle formation, such as by introducing discrete nanoparticles or vapor or liquid precursors into the reactor during particle formation, is controlling the formation of insulating phases, such as SiC, at the interface between silicon and carbon.

The reactor conditions can be tuned to prevent the formation of insulating layers during in situ active materials incorporation into the carbon meta particles. For example, the oxidizing/reducing environment of the reactor, such as in a microwave reactor, can be controlled, such as by creating a mild oxidizing condition with the addition of $CO_2$, to prevent SiC formation. Additionally, the oxidizing/reducing environment of the reactor can also functionalize the carbon surface, such as with oxygen, S, or other species, to affect surface tension, such as wettability and reactivity, for subsequent post processing/treatment steps. The carbon meta particles described herein are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes.

The silicon nanoparticles are incorporated into or dispersed with the carbon meta particles in one or more post-reactor processes, instead of directly incorporating active materials, such as in the form of discrete nanoparticles or via vapor or liquid transport, during carbon meta particle formation in the reactor, such as microwave reactor. One example of a post-reactor process is plasma milling. The properties of these particles and of electrode layers containing these particles, such as carbon-to-silicon ratio and distribution, other materials properties, and electrical properties within coin cells, can be evaluated as described above, and these post-reactor processed particles can also have improved properties compared to conventional battery materials.

Cathodic electroactive materials, such as elemental S or Li sulfide, are incorporated into the carbon meta particles described above. Various methods can be used to incorporate cathodic electroactive materials into the structure of the carbon meta particles. For example, the cathodic electroactive materials can be incorporated directly during carbon meta particle formation within the reactor, such as by introducing discrete nanoparticles or vapor or liquid precursors into the reactor during particle formation, or by post-reactor processes, such as via vapor phase absorption with a reactant such as phenyl sulfide. Properly optimized within the reactor, the carbon mesoporous, meta particle framework will constrain cathodic electroactive materials, such as elemental S, growth to within the channels and provide essential electrical contact to the insulating cathodic electroactive materials. In addition, cathodic electroactive materials solubility, and crystallinity in relation to Li phase formation, can be confined/trapped within the microporous/mesoporous framework.

The carbon meta particles contain cathodic electroactive S. The properties of these carbon meta particles containing S and of electrode layers containing these particles, such as carbon-to-S ratio and distribution, other materials properties, and electrical properties within coin cells, can be evaluated as described above, and these carbon-S meta particles can also have improved properties compared to conventional battery materials. In addition to innate carbon meta particles containing S, similar techniques as those described above can be used to create a polymeric artificial SEI for increased stability and performance. For example, PAN conductive binder, as well as other candidate polymers, can be infiltrated into the porous carbon structure to form an 'in-situ' solid electrolyte surface layer and further confine the S redox reaction to within the meso porous carbon framework. Electrodes containing carbon-S meta particles have specific capacity of >600 mAh/g @ 500 cycles.

Carbon meta particles are pre-lithiated, such as Li is incorporated during particle formation, and then the particles are post-reactor processed with elemental S to form $Li_2S$ within the confined channels of the mesoporous structure. Some of the post-reactor processes described in the anode formation above can also be used to form $Li_2S$ within the meta carbon particles for cathodes. The properties of these carbon meta particles containing $Li_2S$ and of electrode layers containing these particles, such as carbon-to-S ratio and distribution, other materials properties, and electrical properties within coin cells, can be evaluated as described above, and these carbon-S meta particles containing $Li_2S$ can also have improved properties compared to conventional battery materials.

Full Li ion batteries can be formed from the current anodes and/or cathodes described above. The current anodes and/or cathodes described above are formed into a full cell, battery, using conventional counter electrodes (if only one current electrode is used) and/or using conventional or modified electrolytes. A Li ion battery contains the current anodes and/or cathodes described above, and a conventional electrolyte containing a 1-1.2 M $LiPF_6$ salt in 1:1 weight ratio of ethylene carbonate and diethyl carbonate (EC/DEC). Other similar conventional Li ion electrolytes are used. However, Li ion batteries contain the current anodes and/or cathodes described above, and a modified electrolyte. For example, the electrolyte can be modified to improve the efficiency of S confinement within the mesoporous structure and the stability of the SEI at the anode. The effects of the electrolyte modifications can be evaluated in half cell configurations for stability prior to conducting full cell tests.

A Li ion battery contains the current anodes and/or cathodes described above and is a full C—Si—S cell. The thicknesses of the current electrodes described above are optimized to create a matched cell with full Li utilization. Pre-conditioning charge/discharge protocols are used to test the full cells. For example, a high first cycle charge rate can result in a porous, resistive SEI layer with minimal solvent absorption, whereas lower rates promote a denser SEI layer. A pre-conditioning protocol is used to maximize the initial capacity and insure long term stability. A Li ion battery (full cell) containing the current anode and/or cathodes described above has a specific capacity >1200 mAh/g @1000 cycles.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. An electrode comprising:
   a carbon-based structure having a plurality of localized reaction sites;
   an open porous scaffold defined by the carbon-based structure and configured to confine an active material in the localized reaction sites; and
   a plurality of engineered failure points formed throughout the carbon-based structure and configured to expand in a presence of volumetric expansion associated with polysulfide shuttle.

2. The electrode of claim 1, wherein the open porous scaffold is configured to inhibit a formation of interconnecting solid networks of the active material between the localized reaction sites.

3. The electrode of claim 1, wherein the plurality of engineered failure points is configured to relax or collapse during an initial activation of the electrode.

4. The electrode of claim 1, wherein the open porous scaffold defines a hierarchical porous compliant cellular architecture formed of a plurality of interconnected graphene platelets fused together at substantially orthogonal angles.

5. The electrode of claim 4, wherein the hierarchical porous compliant cellular architecture is expansion-tolerant and is configured to expand in a presence of Li ion insertion or de-insertion.

6. The electrode of claim 1, wherein the carbon-based structure has a surface area configured to transport ions in the open porous scaffold.

7. The electrode of claim 6, wherein the transport is based on a presence of stress or strain during an operational cycling of the electrode.

8. The electrode of claim 1, wherein the plurality of engineered failure points are configured to reinforce of the carbon-based structure based on operational cycles of the electrode.

9. The electrode of claim 1, wherein the carbon-based structure, upon being doped by one or more dopants, is configured to enhance electron transfer between itself and the active material.

10. The electrode of claim 1, wherein the active material includes any one or more of Li or S.

11. The electrode of claim 9, wherein the one or more dopants includes any one or more of carbon, oxygen, nitrogen, or metal oxides including silicon oxide ($SiO_x$), aluminum oxide ($AlO_x$), vanadium oxide ($VO_x$), titanium oxide ($TiO_x$), and magnesium-doped nickel oxide ($Mg_{0.6}Ni_{0.4}O$).

12. The electrode of claim 9, wherein the open porous scaffold has a surface area configured to increase adsorption of Li and Li polysulfide by being doped with any one or more of carbon or oxygen.

13. The electrode of claim 11, wherein the carbon-based structure, upon being doped with nitrogen, is configured to increase in electrical conductivity.

14. The electrode of claim 9, wherein the carbon-based structure is configured to increase electron transfer across an interface between itself and a bulk electrolyte phase interspersed in the open porous scaffold.

15. The electrode of claim 14, wherein the open porous scaffold further comprises micropores, any one or more of which is configured to retain polysulfides formed from the active material.

16. A Lithium Sulfur (Li S) battery, comprising:
    an anode;
    a cathode formed of few layer graphene (FLG) platelets defining a scaffold with a conductive carbon surface, the scaffold comprising:
       a plurality of interconnected channels configured to provide ion transport;
       a plurality of pores configured to retain an electroactive material; and
       a plurality of aggregates formed from two or more FLG platelets fused together
    and configured to enlarge based on a volumetric expansion of the cathode.

17. The Li S battery of claim 16, wherein the electroactive material includes S.

18. The Li S battery of claim 17, wherein the plurality of pores is configured to confine one or more short or long-chain polysulfides (PS) formed from the S.

19. The Li S battery of claim 17, wherein the conductive carbon surface is configured to electrochemically convert the S through charge transfer at the conductive carbon surface.

20. The Li S battery of claim 16, wherein the scaffold is configured to provide mechanical stability in a presence of the volumetric expansion.

21. The Li S battery of claim 17, wherein any one or more of a discharge cycle of the Li S battery, a dissolution, or a precipitation reaction of the S during operational cycling of the Li S battery is associated with the volumetric expansion of the cathode.

22. The Li S battery of claim 16, further comprising a composite separator disposed between the anode and the cathode.

23. The Li S battery of claim 22, further comprising an electrolyte solution interspersed throughout the anode, the cathode and surrounding the composite separator.

24. The Li S battery of claim 23, wherein the electrolyte solution further comprises solvent molecules configured to solvate with one or more short or long-chain polysulfides (PS) formed from S confined in one or more of the plurality of pores.

25. The Li S battery of claim 23, wherein the plurality of pores is configured to be infiltrated by the electrolyte solution.

26. The Li S battery of claim 16, wherein the scaffold is electrically conductive.

27. The Li S battery of claim 26, wherein the scaffold is configured to be doped with nitrogen, wherein the doping is associated with an increase in electrical conductivity across the scaffold.

28. A method of manufacturing an electrode, the method comprising:
 fusing a plurality of graphene platelets at substantially orthogonal angles;
 forming a cellular architecture from the plurality graphene platelets; and
 incorporating a plurality of failure points within cellular architecture.

29. The method of claim 28, further comprising expanding the failure points in a presence of volumetric expansion of the cellular architecture associated with polysulfide shuttle.

30. The method of claim 28, further comprising self-nucleating the cellular architecture from a carbon-containing vapor flow stream.

31. The method of claim 30, flowing the carbon-containing vapor flow stream at substantially atmospheric pressure.

32. The method of claim 28, further comprising:
 forming the plurality of graphene platelets in one or more stacks of parallel carbon layer planes;
 defining a cavity in each stack; and
 coating exposed surfaces of the cavity with an electroactive material.

33. The method of claim 31, further comprising:
 tuning a spacing between adjacent parallel carbon layer planes.

34. A reversible Lithium (Li)-based electrode architecture comprising:
 an open porous scaffold formed of a plurality of parallel graphene layer stacks;
 a plurality of cavities, each cavity extending lengthwise into each stack of parallel graphene layers;
 an active material at least temporarily confined within each cavity and disposed between adjacent graphene layers; and
 a plurality of engineered failure points distributed throughout the open porous scaffold.

35. The reversible Li-based electrode architecture of claim 34, wherein the plurality of engineered failure points are configured to expand in a presence of a volumetric expansion of the open porous scaffold associated with transport of the active material.

36. The reversible Li-based electrode architecture of claim 34, wherein the open porous scaffold is incorporated into a Li battery system to yield a specific capacity of the Li battery system of greater than 750 mAh/g.

37. The reversible Li-based electrode architecture of claim 34, wherein the plurality of parallel graphene layer stacks are configured to undergo a transition from a substantially crystalline orientation to a random few-layer graphene (FLG) arrangement with nanoscopic pores.

38. The reversible Li-based electrode architecture of claim 37, wherein the transition increases a specific capacity of a Li battery system incorporating the open porous scaffold.

* * * * *